(12) United States Patent
Drogobetski et al.

(10) Patent No.: US 9,430,498 B2
(45) Date of Patent: Aug. 30, 2016

(54) METHODS AND SYSTEMS FOR GENERATING A DIGITAL CELEBRITY MAP TOUR GUIDE

(71) Applicant: Velvet Ropes, Inc., Marina Del Rey, CA (US)

(72) Inventors: Aleksandr Sergeyevich Drogobetski, Playa Del Rey, CA (US); Aaron Tucker Simmons, Playa Del Rey, CA (US)

(73) Assignee: Velvet Ropes, Inc., Marina Del Ray, CA (US)

( * ) Notice: Subject to any disclaimer, the term of this patent is extended or adjusted under 35 U.S.C. 154(b) by 0 days.

(21) Appl. No.: 14/960,370

(22) Filed: Dec. 5, 2015

(65) Prior Publication Data

US 2016/0171011 A1  Jun. 16, 2016

Related U.S. Application Data

(60) Provisional application No. 62/091,519, filed on Dec. 13, 2014.

(51) Int. Cl.
| | |
|---|---|
| *G06F 17/30* | (2006.01) |
| *G06F 3/0484* | (2013.01) |
| *H04L 29/08* | (2006.01) |
| *H04L 29/06* | (2006.01) |

(52) U.S. Cl.
CPC ..... *G06F 17/30241* (2013.01); *G06F 3/04842* (2013.01); *G06F 17/3087* (2013.01); *G06F 17/30554* (2013.01); *G06F 17/30867* (2013.01); *H04L 67/141* (2013.01); *H04L 67/18* (2013.01); *H04L 67/42* (2013.01)

(58) Field of Classification Search
CPC ............... G06F 17/30554; G06F 17/30867; G06F 17/3087; G06F 17/30241; G06F 3/04842; H04L 67/141; H04L 67/42; H04L 67/18
See application file for complete search history.

(56) References Cited

U.S. PATENT DOCUMENTS

| | | | |
|---|---|---|---|
| 2005/0192025 A1* | 9/2005 | Kaplan | G06F 17/3087 455/456.1 |
| 2008/0033919 A1* | 2/2008 | Arrouye | G06F 17/30997 |

(Continued)

OTHER PUBLICATIONS

Champion, Christian. "Hollywood LA Star Map," Google Play Application, available at: https://play.google.com/store/apps/details?id=com.hollywood Accessed on Nov. 23, 2015.

(Continued)

*Primary Examiner* — Jerrah Edwards
*Assistant Examiner* — Tamara Weber
(74) *Attorney, Agent, or Firm* — American Patent Agency PC; Daniar Hussain

(57) ABSTRACT

Systems and methods of creating a tour on a digital celebrity map are disclosed, including steps to receive a user geolocation; determine a map area around the user geolocation; retrieve, from a data repository, celebrity geolocations within the map area, wherein each celebrity geolocation is associated with at least one named celebrity, and wherein each of the celebrity geolocations is associated with a celebrity geolocation type selected from the group consisting of celebrity real estate property, celebrity sighting location, and celebrity hotspot; transmit the celebrity geolocations to the computing appliance, for display on the digital celebrity map; receive a request to generate a tour to the celebrity geolocations, wherein the tour starts from the user geolocation; and in response to the user request, generate for display on the digital celebrity map, the tour to the celebrity geolocations.

20 Claims, 35 Drawing Sheets

(56) References Cited

U.S. PATENT DOCUMENTS

| | | | | |
|---|---|---|---|---|
| 2009/0313299 | A1* | 12/2009 | Bonev | G06Q 10/109 |
| 2010/0241723 | A1* | 9/2010 | Dornbush | H04L 67/306 |
| | | | | 709/207 |
| 2011/0214050 | A1* | 9/2011 | Stambaugh | G06F 3/04817 |
| | | | | 715/234 |
| 2013/0122937 | A1* | 5/2013 | Meyer | G06Q 30/0259 |
| | | | | 455/456.3 |

OTHER PUBLICATIONS

Champion, Christian. "Miami Star Map," Google Play Application, available at: https://play.google.com/store/apps/details?id=com.wu.gpsmap Accessed on Nov. 23, 2015.

Champion, Christian. "New York Star Map," Google Play Application, available at: https://play.google.com/store/apps/details?id=com.wu.star Accessed on Nov. 23, 2015.

Poolside Apps. "Maps of Stars Hollywood," Google Play Application, available at: https://play.google.com/store/apps/details?id=com.mobisys.android.starmaps Accessed on Nov. 23, 2015.

StarSightings Inc. "StarSightings—Celebrity Pictures, Locations & News," iPhone Application, available at: https://itunes.apple.com/us/app/starsightings-celebrity-pictures/id410117546?mt=8 Accessed on Nov. 23, 2015.

GeoQuestGames. "Celebrity GeoSpotter," iPhone Application, available at: https://itunes.apple.com/us/app/celebrity-geospotter/id361436230?mt=8 Accessed on Nov. 23, 2015.

* cited by examiner

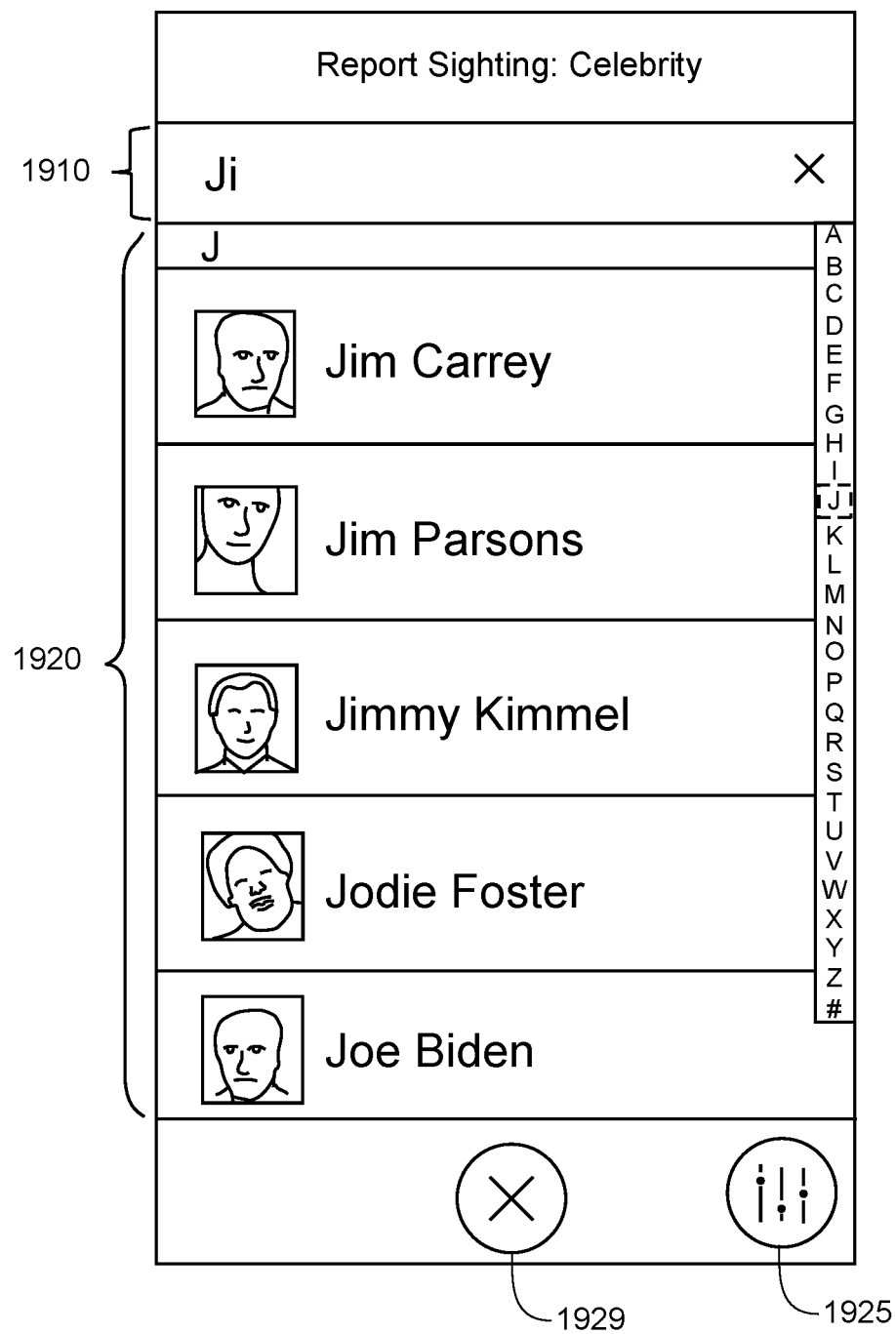

Fig. 19B
1930
Report Sighting: Location
 Jimmy Kimmel
1935 — 1872-1898 N Curson Ave
Suggest a different address  >  — 1936
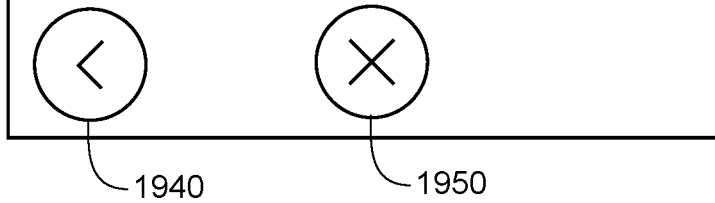
1940   1950

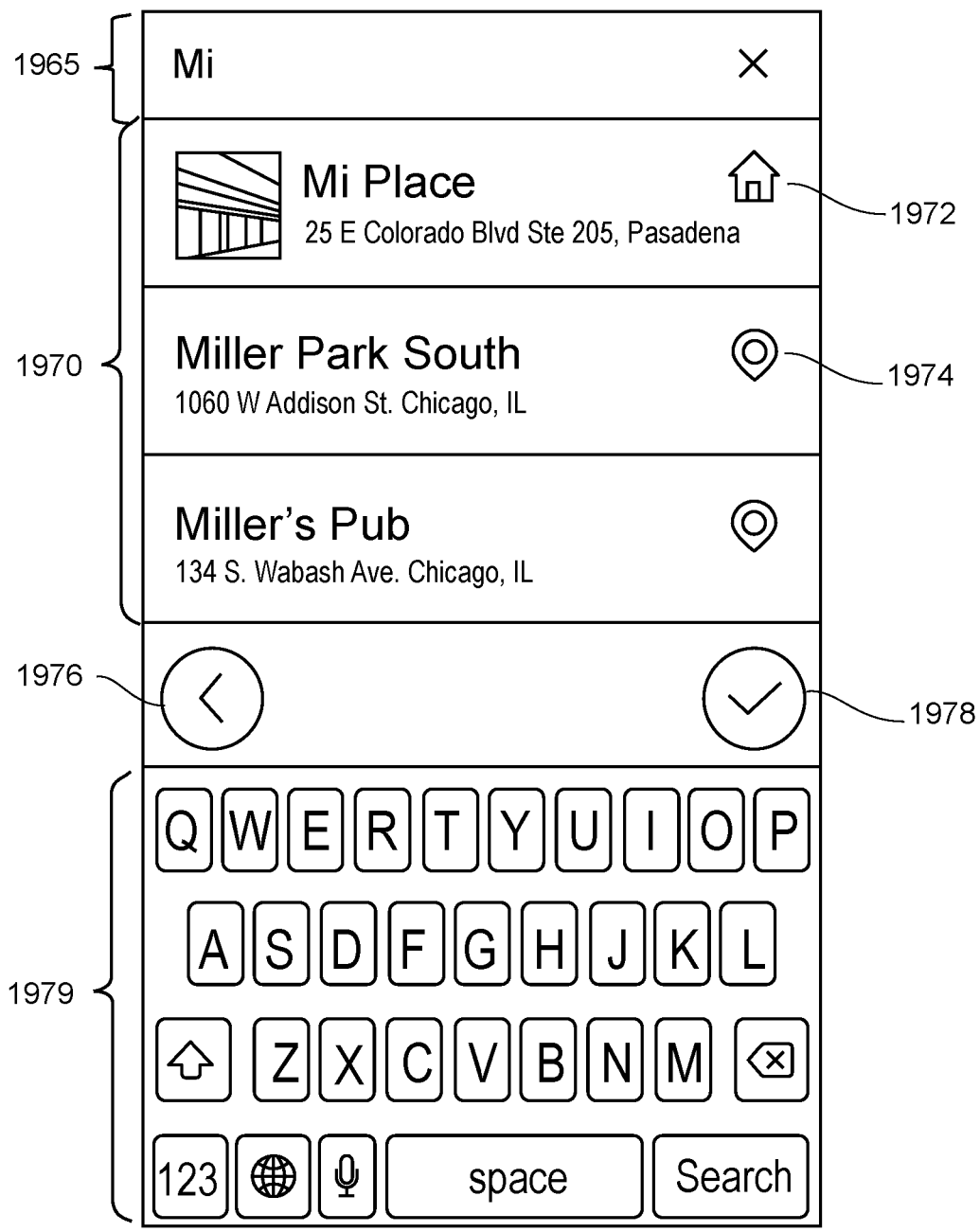

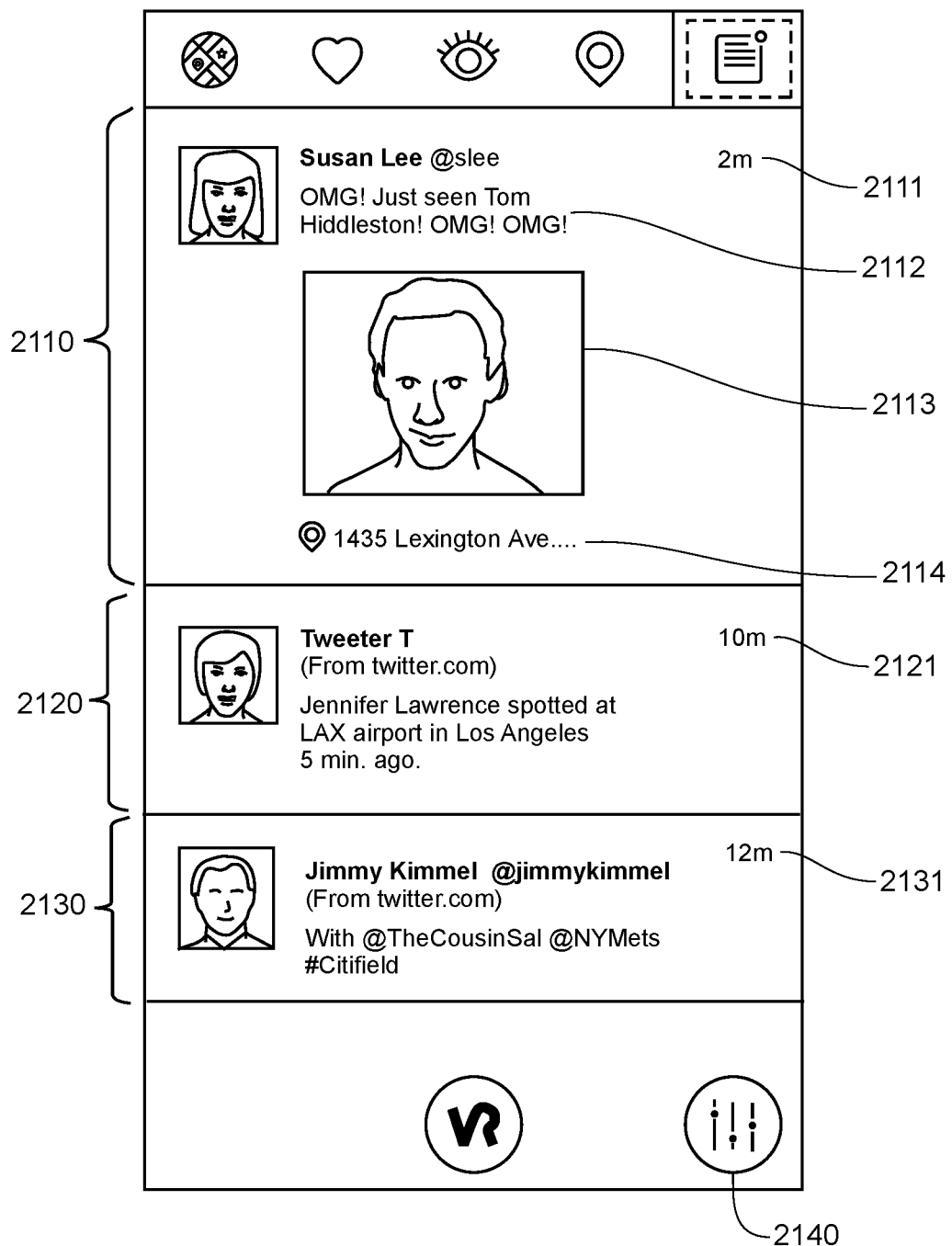

Fig. 27
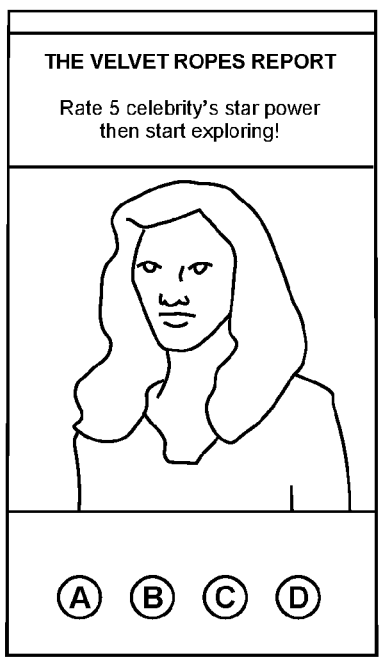
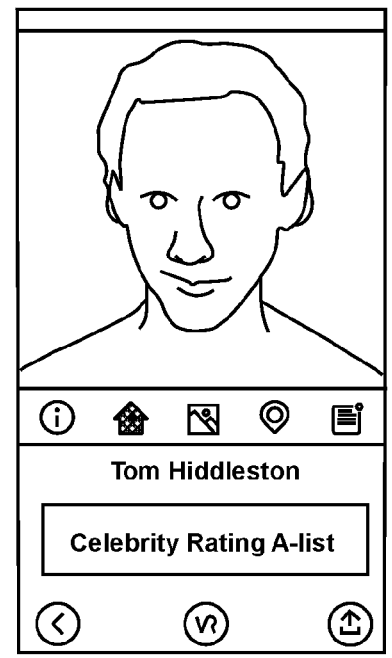
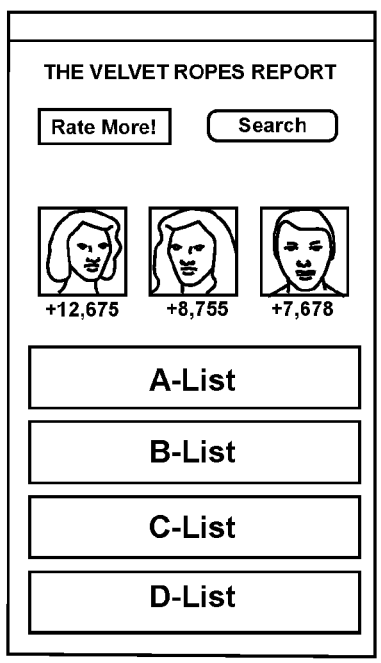
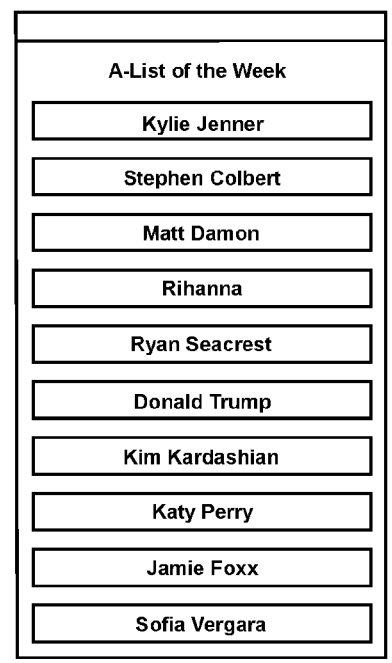

2900

METHODS AND SYSTEMS FOR GENERATING A DIGITAL CELEBRITY MAP TOUR GUIDE

REFERENCE TO RELATED APPLICATIONS

This application is a non-provisional of and claims the benefit of provisional application U.S. Ser. No. 62/091,519, filed on Dec. 13, 2014,and entitled "SMART PHONE APPLICATION THAT IS A DIGITAL CELEBRITY MAP TOUR GUIDE FOR THOSE VISITING ANY LOCATION WHERE A CELEBRITY MAY RESIDE," the entire disclosure of which is hereby incorporated in its entirety herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention broadly relate to systems and methods for creating an interactive digital celebrity map tour guide. More particularly, embodiments of the present invention relate to displaying and generating a customized tour to celebrity places, providing corresponding celebrity information, and facilitating the reporting and notification of celebrity sightings. A digital celebrity map system thus implemented enables tourists or sightseers to navigate to celebrity-related attractions, to easily access associated celebrity information, and to interact with other fans within a celebrity-inspired social network.

BACKGROUND OF THE INVENTION

The statements in this section may serve as a background to help understand the invention and its application and users, but may not constitute prior art.

As the world economy grows and international tourism rapidly expands, there has been a recent explosion in the celebrity tour business where many tours take celebrity seekers to visit residences owned and hotspots frequented by celebrities past and present. Celebrity-oriented van and bus tours trade on the ever-growing interests in the private lives of celebrities and the fantasies of serendipitous celebrity encounters. In places like Hollywood, Beverly Hills, and New York City, visitors pay a hefty fee for roofless bus tours that last for only an hour or two, gawking at the luxuriousness of celebrity estates and trying to catch stars living or working in their natural surroundings.

On a typical celebrity bus tour, livery drivers often serve as the voice tour guides as well, blasting news, stories, anecdotes, and gossips over a loud speaker or individual headphones, building and delivering the impression that celebrities are just around the corner. One issue with such bus tours is the lack of quality control on the content of the tour. There is no guarantee that residences or other sighting locations featured on a tour are ever associated with a celebrity, and false advertisements are rarely investigated. Also, unless regular news updates are provided to tour guides, information they deliver becomes unreliable over time. In addition, for group bus tours, visitors are not able to pick or choose which celebrity locations to visit. Instead, they are forced into inflexible tour durations at the tour operator's itinerary, often unable to stay at any particular location of interest for enough time to capture a good photograph or to look up the address or history of the place they have just visited.

An alternative to celebrity bus tours is to purchase a "celebrity star map," a physical map that contains a list of hundreds of celebrity names and associated residences and hotspot locations. While star maps allow visitors to tour at their own paces, such maps are not always geographically accurate, and addresses often become obsolete, as real estate properties frequently change hands among the wealthy. Moreover, for those who want to visit sighting locations where celebrities have been spotted and hotspots where celebrities frequent, a physical map that has not been recently updated becomes useless when the celebrity of interest moves. More importantly, navigating with a physical map filled with hundreds of names may not be as obvious as one might expect. Confusion can easily arise for those lacking navigational skills. With a large number of celebrities listed in very small font, visitors may further have a hard time determining which locations to navigate to and how to optimize the tour, under their own constraints on time and transportation modes. Lastly, many times even when visitors successfully find a celebrity residence, they may come to see poor views blocked by privacy shrubbery or gates with long driveways.

While paper maps including paper celebrity maps are still popular for their portability and general reliability, digital maps have boomed over the past decade with the advent of ever more accurate positioning systems and the availability of mobile devices. Dedicated vehicle GPS devices, and mapping applications on mobile devices are almost ubiquitous nowadays. Nonetheless, in the field of celebrity tours, no integrated mapping system exists to provide customized, self-guided tours, to allow users to read corresponding celebrity biographies and news, to browse celebrity real estate and hotspot profiles, or to receive live celebrity sighting updates. Likewise, while social networking and media websites such as Twitter are widely available for users to search for celebrity sighting information within their proximity, such passive searches do not, in any sense, maximize the users' probability of sighting the celebrity themselves. For those who wait for hours just to get a glimpse of Justin Bieber, knowing that they have just missed the pop idol from one block away could be devastating news.

Therefore, in view of the aforementioned difficulties, there is an unsolved need to provide to celebrity seekers, self-guided yet fully customized and curated celebrity tours, with periodic or live updates to ensure associated celebrity information, including sighting information, is accurate and up to date.

It is against this background that various embodiments of the present invention were developed.

BRIEF SUMMARY OF THE INVENTION

Systems and methods are provided for creating a digital celebrity map tour guide. More specifically, one embodiment of the present invention is a method for creating a tour on a digital celebrity map, the method comprising steps to establish a client server connection between a server and a computing appliance used by a user, to receive a user geolocation from the computing appliance, to determine a map area around the user geolocation, and the retrieve, from the data repository, celebrity geolocations within the map area, wherein each celebrity geolocation is associated with at least one named celebrity, and wherein each celebrity geolocation is associated with a celebrity geolocation type selected from the group consisting of celebrity real estate property, celebrity sighting location, and celebrity hotspot. The method further includes steps to transmit the celebrity geolocations to the computing appliance, for display on the digital celebrity map, to receive a request to generate a tour to the celebrity geolocations, wherein the tour starts from the user geolocation, and to generate the tour to the celebrity geolocations for display on the digital celebrity map, in response to the request.

In some embodiments of the present invention, the method further includes steps to receive, from the user, at least one filtering criterion for filtering the celebrity geolocations, wherein filtering criteria include celebrity name, celebrity status, celebrity rating, celebrity geolocation type, and distance of a celebrity geolocation from the user geolocation. In response to receiving the at lest one filter criterion, the celebrity geolocations are filtered accordingly to the at least one filter criterion.

In some embodiments, the method further includes steps to receive a user selection of a travel mode, wherein the map area around the user geolocation is determined according to the selected travel mode, and wherein the tour is generated according to the selected travel mode.

In some embodiments, each celebrity geolocation is associated with an avatar of the at least one named celebrity, for display on the digital celebrity map as a location marker. In some other embodiments, the generated tour includes a graphical display of navigation directions. In yet other embodiments, the generated tour includes a profile for each celebrity geolocation.

In some embodiments, the method further includes steps to search digital media to find a currently-trending celebrity, to determine whether the currently-trending celebrity found exists in the data repository, and to add the currently-trending celebrity to the data repository in response to determining that he or she does not exist in the data repository.

In some embodiments, the method further includes steps to search digital image sources to find an image associated with a celebrity, and to determine whether the celebrity exists in the data repository. In response to determining that the celebrity exists in the data repository, the method further includes steps to determine whether the image exists in the data repository for the celebrity, and in response to a negative decision, associate the image with the celebrity in the data repository. In some other embodiments, the method further includes steps to determine whether the image is associated with a celebrity sighting. In response to determining that the image is indeed associated with a celebrity sighting, the method further determines whether the celebrity sighting exists in the data repository, and in response to determining that the celebrity sighting does not exist in the data repository, adding the celebrity sighting to the data repository. In yet some other embodiments, the method further includes steps to receive a credibility rating for the image, and update a credibility score of the digital image source according to the received credibility rating.

In another aspect, the present invention is a non-transitory, computer-readable storage medium storing executable instructions, which when executed by a processor, causes the processor to perform a process of creating a tour on a digital celebrity map in a client-server environment, the instructions causing the processor to perform the aforementioned steps.

In another aspect, the present invention is a system for creating a tour on a digital celebrity map, the system comprising a user device having a process, a display, and a first memory; a server comprising a second memory and a data repository; a telecommunications-link between the user device and the server; and a plurality of computer codes embodied on the memories of the user device and the server, the plurality of computer codes which when executed causes the server and the user-device to execute a process comprising the aforementioned steps.

In yet another aspect, the present invention is a computerized server comprising at least one processor, a memory, and a plurality of computer codes embodied on the memory, the plurality of computer codes which when executed causes the processor to execute a process comprising the aforementioned steps.

Yet other aspects of the present invention include the methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIGS. 19A, 19B, 19C, and 19D are exemplary screenshots for reporting celebrity sightings within a system implemented according to one embodiment of the present invention.

FIGS. 21A and 21B are exemplary screenshots of a notifications page, according to one embodiment of the present invention.

FIG. 27 is a set of exemplary screenshots showing several pages for celebrity rating, according to one embodiment of the present invention.

DETAILED DESCRIPTION OF THE INVENTION

Definitions

Figure 1:
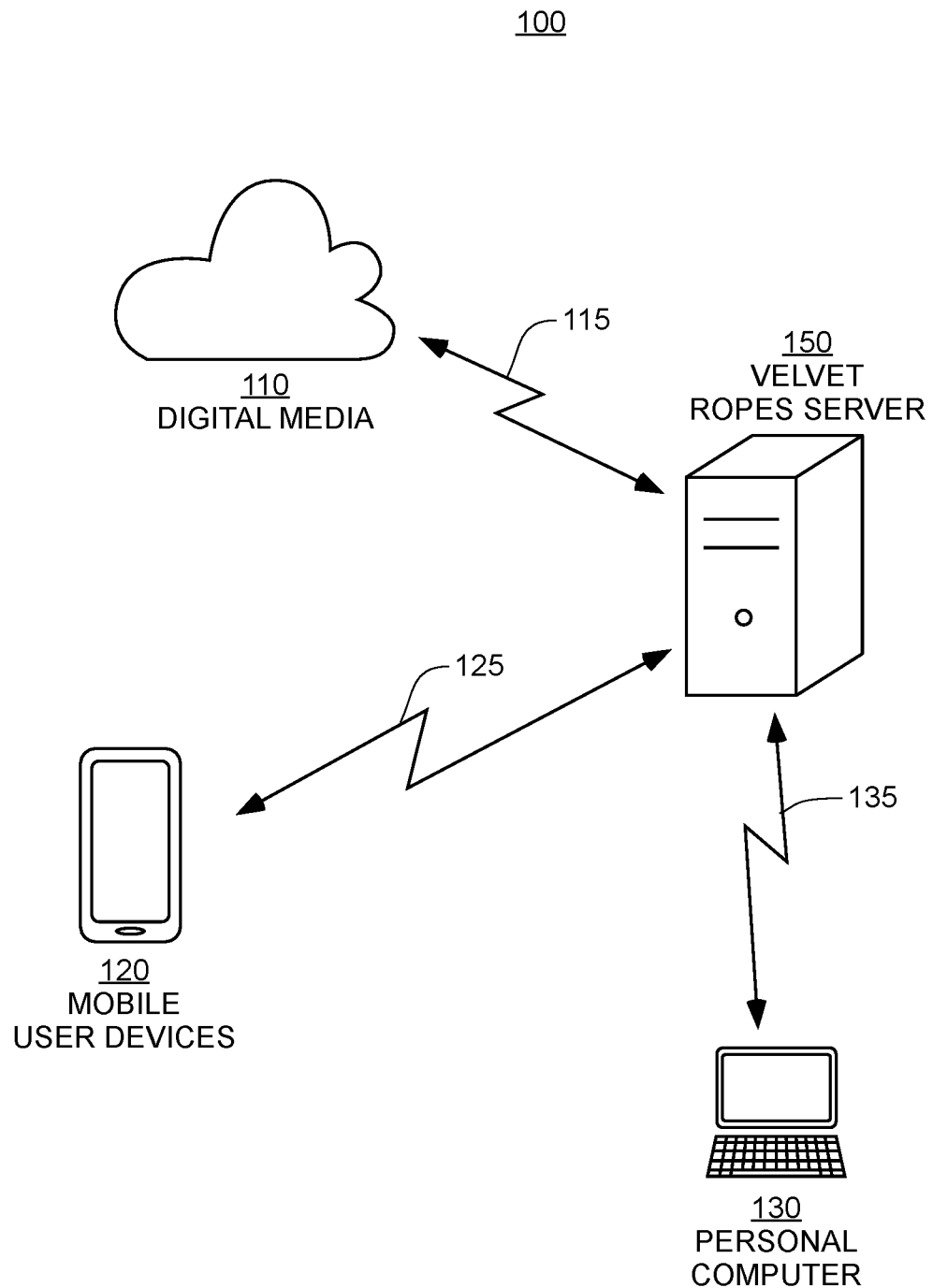
FIG. 1 is a schematic diagram of a network configuration for practicing one embodiment of the present invention.

Some illustrative definitions are provided to assist in understanding the present invention, but these definitions are not to be read as restricting the scope of the present invention. The terms may be used in the form of nouns, verbs, or adjective, within the scope of the definitions.

"Celebrity" refers to a person well known to the public, or those who are often associated with fame and attention in the media. Groups of people, animals, or even fictional characters can also achieve celebrity status. Some examples of celebrities include, but are not limited to, entertainment stars, pro-athletes, artists, musicians, models, fashionistas, political figures, royalty, best-selling authors, prominent scientists, and international entrepreneurs. A legacy, legend, or legendary celebrity is one who is deceased.

"User geolocation" is a geographical location associated with a user of the system, according to some embodiments of the present invention. A user geolocation may be explicitly given by the user, as a street address, a named place, a local landmark, or a postal address or postal code. A user geolocation may also be determined automatically by a Global Positioning System (GPS) device, or other types of devices, modules, or software capable of determining the associated geographical location through triangulation or similar types of algorithms. A user geolocation may be represented by a street address, a named place, a local landmark, a postal address or postal code, or a set of geographic coordinates as determined by a GPS system.

"Celebrity geolocation" is a geographical location associated with a celebrity within a system implemented according to some embodiments of the present invention. A celebrity geolocation associated with a particular celebrity may refer to any locations or places where the celebrity may have lived, worked, visited, or even mentioned during shows, interviews, or in other types of media, including social media. Some exemplary types of celebrity geolocations include residences and other real estate properties owned or leased by the celebrity, sighting locations where the celebrity has been seen, and hotspots such as gyms and restaurants that the celebrity frequents. A celebrity geolocation may be associated with a street address, a named place, a local landmark, a postal address or a postal code, and may be determined automatically by a global positioning system. A celebrity geolocation with the same address or geographical coordinates may be associated with multiple celebrities. A celebrity geolocation may also be referred to as a "celebrity location" or a "celebrity place."

"Celebrity sighting" is the event where a celebrity is seen by one or more members of the public. A celebrity sighting may also be referred to as a "celebrity spotting." Generally, a celebrity sighting is associated with a celebrity name, a sighting location, and a sighting time.

"Celebrity hotspots" are popular places that celebrities frequently visit, and where celebrity sightings often take place. Some exemplary hotspots include hotels, bars, clubs, lounges, restaurants, fashion shops, gyms, jogging routes, etc. Celebrity hotspots may further refer to locations where celebrities have made appearances, or filmed movies or shows. A celebrity hotspot may be a celebrity sighting location concurrently.

"Tour" or "curated tour" is a route that traverses one or more celebrity geolocations, with navigation directions provided in a sequential order starting from a given location. Each designated celebrity place on a tour may be annotated by associated profile information, either for the real estate property itself, or for a celebrity owner or celebrity visitors.

Overview

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention relate to systems and methods for generating an interactive digital celebrity map tour guide, thus enabling celebrity seekers, or users of the system, to visit celebrity places of interest based on their preferences, and to report and receive notifications on celebrity sightings. A digital celebrity map may be displayed through a client application on a user device such as a smart phone, a tablet, or a personal computer. On the other hand, celebrity related databases, and tour generation or sighting verification algorithms may reside on one or more dedicated servers, possibly hosted in the cloud. Embodiments of the present invention allow a user of the system to search for and navigate to celebrity places or geolocations such as residences, sighting locations, and hotspots. The user may bookmark or favorite celebrities and celebrity geolocations, and browse through celebrity profiles as well as lists of different types of celebrity geolocations. In addition, a celebrity-inspired social network platform is provided for users to check-in at celebrity locations they visit, to report, confirm, or verify celebrity sightings, and to receive sighting notifications in real-time. Users may also rate celebrities or participate in other celebrity-focused polls.

More particularly, in a system implemented according to one embodiment of the present invention, a user's own position or geolocation is placed on a digital map displayed through a client application installed on a user device. Celebrity places or geolocations within a map area surrounding the user geolocation are then retrieved from celebrity databases hosted on a server, and displayed accordingly. If celebrities associated with the displayed celebrity geolocations are unfamiliar to the user, the user may choose to browse associated celebrity profiles or real estate listings to obtain more information.

Once celebrity geolocations are displayed in the celebrity map, a user may choose to follow one of several curated or guided tours. Such curated tours may be pre-defined, or customized according to filtering criteria selected by the user. For example, the user may wish to see the most number of celebrity homes within the proximity of his or her own geolocation. Alternatively, the user may wish to create a personalized tour of all types of celebrity geolocations associated with a selected set of favorite celebrities. Tour generation algorithms located in the server send tours generated according to user-selected or default filtering criteria to the user device, and navigation directions may be drawn on the map directly or described textually as step-by-step instructions. Some exemplary filtering criteria include celebrity name, celebrity status, celebrity rating, celebrity geolocation type, and distance of a celebrity geolocation from the user geolocation.

In addition to displaying celebrity geolocations and generating customized celebrity tours, the inventors of the present invention have created methods and systems that allow users to check-in at celebrity geolocations, thus recording a user history of being physically present at popular celebrity spots. The user may further browse through lists of recent celebrity sightings and report their own sightings of celebrities, where such sighting reports may comprise images and comments. User-generated sighting reports may be cross-checked or verified by other users, where each user may be associated with a trust or credibility score, a periodically updated metric measuring how likely a celebrity sighting reported by the user is credible. Celebrity sighting reports are also pulled from digital media sources available on the Internet. Celebrity sighting reports from both digital media sources and from users of the system are collected by the central server, and notifications may be broadcasted in real-time to remind users of potential celebrity sightings near them.

Apart from celebrity sighting reports, the inventors of the present invention have also created methods and systems to rate celebrities in terms of their general star power, popularity, influence, talent, bankability, or even notoriety, to create real-time celebrity standings based on both current and historical data. Such a celebrity rating system enables the user to pick up on new and upcoming stars, to find celebrities who have been popular for extended periods of times, and to search for celebrities who are in trend for one or more particular reasons.

To ensure celebrity maps, curated celebrity tours, celebrity sightings, and celebrity ratings thus provided to the user are as accurate and timely as possible, embodiments of the present invention periodically extract celebrity-related news from a diverse selection of digital media sources and social networking websites to initiate, update, and maintain various data repositories. For example, one feature of the present invention is its ability to plug into social media APIs such as Google News API to search for reports of celebrity sightings and add them as historical sightings to celebrity repositories.

VELVET ROPES is a trademark name carrying embodiments of the present invention, and hence, the aforementioned trademark name may be interchangeably used in the specification and drawing to refer to the products/services offered by embodiments of the present invention. The term VELVET ROPES may also be used in this specification to describe the overall system and processes of the invention, as well as the company that provides such services. With reference to the figures, embodiments of the present invention are now described in detail.

System Architecture

FIG. 1 shows a schematic diagram of a network configuration 100 for practicing one embodiment of the present invention. Digital media source 110 may be connected to a VELVET ROPES server or platform 150 through communication link or network 115. Digital media source 110 includes both traditional media outlets and social media websites. Some exemplary digital media sources include, but are not limited to, TMZ, JustJared, PerezHilton, Facebook, Twitter, Photobucket, Flickr, and Instagram. VELVET ROPES server 150 periodically retrieves celebrity news and other celebrity-related information from digital media source 110, to initiate, update, and maintain its celebrity data repositories.

Moreover, VELVET ROPES server 150 receives user requests and uploads from VELVET ROPES client applications installed on user devices 120 and 130. In return, VELVET ROPES server 150 provides celebrity maps, generated celebrity tours, as well as other related information in the downlink direction. Mobile user devices 120 are connected to VELVET ROPES server or platform 150 through communication link 125, while personal computers 130 are connected to VELVET ROPES server or platform 150 through communication link 135. A mobile user device may be a smart phone, a tablet, a portable GPS navigator, a dedicated hand-held device, or a wearable device, such as a watch or smart glasses. A personal computer may refer to a desktop computer, a laptop computer, or a user terminal.

Communication links 115, 125, 135 may be wireless or wired, and may employ technologies and protocols comprising Ethernet technology, Local Area network (LAN), Wide Area Network (WAN), an optical network, and the like.

More specifically, VELVET ROPES server 150 is a platform for storing celebrity databases, for providing navigation directions and curated tours to user devices, and for providing celebrity related information and notifications to user devices, possibly in real-time. In some embodiments, VELVET ROPES Server 150 is a distributed system. For example, databases and processing algorithms may be located on different devices, and tour generation, sighting verification, and celebrity rating may also be implemented separately. Alternatively, different celebrity data repositories may be implemented to serve users from different geographical areas separately. A Hollywood server and a New York City server may each contain distinctive celebrity information in addition to shared data and algorithms. In some embodiments, VELVET ROPES server 150 is hosted in the cloud. In some embodiments, VELVET ROPES server 150 may be partially or fully implemented directly on a user device, such as a mobile user device or a personal computer. Although local installations of the VELVET ROPES server may remove remote connectivity requirements in the network configuration 100, local installations of the VELVET ROPES server 150 may be subjected to additional software or hardware constraints.

Figure 2:
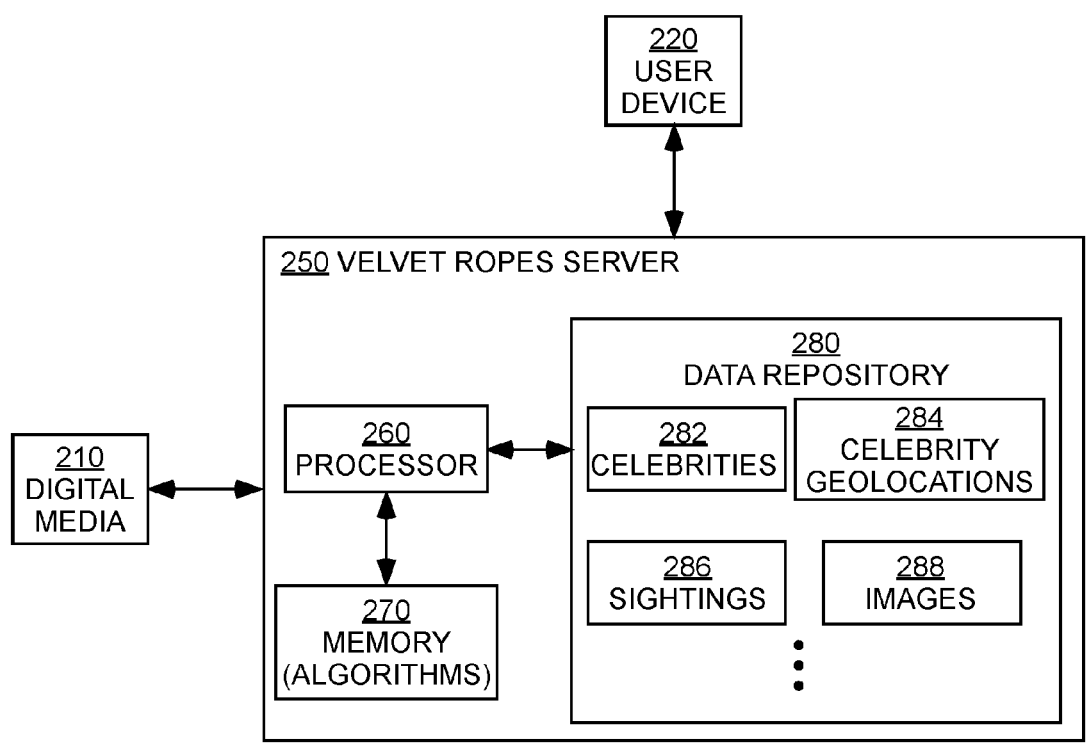
FIG. 2 is a schematic diagram of a server for creating a celebrity map tour guide, according to one embodiment of the present invention.

FIG. 2 is a schematic diagram 200 of a VELVET ROPES server 250 for creating a celebrity map tour guide, according to one embodiment of the present invention. In this embodiment, VELVET ROPES server 250 comprises a processor 260, a memory 270 that stores program code implementing the invention, and data repository 280 containing linked databases. In some other embodiments, VELVET ROPES server or platform 250 may be alternatively hosted in the cloud, instead of being implemented as a dedicated server. VELVET ROPES server 250 is responsible for retrieving celebrity news and other related celebrity information from digital media 210 to update and maintain data repository 280. VELVET ROPES server 250 further receives user uploads and requests from user device 220, while also providing mapping information, navigation directions, curated tours, celebrity related information, and notifications to user device 220. In some embodiments, VELVET ROPES server 250 also provides user-reported celebrity information including sighting information to digital media 210. For example, user-reported celebrity sightings that have been verified or confirmed may be posted by the VELVET ROPES system to a social media platform such as Twitter.

Data repository 280 within VELVET ROPES server 250 is comprised of multiple databases, each individually indexed and organized according to the type of contents contained, and all inter-related or linked through celebrity identities or other key values. Four exemplary databases shown in this particular embodiment of the invention are celebrities database 282, celebrity geolocations database 284, sightings database 286, and images database 288. In some embodiments, data repository 280 may further include a user database for storing user information and comments, an image source database for storing image metadata including photographer or publisher names, a ratings database for storing celebrity rating information, and other similar databases for organizing relevant celebrity-related information.

Celebrity database 282 contains records or profiles of celebrities past and present. A celebrity refers to a person well known to the public, or those who are often associated with fame and attention in the media. Groups of people, animals, or even fictional characters can also achieve celebrity status. Some examples of celebrities include, but are not limited to, entertainment stars, pro-athletes, artists, musicians, models, fashionistas, political figures, royalty, best-selling authors, prominent scientists, and international entrepreneurs. A legacy, legend, or legendary celebrity is one who is deceased. A celebrity profile may contain any personal and/or professional information regarding a given celebrity. For instance, a celebrity profile may include information on the celebrity's early life, career, personal life, filmography, awards received, and future projects. Such celebrity profiles may be stored explicitly within celebrity database 282, or may be linked through celebrity database 282 to some external digital media source 210, such as Wikipedia. Furthermore, celebrity profiles may include real estate properties currently or previously owned by the celebrity. One of such real estate properties may be identified as a primary residence.

Celebrity geolocations database 284 contains different types of celebrity geolocations or places, each linked with one or more celebrities within celebrities database 282. A celebrity geolocation is a geographical location associated with one or more celebrities. A celebrity geolocation associated with a particular celebrity may refer to any geographical locations where the celebrity may have lived, worked, visited, or even mentioned during shows, interviews, or in other types of media, including social media. Some exemplary celebrity geolocations include residences and other types of real estate properties owned or leased by the celebrity, sighting locations where the celebrity has been seen, and hotspots that the celebrity frequents. Celebrity hotspots are popular places that a celebrity frequently visits, and where celebrity sightings often take place. Some exemplary celebrity hotspots include hotels, bars, clubs, lounges, restaurants, fashion shops, and gyms. Celebrity hotspots may further refer to locations where celebrities have made appearances, or filmed movies or shows. In other words, a celebrity hotspot may also be a celebrity sighting location. Each celebrity geolocation is associated with either an explicit address, or a set of geographical coordinates that can identify the physical location or position of the place. In addition, depending on its type, each celebrity geolocation may be associated with different categories of profile information. For example, a celebrity residence record may be associated with one or more celebrities who have been past or present owners or tenants, and may further contain information such as costs of the residence during past transaction, current listing price, last purchase price, monthly mortgage based on last purchase price, year the residence was built or remodeled, number of bathrooms and bedrooms contained, current realtor, descriptions of unique and distinguishing interior features, and even any urban legends connected to the place. On the other hand, a celebrity sighting location may be associated with a list of sighting records stored in sightings database 286, each containing at least a celebrity name and a sighting time. A celebrity sighting location may also be associated with summary statistics such as the number of distinct celebrity sightings that has occurred as this location, and any additional trivia information on the location itself. Similarly, a celebrity geolocation record for a celebrity hotspot may be linked to multiple celebrities within celebrities database 282, while also containing information on the total number of visits each associated celebrity has paid to the place.

As previously discussed, sightings database 286 contains records of celebrity sightings, or celebrity spottings. A celebrity sighting is an event where a celebrity is seen by one or more members of the public. Each celebrity sighting within sightings database 286 is associated with at least a celebrity name, a sighting location, and a sighting time. In some embodiments, a celebrity sighting may also be associated with the original reporting source of the sighting, images of and comments on the sighting, news reports or reviews on the event, or any other graphical or textual information relevant to the sighting event.

Images database 288 contains images of celebrities, celebrity geolocations, and celebrity sightings. Images database 288 may further contain user uploaded avatars. Images stored in images database 288 may be obtained by VELVET ROPES server 250 through image retrieval algorithms from different types of digital media source 210, or by user uploads through user device 220. Images thus organized may further include image metadata such as when the image was taken, name of celebrity captured, name of the photographer, publisher, or the user who has uploaded the image, and a classification for image content and characteristics. For example, one classification scheme may categorize an image into a portrait image of a celebrity, a sighting image, an inside view of a celebrity residence, or a panorama view of a celebrity hotspot. Another classification scheme may categorize images according to its size, resolution, and the type of camera used.

Although not shown explicitly in schematic diagram 200, celebrities database 282, celebrity geolocations database 284, sightings database 286, and images database 288 are linked and may be managed concurrently by a database management system, possibly implemented through processor 260 and memory 270. For example, real estate properties stored in celebrity geolocations database 284 are each identified with one or more celebrities within celebrity database 282. Celebrities database 282 may also contain relational tables linking past and present owners and tenants to the same house within celebrity geolocations database 284. As an explicit example, if Christina Aguilera used to live at one particular residence but Steve Hermann lives there now instead, celebrities database 282 should be capable of providing such information to a user who is browsing this particular celebrity geolocation. In other words, when examining a particular celebrity residence, the user should be able to find out who lives there now, and who used to live there, while when searching for a particular celebrity, the user should be able to find both current and former residences for the celebrity.

Although shown as separate entities within FIG. 2, in some embodiments, one or several databases within data repository 280 may be logically merged and implemented jointly. On the other hand, when VELVET ROPES server 250 is hosted in the cloud, data repository 280 may be physical distributed across multiple devices, with individual databases residing on separate storage mediums, while still linked logically regardless of their physical locations.

Figure 3:
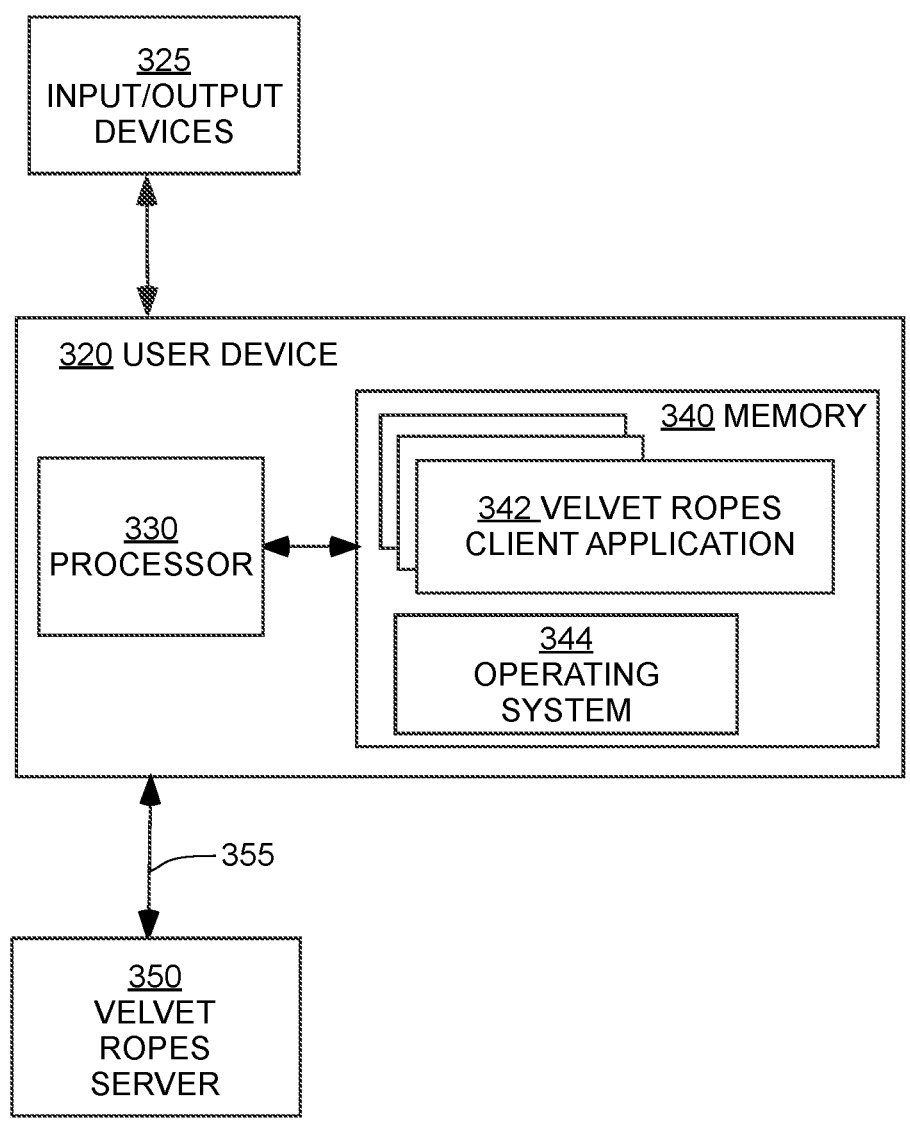
FIG. 3 is a schematic diagram of a user device where the invention may be practiced, according to one embodiment of the present invention.

FIG. 3 is an embodiment of a user device 320 wherein the invention may be practiced. In this particular embodiment, user device 320 comprises a processor 330, a memory 340 containing a VELVET ROPES client application 342 and an operating system 344, and at least one input/output device 325. User device 320 is connected through a wired or wireless network connection 355 to VELVET ROPES server 350. User device 320 may also be referred to as a client device, a computing device, a computing appliance, or a user-operated device. It is generally in the form of a laptop, a desktop, a tablet, a smartphone, or the like. In some embodiments, VELVET ROPES client application 342 is a plug-in or add-on to existing digital map applications instead of a standalone application. VELVET ROPES client application 342 provides a user interface to users of the VELVET ROPES system to access services provided by the present invention.

Digital Celebrity Map and Celebrity Tour Generation

Figure 4:
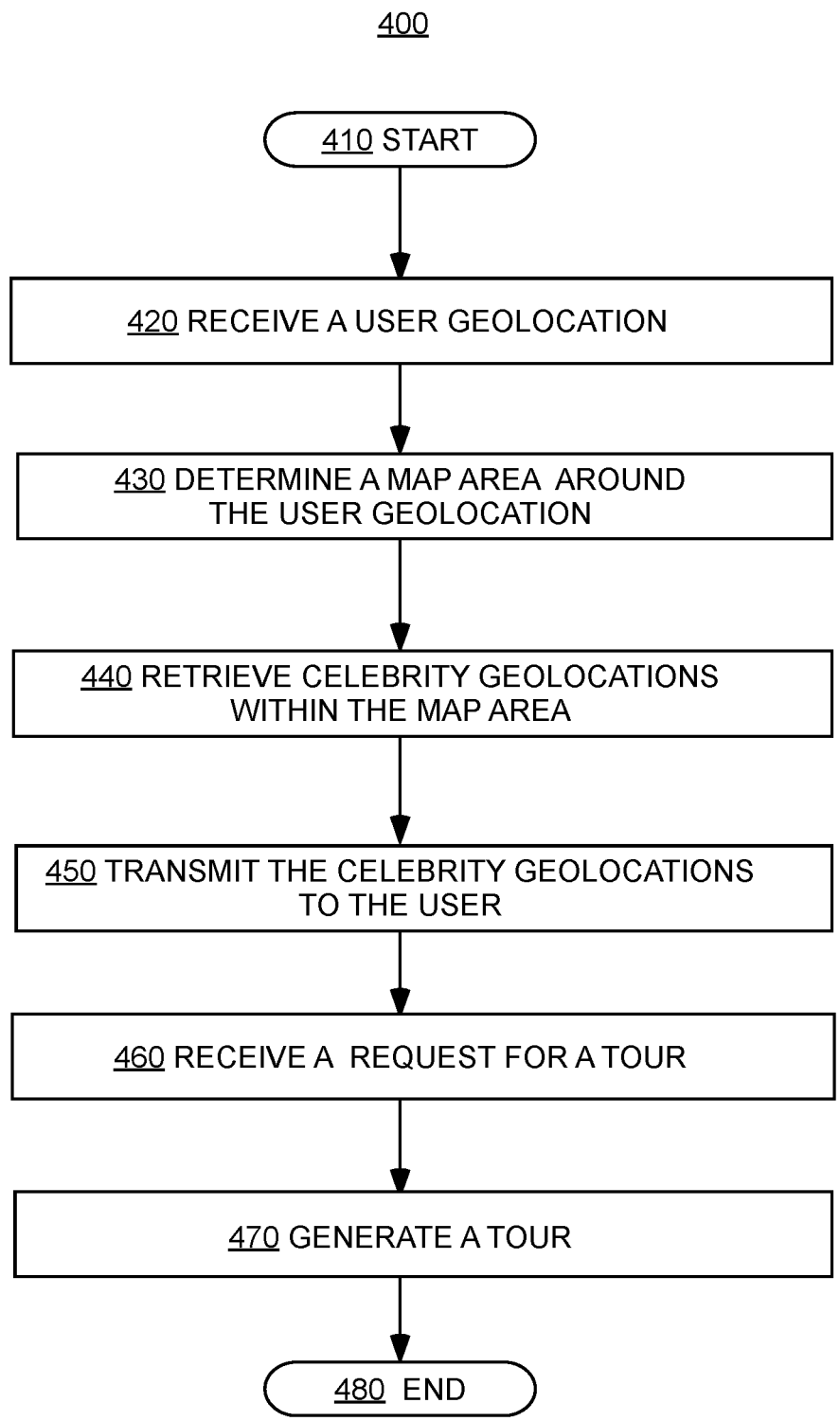
FIG. 4 is a flow diagram showing a method of generating a celebrity map tour from a user geolocation, according to one embodiment of the present invention.

FIG. 4 is a user flow diagram 400 showing a method of generating a celebrity tour based on a user geolocation. A user geolocation is a geographical location associated with a user of the VELVET ROPES system. A user geolocation may be explicitly given by the user, through a VELVET ROPES client application located on a user device, as a street address, a local landmark, or a postal address, or the like. A user geolocation may also be determined automatically by a GPS module on the user device, or any other types of modules, devices, or algorithms capable of determining geographical locations through triangulation or similar positioning algorithms. Alternatively, the locator may reside on a VELVET ROPES server 250, which receives approximate address inputs or location information from the user device, and further processes such information to resolve the user geolocation. A tour, curated tour, or tour guide is a route that traverses one or more celebrity geolocations, with navigation directions provided in a sequential order starting from a given location. Each designated celebrity place on a tour may be annotated by associated profile information, either for the real estate property itself, or for a celebrity owner or celebrity visitors.

Once a VELVET ROPES server 250 receives or resolves a user geolocation at step 420, the VELVET ROPES system automatically determines a map area around the given user geolocation at step 430. In some embodiments, the map area has a default radius around the given user geolocation, customized according to the display interface and display scale of the user device. In other embodiments, the map area is determined according to user selected travel modes. Celebrity geolocations within the map area are subsequently retrieved from VELVET ROPES data repository 280 at step 440, and transmitted to the user device at step 450, for display in graphical or textual form on the user device through a VELVET ROPES client application 342. Celebrity geolocations may be pre-filtered by VELVET ROPES server 250 or VELVET ROPES application 342 to ensure the celebrity map display is legible. Once a user selects a set of celebrity geolocations to visit, a request for a tour is received by VELVET ROPES server 250 at step 460. A tour is generated subsequently at step 470, and the overall process terminates at step 480. The generated celebrity tour may be sent to and displayed on the user device, so that the user may follow corresponding navigation directions to visit celebrity geolocations of interest to them.

In some embodiments of the present invention, VELVET ROPES server 250 comprises routing or tour generation algorithms that create a best tour path from the user geolocation through multiple celebrity geolocation destinations. Such algorithms determine optimal routes with respect to some predetermined metrics such as distance or travel time, subject to constraints on transportation modes and traffic conditions. An optimal tour path for driving may differ from an optimal tour path for biking or walking, depending on elevation changes and preferred road conditions. In such embodiment, mapping data may be stored internally, or external to the VELVET ROPES system. In some other embodiments, VELVET ROPES server 250 interfaces with external mapping APIs maintained by professional mapping service providers to obtain optimal tour paths.

Although not shown explicitly in FIG. 4, in some embodiments of the present invention, the method of generating a celebrity tour further comprises steps to receive a report of a celebrity sighting from a user, to determine whether a credibility score of the user is above a threshold, and if so, add the received celebrity sighting to the VELVET ROPES data repository as an unverified sighting. In some other embodiments, the method of generating a celebrity tour further comprises steps to send a verification request to multiple users with an area around the location of the celebrity sighting, to receive one or more responses to the verification request from the multiple users, and to update the credibility score of the reporting user according to the received responses to the verification request. In yet some other embodiments, the method of generating a celebrity tour further comprises steps to receive an updated user geolocation, to update the map area according to the updated user geolocation, to determine whether at least one celebrity geolocation exists within the updated map area, and if so, to transmit a notification to the user.

Figure 5:
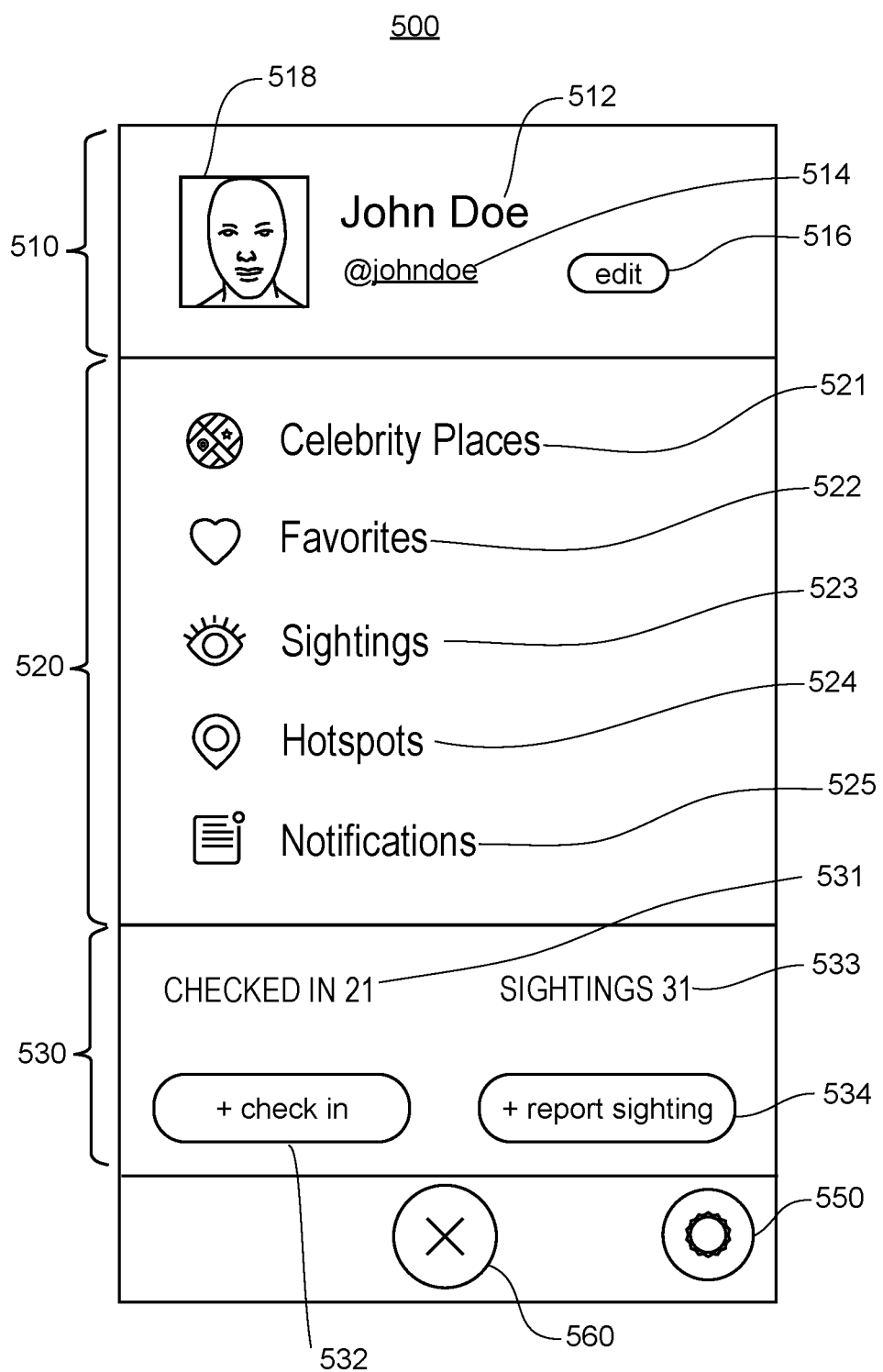
FIG. 5 is an exemplary screenshot of a menu page of a user application implementing one embodiment of the present invention.

FIG. 5 is an exemplary screenshot of a menu page 500 for a VELVET ROPES client application 342, according to one embodiment of the present invention. Menu page 500 may be a home page personalized for the user, after the user successfully logs into the system.

Menu page 500 includes a user information panel 510, a links panel 520, a quick access panel 530, a global settings option 550, and an exit option 560. User information panel 510 displays full user name 512, username or handle 514, user avatar 518, and edit option 516. Similar to general social networks, username or handle 514 can be used to call out, mention, or follow the user, to send the user a message, or to link to the user's profile and favorites. In some embodiments, a hyperlink with username 514 leads to a separate display page where public user profile can be viewed, thus allowing users with similar celebrity preferences to find and befriend each other if desired. User avatar 518 is a user-uploaded image, and may be used as a map marker to indicate a user geolocation in a digital celebrity map. Edit option 516 may link to a separate page for user information update and verification. In some embodiments where a user can access the VELVET ROPES system without having an account or explicitly logging in, user information panel 510 may further include options for retrieving help, for signing up for service, and for logging into the service.

Links panel 520 provides hyperlinks 521 to a celebrity places page, 522 to a favorites page, 523 to a sightings page, 524 to a hotspots page, and 525 to a notifications page, each of which will be described in more detail hereafter with respect to subsequent figures.

Quick access panel 530 facilitates user check-in and sighting reports. In some embodiments, invocation of hyperlink option 531 leads to a list of places where the user has previously checked-in. Each check-in may be associated with a time, geolocation, an image, or user comments. In this particular embodiment, the user has checked in at 21 places. Similarly, invocation of hyperlink option 533 may lead to a list of celebrity sightings the user has reported, each with associated time, location, celebrity name, or images and comments. In this particular embodiments, the user has reported 31 celebrity sightings. Additionally, invocating option 532 allows the user to check in at his or her current location, while invocating option 534 allows the user to report a current celebrity sighting.

Global settings option 550 and exit option 560 are general purpose setting configuration options. In some embodiments, global settings option 550 brings up a settings page for the VELVET ROPES client application, allowing the user to modify general preferences such as user profile, display formats, language for the application interface, location and privacy service on the user device, or management of cache memory. Exit Option 560 may allow the user to close the menu page 550 and view a celebrity map directly.

Figure 6:
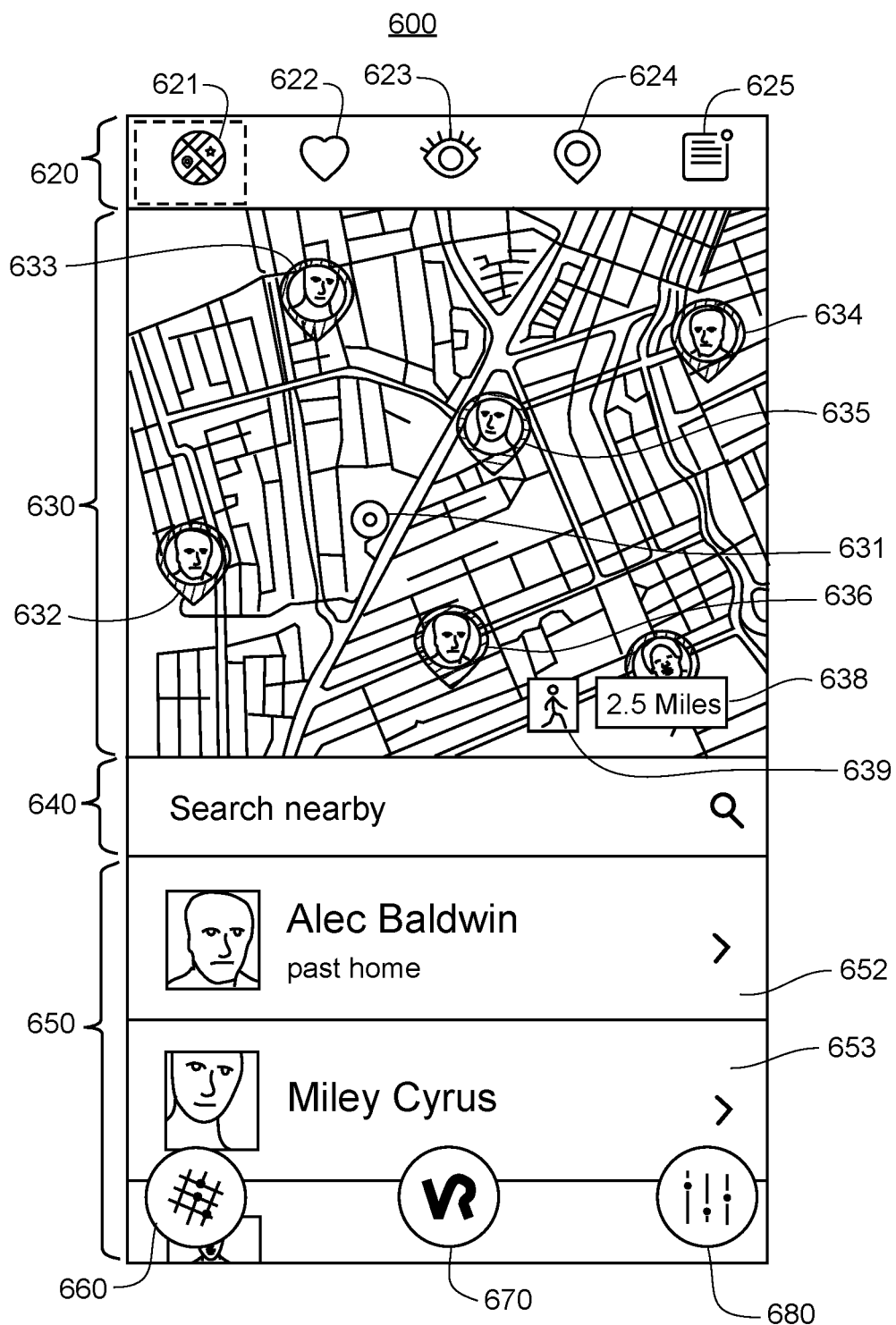
FIG. 6 is an exemplary screenshot of a celebrity places page containing a celebrity map, according to one embodiment of the present invention.

FIG. 6 is an exemplary screenshot of a celebrity places page 600 containing a celebrity map, implemented according to one embodiment of the present invention. Page 600 includes a navigation panel 620 with a clickable row of tabs. Tab 621 is highlighted here and links to the current page, tab 622 links to the favorites page, tab 623 links to the sightings page, tab 624 links to the hotspots page, and tab 625 links to the notifications page. Map panel 630 shows the user's own position or geolocation 631, together with celebrity places as represented by various celebrity avatars. Search panel 640 allows the user to search for celebrity places near his or her own location, while results panel 650 lists celebrities who are currently shown in map panel 630.

In some embodiments, celebrity places or celebrity geolocations refer to celebrity residences or homes only. In other embodiments such as the one shown in FIG. 6, celebrity places or celebrity geolocations include celebrity residences, sighting locations, hotspots, or any other types of geolocations associated with one or more celebrities. In this example, six celebrity places are drawn with celebrity avatars, although other location markers such as colored or shaped pins may be used as well. Furthermore, each celebrity avatar may be encircled with distinctive colors or shades to indicate differences in the types of these celebrity places. For example, an avatar for Alec Baldwin at celebrity place 632 may be encircled with one color to indicate that he once lived here, but no longer owns this home at this particular location. An avatar for Miley Cyrus at celebrity place 633 may be encircled with another color to indicate that this is a current home for her. Correspondingly, items 652 and 653 within results panel 650 show celebrity names Alec Baldwin and Miley Cyrus, with a single-line preview of information on celebrity places 632 and 633. In the case where both past and present owners of a residence are celebrities, the present owner's avatar may be displayed within celebrity map 630, or the list of owners may be checked against the user's favorites so that the avatar of the celebrity of most interest to the user is displayed instead. In some embodiments where a touchscreen is available on a user device, an item within results panel 650 may be removed or hidden by a swiping gesture, and the corresponding avatar within map panel 630 would be removed as well.

Additionally, an avatar for Marilyn Monroe shown for celebrity place 635 may be encircled with a third color or shade to indicate that it was owned by a legacy celebrity, who is now deceased. An avatar for Morgan Freeman shown at celebrity place 634 may be encircled with a fourth color or a shade to indicate that it is a hotspot that Morgan Freeman likes to stop by. As celebrity hotspots are often public venues visited by not just one but many celebrities, in some embodiments, hotspot 634 may be labeled with a pin instead of an avatar, or an avatar of the place itself rather than the avatar of visiting celebrities. Invocating a linked item within results panel 650 corresponding to hotspot 634 may then lead to a list of celebrities who have paid visits to this place before. Moreover, an avatar for Tom Hiddleston shown at celebrity place 636 may be encircled with yet another color or shade to indicate that this is a place where Tom Hiddleston has made appearances and has been sighted by the media or the public.

While celebrity map 630 may be displayed automatically when celebrity places page 600 is opened by the user, such automatic display may depend on default values set by the VELVET ROPES system, or by the user. For example, a walking figure shown as icon 639 indicates that the user prefers to view a map area traversable on foot within a reasonable amount of time, while label 638 specifies a 2.5-mile radius around the user geolocation 631 for drawing the map area. In some embodiments of the VELVET ROPES system, transportation mode may be selected by clicking on icon 639, and map area 630 would change in scale accordingly. Similarly, the size of the map area may be changed explicitly by selecting option 638.

To generate celebrity map 630, the user device on which a VELVET ROPES client application resides first determines user geolocation 631, through a dedicated hardware positioning module, or through positioning algorithms implemented on the user device. User location information, together with other optional inputs such as map radius and dominate transportation modes are uploaded to a VELVET ROPES server, which in turn searches through one or more databases within its data repository to determine celebrity places within the map area, for display within celebrity map 630 and results panel 650. Similarly, when a search is requested by the user through search field 640, the search request is sent and processed by the VELVET ROPES server. Depending on the number of celebrity places found within the map area, the VELVET ROPES server or the VELVET ROPES client application may intelligently filter search results, so that the map display is legible. Alternatively, a full list of search results may be sent back to the VELVET ROPES client application, for listing within results panel 650, while only a selected set of celebrity places is displayed graphically within map area 630. In some embodiments, the user may click on individual items within results list 650, and only selected celebrity places are displayed within map panel 630.

Figure 9:
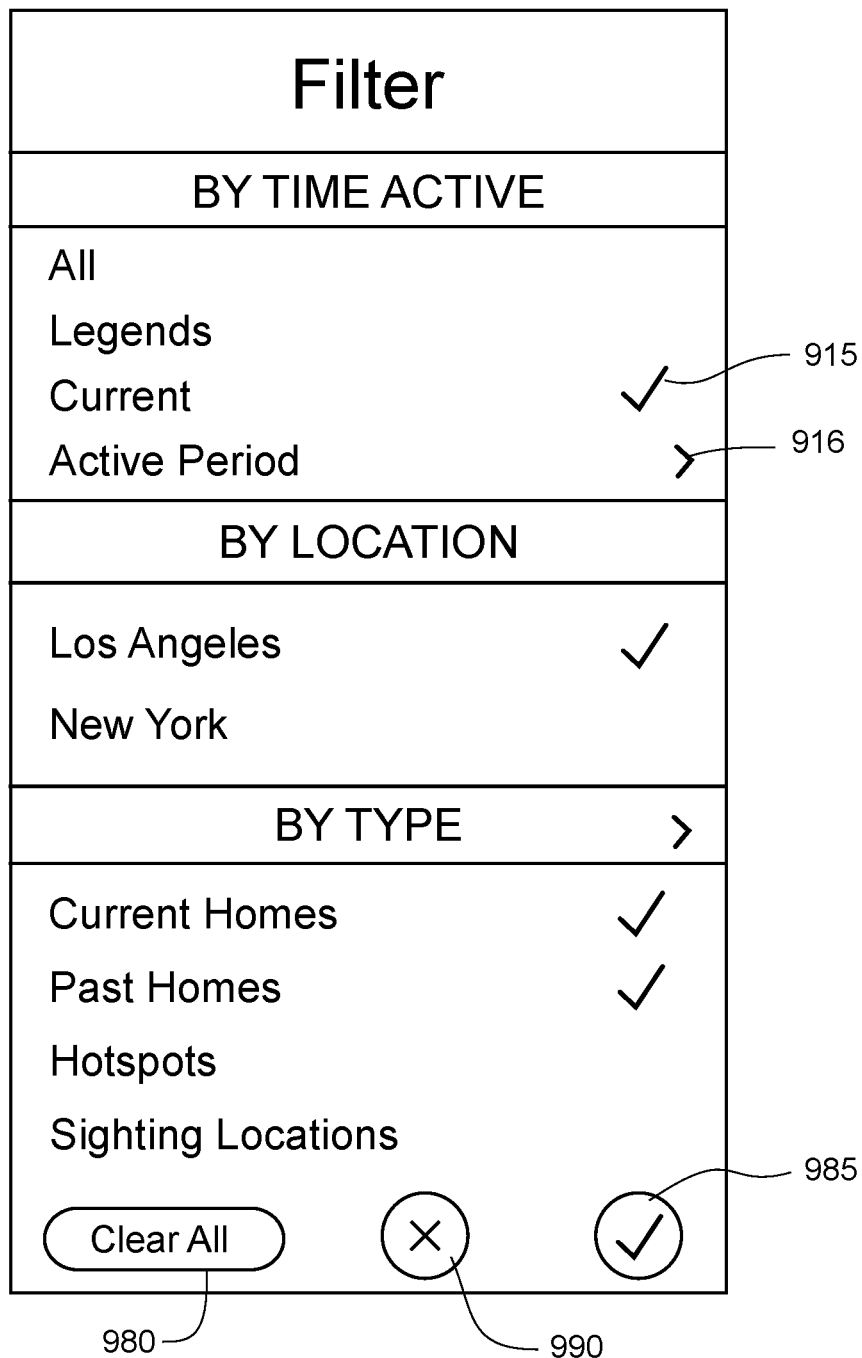
FIG. 9 is an exemplary screenshot of a filter page for filtering available celebrity places for a celebrity tour, according to one embodiment of the present invention.

Although not shown explicitly in FIG. 6, items in the results panel 650 may be scrolled up and down, thus allowing access to the full list within a limited display screen. Moreover, in this embodiment of the invention, there are three floating buttons 660, 670 and 680 located at the bottom of the celebrity places page 600. Invoking tour button 660 leads to a tours page 700 as shown in FIG. 7, engaging the user to select or set criteria for automatically generating a tour to celebrity places displayed within map 630; invoking menu button 670 takes the user back to menu page 500 shown in FIG. 5; invoking filters button 680 takes the user to an interface 900 as shown in FIG. 9 for filtering celebrity places displayed within map 630.

Figure 7:
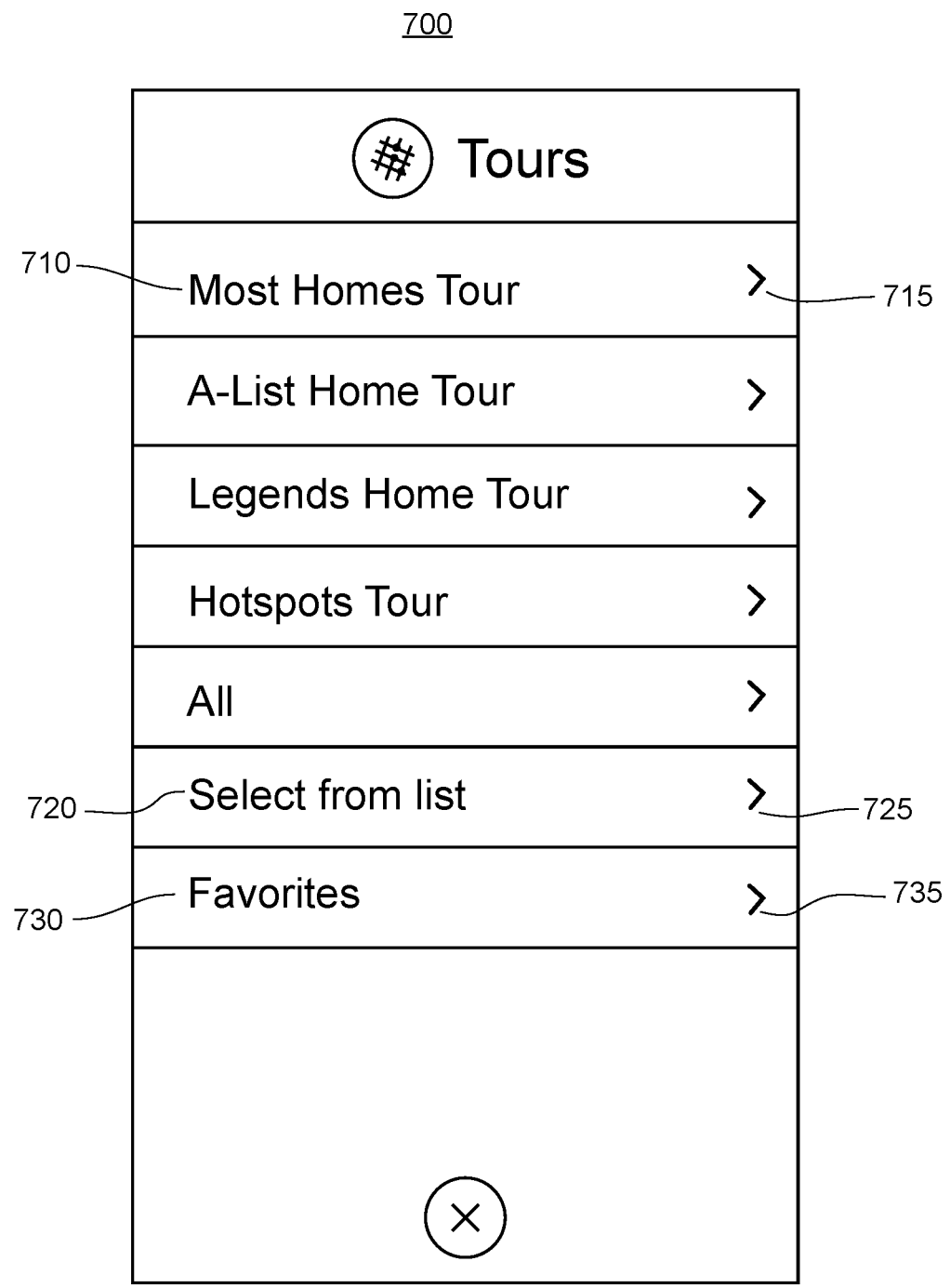
FIG. 7 is an exemplary screenshot of a tours page for customizing a celebrity tour, according to one embodiment of the present invention.

FIG. 7 is an exemplary screenshot of a tours page 700, for defining a celebrity tour according to one embodiment of the present invention. Through tours page 700, the user may select a criterion for automatically generating a celebrity tour. For example, item 710 represents a most homes tour, where the largest number of celebrity residences shown in celebrity map 630 are included. Clicking on arrow 715 may take the user to a navigation page 800 as will be described subsequently with respect to FIG. 8.

Similarly, the user may choose to see an A-List home tour where residences belonging to only A-List stars are included, a legends home tour where residences belonging to only deceased celebrities are included, a hotspots tour that covers only celebrity hotspots, or an all places tour, which includes all celebrity places displayed within map 630. In addition, the user may click on arrow 725 within the Select from list option 720, and choose from the list of celebrity places in results list 650. The user may also click on arrow 735 within Favorites option 730 to choose celebrity places that the user has previously bookmarked, or places belonging to celebrities whom the user has previously bookmarked.

In this particular embodiment, once a tour criterion is selected by the user, the VELVET ROPES server generates a celebrity tour accordingly, with the user's current geolocation as the starting point. The generated tour is transmitted to the VELVET ROPES client application on the user device and displayed graphically within a celebrity map. In some other embodiments, the VELVET ROPES system may provide pre-defined tour routes starting from and ending at popular landmark locations, similar to existing bus tours. Such pre-defined tours may have a general theme, or cover a set of most popular celebrity places, and may be periodically updated to reflect current trends. For example, a Marvel celebrity tour in Hollywood may cover places related to celebrities who have played roles in Marvel's superhero movies; a Democrats tour in Washington D.C. may start from the Capital Hill and cover places related to political celebrities from the Democratic party; a teen pop tour in Atlanta may cover places related to teen pop stars who have made it to Billboard 100 in the past year. Such pre-defined tours may be pre-loaded into the VELVET ROPES client application, thus enabling offline tours when the user does not have network access.

In yet some other embodiments, a celebrity tour may be modified from pre-defined tours stored in the VELVET ROPES server. For example, a hotspots tour for celebrity places near a popular destination such as Hollywood Boulevard may be requested by many celebrity seekers everyday. Instead of repeatedly running routing algorithms, the VELVET ROPES server may simply modify an existing tour according to the requesting user's geolocation by adjusting the starting point and the order in which different celebrity places are visited. In some embodiments, such pre-defined tours are also pre-loaded into the VELVET ROPES client application, with tour modifications performed within the client application as well, again enabling offline tour generation when the user does not have network access.

As discussed previously with respect to FIG. 4, a VELVET ROPES server may contain independent routing algorithms that determine a best celebrity tour path that minimizes a given cost function such as travel distance or time, subject to constraints on travel model and traffic conditions. A VELVET ROPES server may also interface with external mapping APIs maintained by professional mapping service providers to obtain optimal tour paths.

Figure 8:
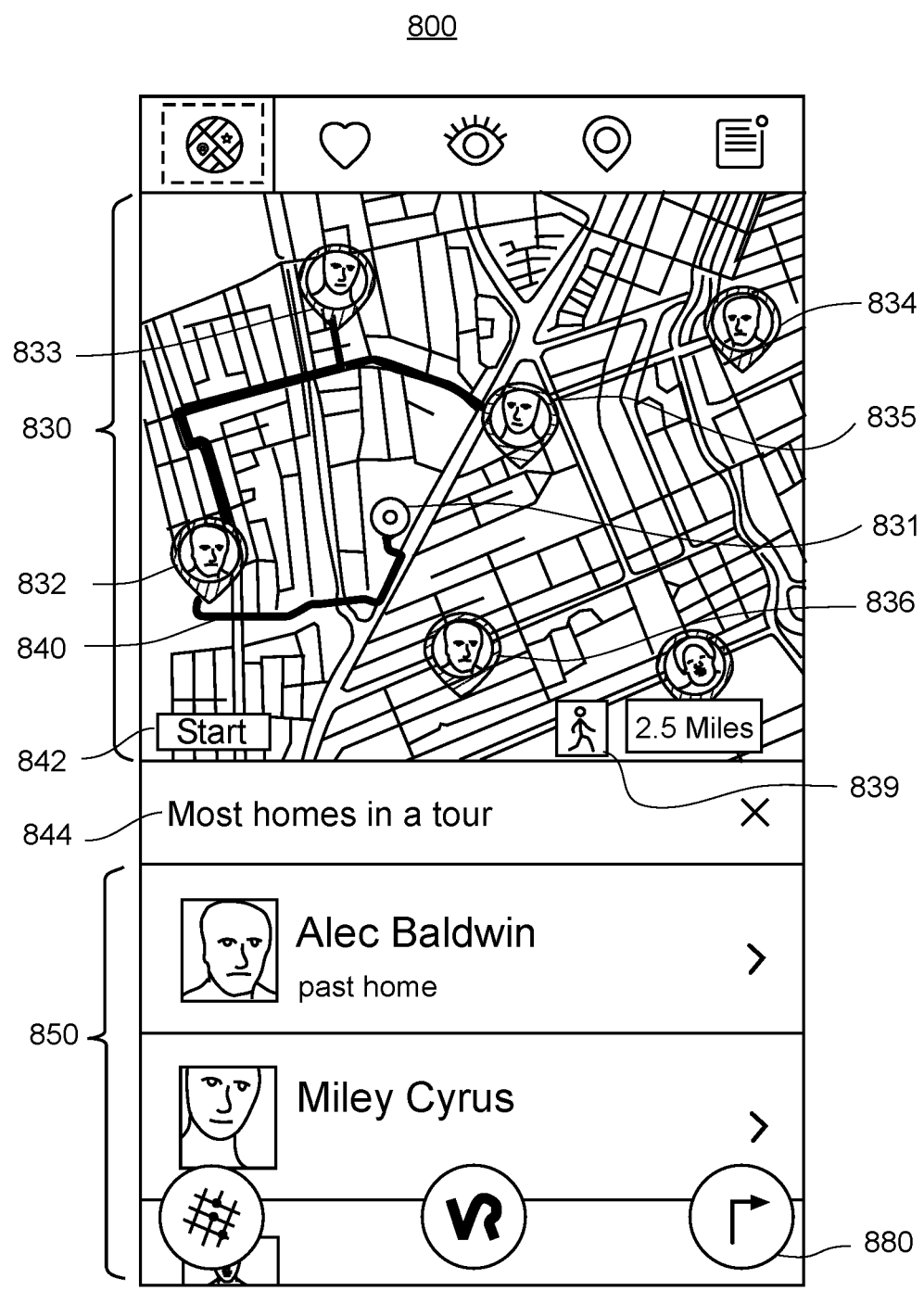
FIG. 8 is an exemplary screenshot of a celebrity places page where a tour path is displayed graphically, according to one embodiment of the present invention.

FIG. 8 is an exemplary screenshot of a celebrity places page 800 where a tour path 840 for a most homes tour is displayed graphically, according to one embodiment of the present invention. In this example, celebrity hotspot 834 and sighting location 836 are excluded from this particular tour since they are not celebrity residences. In some examples, a sighting location may also be a celebrity residence.

Figure 10:
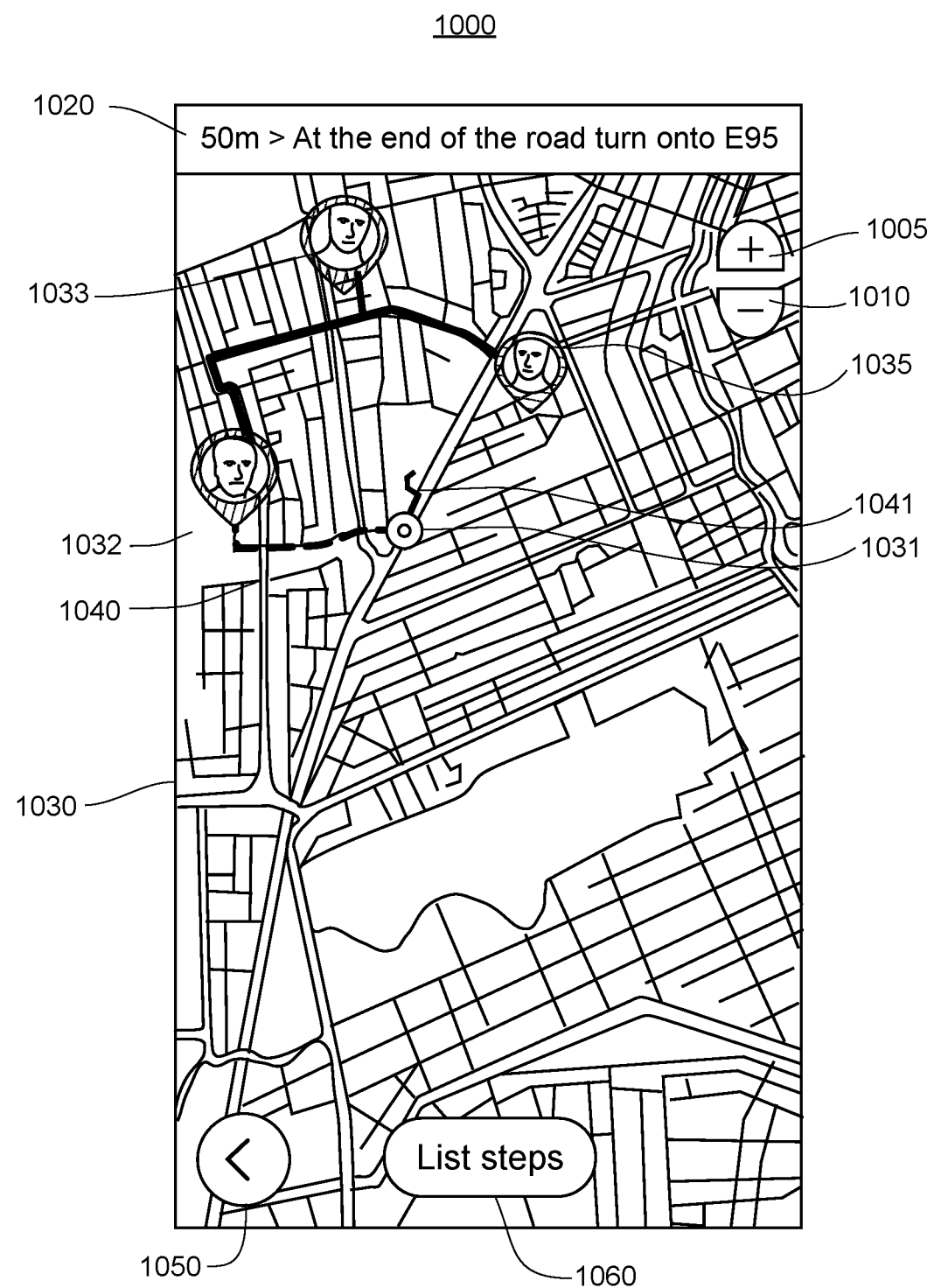
FIG. 10 is an exemplary screenshot of a full page display of a celebrity map tour, according to one embodiment of the present invention.

As the user chooses a most homes tour 710 from tours page 700, tour path 840 is drawn graphically within the map 830 to take the user from his or her current geolocation 831, to the three celebrity homes within the map area. Display panel 844 indicates the type of tour selected, while icon 839 shows that the user has chosen to take the tour on foot. Observe that tour path 840 traverses from the user's current geolocation 831 to celebrity residence 832, 833, and 835, in this particular order. An alternative tour path going from the user's current geolocation 831 to celebrity residences in the order of 835, 833, and 832 would cover approximately the same distance, although the end location for the two tours are different. Thus, in some embodiments, multiple tour paths may be presented to the user using different colors or shades within map area 830, with one tour path considered as the default, and the user may click on any portion of a tour path to select that particular path for use. Once a particular tour path is selected, celebrity places list 850 is updated accordingly, so that celebrity places are arranged according to their orders within the tour path. Clicking start button 842 then initiates a navigation process, where a full page view of the celebrity map may be displayed as shown in FIG. 10.

FIG. 9 is an exemplary filter page 900 for filtering celebrity places within a given map area, according to one embodiment of the present invention. In cities such as Hollywood and Beverly Hills where celebrity places are very dense, even a small map area can contain a large number of celebrity places. Although the VELVET ROPES system may intelligently filter the set of all celebrity places within a given area, filter page 900 allows the user to pick and choose celebrity places to be displayed. For example, celebrity places may be filtered by active time for the celebrity, where a celebrity may be a legacy, legend, or legendary celebrity or a currently active celebrity. The user may also choose a particular active period for the celebrity, thus enabling customized searches for celebrities who were popular in the past but may have become inactive in the industry. Clicking on arrow 916 may invoke a pop-up calendar for the to user to choose a desired active period. In this particular example, the user has chosen to see only currently active celebrities, as indicated by checkmark 915. Nonetheless, the choices are not mutually exclusive.

Additionally, the user may choose to filter celebrity places by a general geographical location, for example, between Los Angeles and New York. Such a feature may be useful in embodiments where celebrity databases are implemented according to different geographical areas. Such a feature may also be useful in cases where data repositories within the VELVET ROPES server are downloaded by geographical area for local offline use by the VELVET ROPES client application. The user may further choose to filter celebrity places by type, where for example, homes currently and previously owned by a celebrity are selected for display.

As part of filter page 900, option 980 allows the user to remove all filtering criteria, while option 985 confirms filer selections, and option 990 closes the filter page.

FIG. 10 is an exemplary screenshot of a full page view of a navigation map page 1000, with a selected tour path embedded according to one embodiment of the present invention. Clicking on start button 842 within celebrity places page 800 may activate this navigation map. Observe that map area 1030 is larger than map area 830, although both are drawn with the same scale. In some embodiments, map area 1030 is scaled automatically to maximize the clarity of the tour path itself Additionally, zoom buttons 1005 and 1010 enable the user to view the navigation map at a scale appropriate to the size of the display screen and according to user preferences. In some embodiments where the user input device includes a touchscreen, the user may pinch or un-pinch the map to scale accordingly.

In this particular embodiment, next step panel 1020 displays the next navigation direction to be followed by the user. Map marker 1031 indicates the current user geolocation, as determined in real-time by the user device. The dashed portion 1040 of the tour path indicates the progress of the tour by referring to the currently traversed fragment of the tour path, from the current user geolocation to the next upcoming celebrity place. By comparison, solid portions of the tour path refer to other path fragments, which may include those that have already been traversed, such as path fragment 1041. When the user does not correctly follow the navigation directions, the VELVET ROPES system is capable of rerouting the user to the next celebrity place, or regenerating the tour entirely, starting from the user's new geolocation. Observe that the problem of routing to the next celebrity place is the same as finding an optimal path from the current location to a single destination.

As part of navigation map page 1000, option 1050 may return the user to celebrity places page 700, while the List steps option 1060 takes the user to view step-by-step navigations directions in detail, as shall be discussed next.

Figure 11:
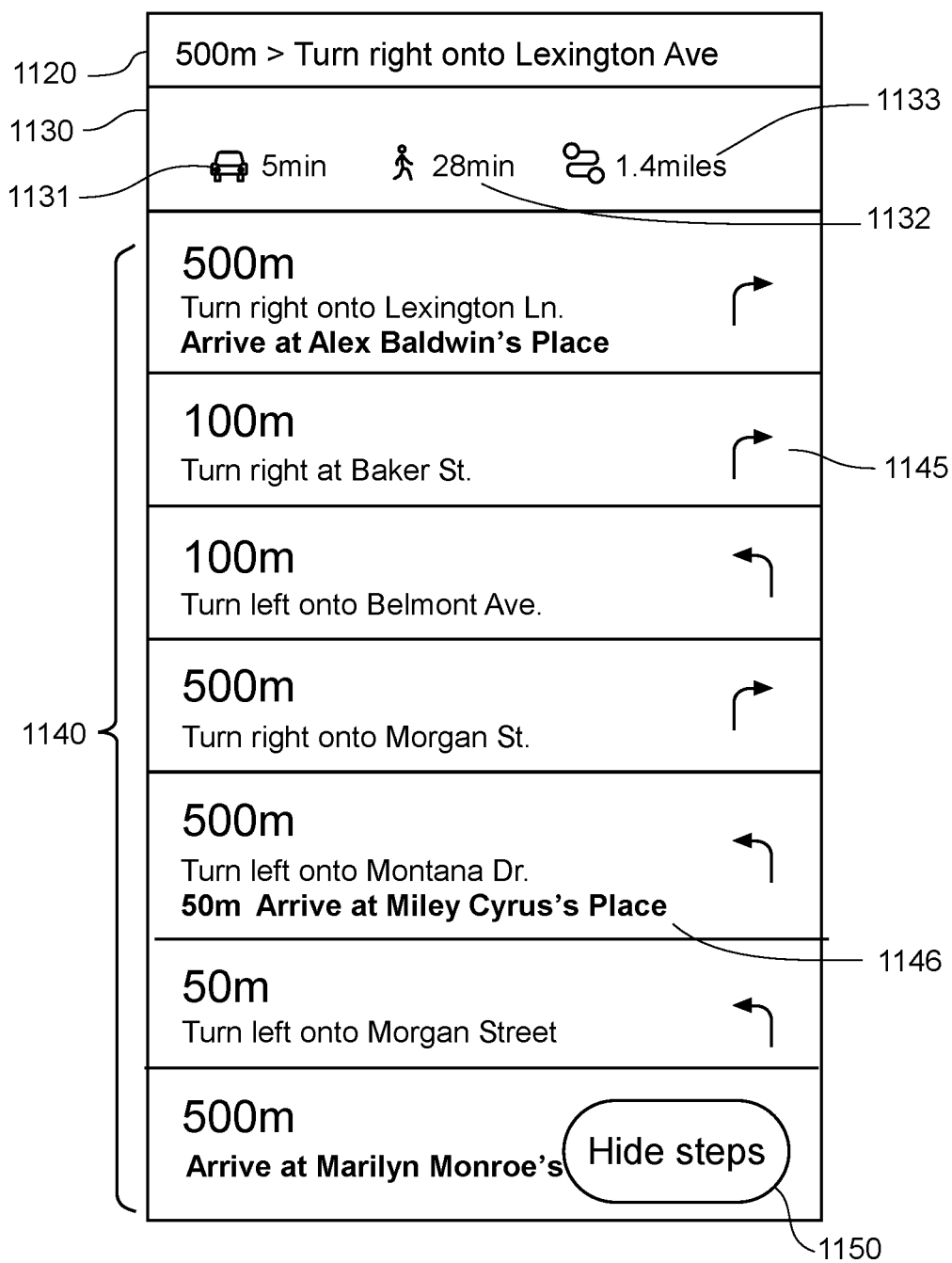
FIG. 11 is an exemplary screenshot of a navigation directions page, according to one embodiment of the present invention.

FIG. 11 is an exemplary screenshot of a navigation directions page 1100 presented to the user as a result of tapping a "List steps" link on navigation map page 1000. Navigation directions page 1100 provides step-by-step directions to celebrity places within the selected tour. While a next step panel 1120 prompts the user on how to proceed next, a related information panel 1130 provides information on the entire celebrity tour. For example, label 1131 indicates that the overall celebrity tour would take 5 minutes to drive through without stopping, label 1132 indicates that the overall celebrity tour would take 28 minutes on foot, again without stopping at any of the locations, while label 1133 indicates that the tour covers 1.4 miles in distance. Such summary estimates allow the user to adjust his or her itinerary if necessary. Alternatively, in some embodiments, related information panel 1130 provides information on the next celebrity place on the tour. Thus, labels 1131, 1132, and 1133 refer to travel times and distance to the next stop on the tour, instead of the last home that ends the tour. More importantly, navigation directions page 1100 includes a directions panel 1140, listing travel directions as well as distances in between the sequence of turning points. As there are multiple destinations within the tour, statement such as 1146 are provided to indicate when a particular celebrity place will be reached. Additionally, visual cues such as arrow 1145 are also provided for upcoming turns, and option 1150 is provided for hiding this navigation directions page 110 to return to the map view instead.

Figure 12A:
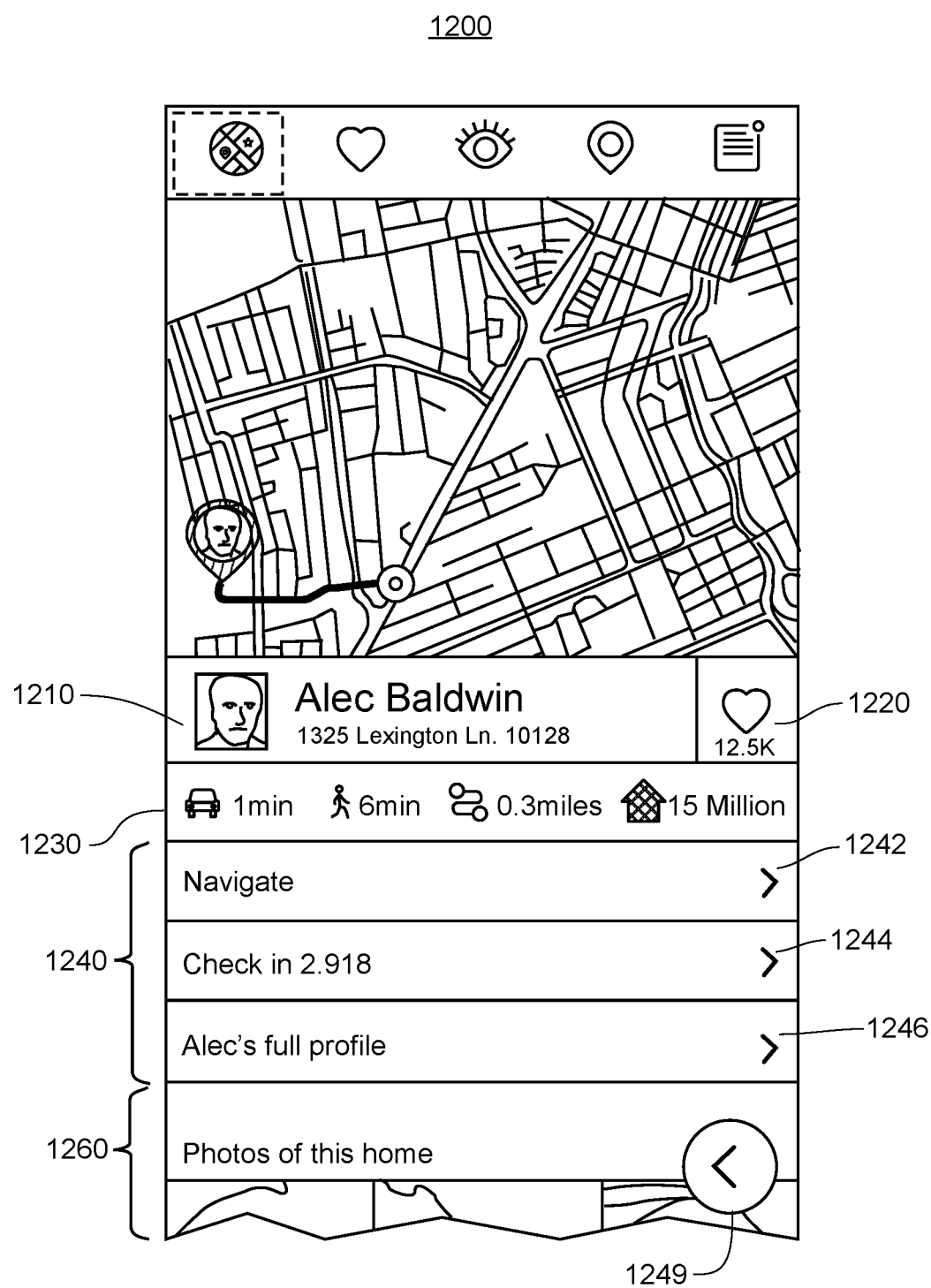
FIGS. 12A and 12B are exemplary screenshots of a selected celebrity place page, according to one embodiment of the present invention.
Figure 12B:
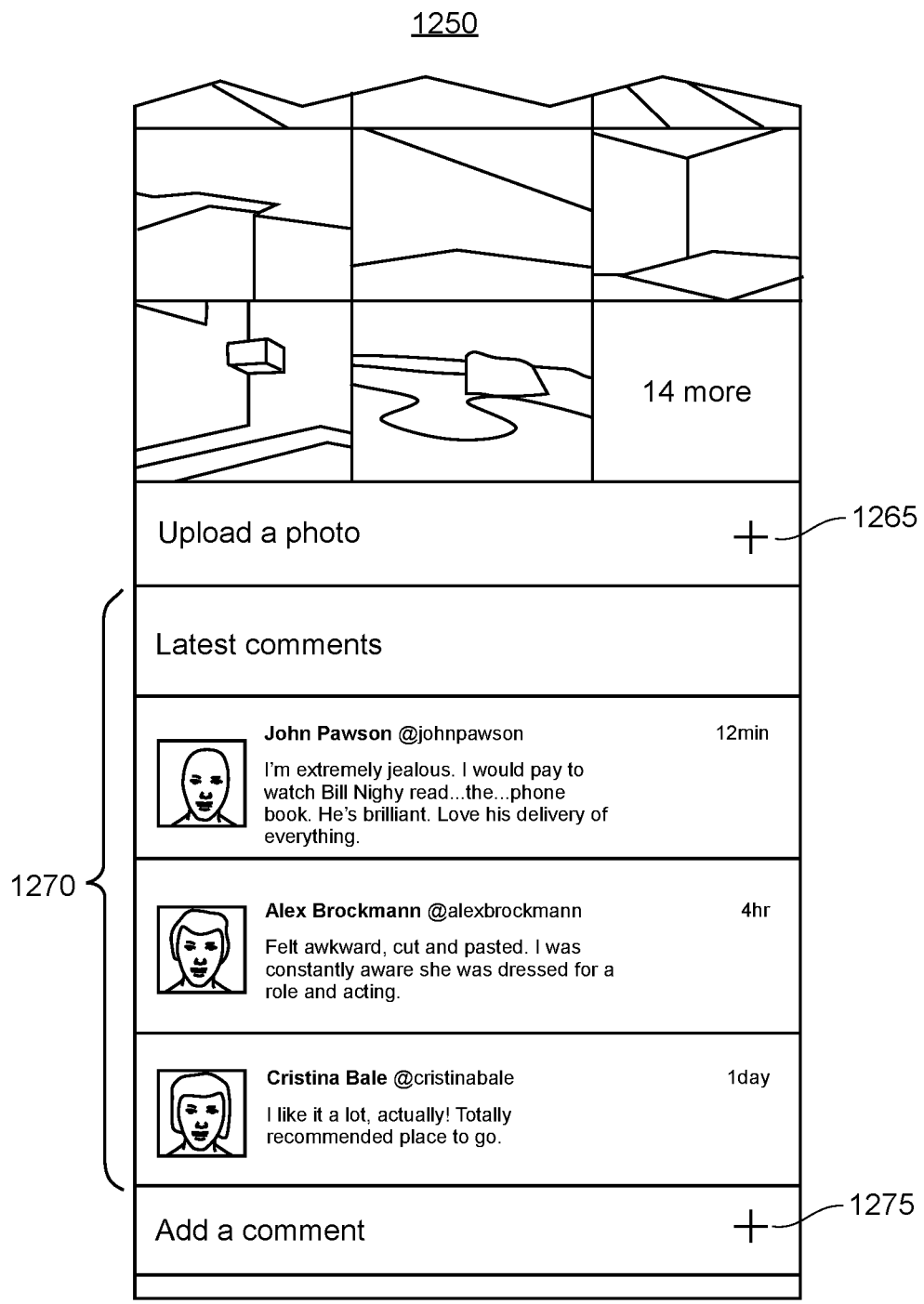

FIGS. 12A and 12B are exemplary screenshots of a selected celebrity place page, accessible through any celebrity map or celebrity places list. When a celebrity avatar or map marker pin is chosen by the user on a celebrity map, or when items in a celebrity places list such as 650 or 850 is selected, information on the corresponding celebrity place may be presented to the user in a scrollable page as shown in two parts 1200 and 1250 here. Correspondingly, tapping on a return option 1249 may return the user to the previous page.

In some embodiments, various panels are provided in the selected celebrity place page, in addition to a map view with or without routing information staring from the current user geolocation. In this particular example shown in FIGS. 12A and 12B, a celebrity information panel 1210 shows a photo for the celebrity associated with this celebrity place, as well as the name of the celebrity and an address for the place. A favorite button 1220 allows the user to bookmark this particular location for future views. In some embodiments, a like button may be available, for a user to like or vote for a celebrity such as Alec Baldwin here, a house, a picture of a celebrity, or any individual pictures of a house. In addition, if the selected place is associated with multiple celebrities who have been past owners or tenants, some or all of the celebrity names may be listed within celebrity information panel 1210.

Related information panel 1230 provides abbreviated information on the selected celebrity place. In this particular example, travel times and the current valuation for the house is shown. Other trivia information that may be displayed within related information panel 1230 include, but are not limited to, travel distance, year built, number of bedrooms and baths, square footage, price per square foot, price for last purchase, monthly mortgage based on price for last purchase, whether the home is listed for sale, or even whether the place has a swimming pool or tennis court. In some embodiments, related information panel 1230 may be scrollable from left to right, or be expandable with a dropdown list, such that more trivia information can be displayed within the panel on a limited display device.

Links panel 1240 provides a list of relevant links on the selected celebrity place and the one or more celebrities associated with the place. A navigation option 1242 leads to a navigation view such as shown in FIG. 10, or an explicit navigation page such as shown in FIG. 11. A Check-in option 1244 indicates that 2,918 check-ins has been submitted to the VELVET ROPES system at this location, and further allows the present user to check-in at this place if desired. In some embodiments, selecting option 1244 leads to a list of hyperlinked users in chronological or alphabetical order, so the present user may see who has checked in at this particular location at what time, their comments if any, and when the most recent check-ins has occurred. The present user may even exchange private messages with other users who has just checked-in at this celebrity place to see if there are tips on where to find the best view for taking photographs of the place. Moreover, a celebrity profile option 1246 leads to a full profile page for the current celebrity, as will be describe with reference to FIG. 13. When multiple celebrities are associated with the selected place, there may be multiple celebrity profile links correspondingly.

As photographs are the best way to preview a tourist attraction, a photos panel 1260 links to a photo gallery of the selected celebrity place. Photos within the gallery may be stored in and loaded from an image database within a VELVET ROPES data repository. Each photo may have been submitted by a professional photographer, an individual user of the system who have visited the selected place before, or may have been collected by the VELVET ROPES system from online digital media sources. A user may upload his or her own photo of this place by selecting the add option 1265.

Although user comments may be accessible through check-in option 1244 in some embodiments of the present invention, in some other embodiments, past user comments may be be displayed in chronological order directly within a comments panel 1270, as shown in page 1250. The present user may also add his or her comments by selecting the add comments option 1275.

Figure 13:
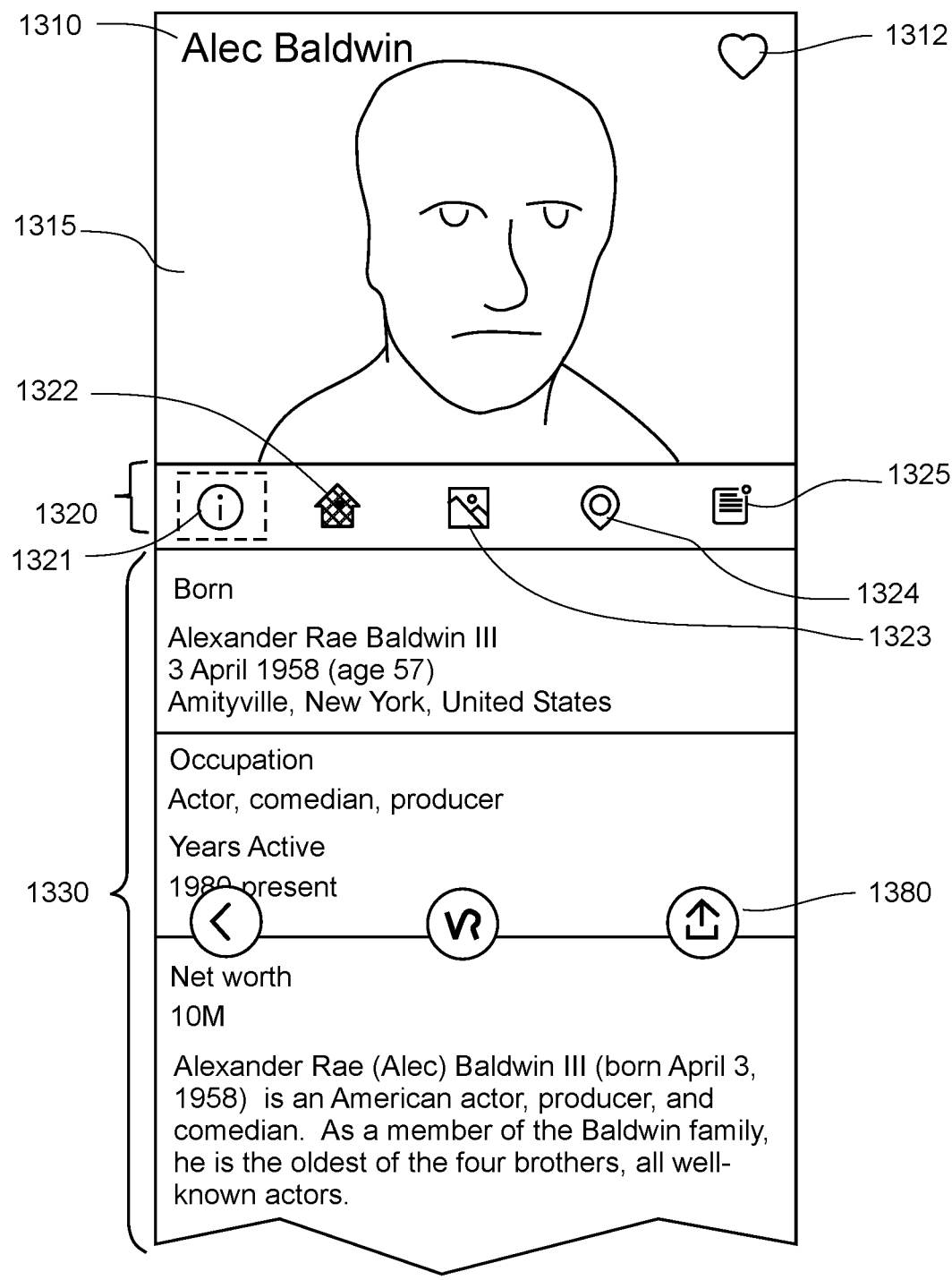
FIG. 13 is an exemplary screenshot of a celebrity profile page, according to one embodiment of the present invention.

FIG. 13 is an exemplary screenshot of a celebrity profile page 1300. In some embodiments, celebrity profiles are accessible through a celebrity profile option such as 1246, or through a favorite list. In this particular example, the celebrity's full name 1310 Alec Baldwin is displayed at the top of the page, and an image for Alec Baldwin is displayed correspondingly within celebrity profile photo panel 1315. Such profile photos may be stored in a celebrities or images database within a VELVET ROPES data repository. A favorite button 1312 allows the user to bookmark this particular celebrity for future views.

Menu panel 1320 includes a row of clickable tabs, each providing access to appropriate information on the celebrity of interest, Alec Baldwin. In this example, about tab 1321 is highlighted. Correspondingly, personal and professional information on Alec Baldwin are displayed within information panel 1330. Celebrity profile information thus displayed may be stored explicitly within and loaded from a VELVET ROPES celebrity database. Alternatively, celebrity profiles may be loaded from external media sources such as Wikipedia. Additionally, homes tab 1322 may invoke the display of a list of homes owned by Alec Baldwin, as shall be described with respect to FIG. 14. Photos tab 1323 links to a full photo gallery, hotspots tab 1324 links to a list of Alec Baldwin's hotspots, while feed tab 1325 links to a stream feed on news, comments, and notifications regarding Alec Baldwin. Furthermore, floating icon 1380 allows the user to upload his or her own photos for the celebrity.

Figure 14:
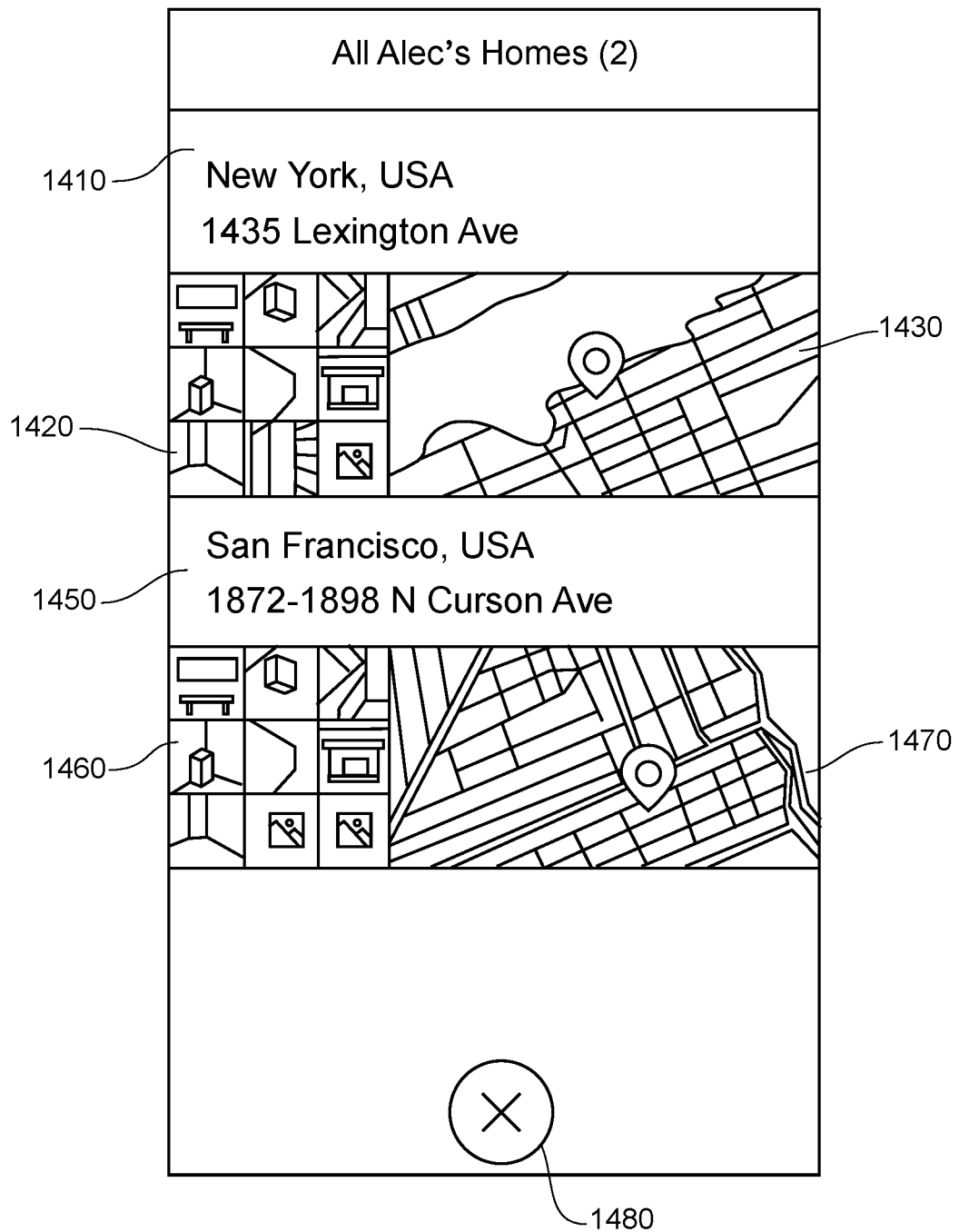
FIG. 14 is an exemplary screenshot of a celebrity homes page, according to one embodiment of the present invention.

FIG. 14 is an exemplary screenshot of a celebrity's homes page 1400, accessible through homes tab 1322, according to one embodiment of the present invention. In this example, all residential properties previously or currently owned by Alec Baldwin are listed. Information panels 1410 and 1450 provide explicit addresses for Alec's homes, with corresponding map previews 1430 and 1470, and photo gallery previews 1420 and 1460. In some embodiments, more facts and features are provided for each property through the information panels. For example, price estimates, ownership history, transaction history, year built, square footage, number of bedrooms and baths, and nearby schools and neighborhoods may all be itemized into a real estate profile for display here. In cases where the celebrity owns not only residential real estates but also commercial properties such as restaurants, bars, and hotels, page 1400 may be viewed as a real estate page instead of a homes page, and may contain additional corresponding information such as purchase date, business type and hours, specialty services provided, and the like. Option 1480 closes the page 1400 and returns the display to celebrity profile page 1300.

Figure 15:
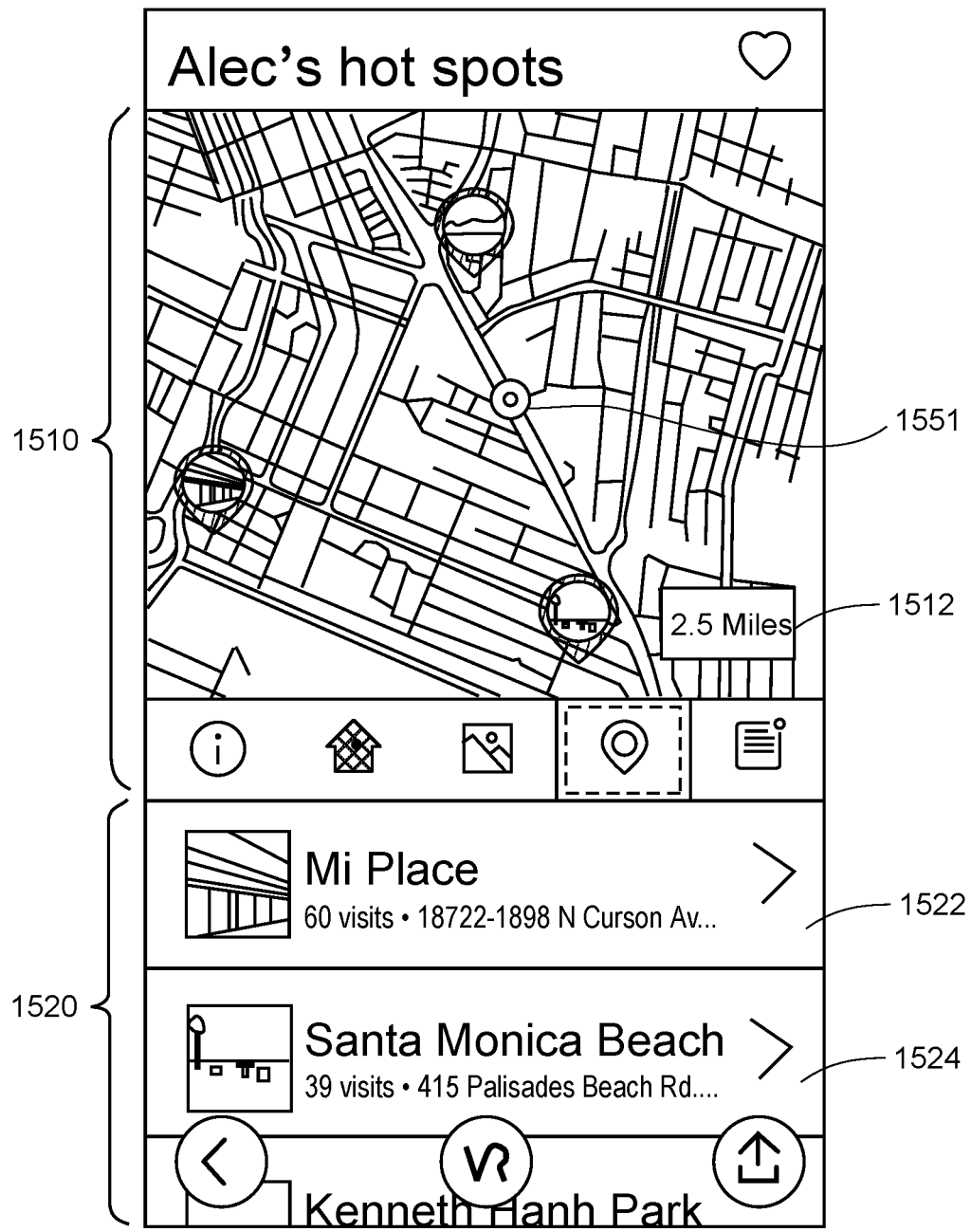
FIG. 15 is an exemplary screenshot of a celebrity's hotspots page, according to one embodiment of the present invention.

FIG. 15 is an exemplary screenshot of a celebrity's hotspots page 1500, accessible through hotspots tab 1324, according to one embodiment of the present invention. In this particular embodiment, a map panel 1510 is provided to show Alec's hotspots within a 2.5-mile radius of the user's current geolocation 1551, as indicated by the label 1512. Here each hotspot is pinned by a photo avatar. Although not shown explicitly, each photo avatar or similar map marker may be encircled with different colors or shades to distinguish the types of hotspots shown. For example, service venues such as restaurants and bars may be marked with one color, while performance venues such as theatres and stadiums may be marked with another. Details on each hotspot shown in map 1510 are provided through list 1520. Entries such as 1522 and 1524 may be listed in alphabetical order, or according to their distances from user's current location 1551. In some embodiments, entries within list 1520 are ordered according to their popularity, in terms of total number of times Alec Baldwin has visited in the past. Each entry may be further linked to a selected celebrity hotspot page, structured and implemented similar to the selected celebrity place page shown in FIGS. 12A and 12B.

Although hotspots shown in page 1500 are limited to a map area around the user's current geolocation, in some embodiments, celebrity's hotspots page 1500 may be structured similar to celebrity's homes page 1400, such that hotspots within a selected city or all hotspots for a given celebrity are listed. As a result, the user may browse through all hotspots frequented by a chosen celebrity, obtain information on their locations and profiles, and plan trips or tours accordingly.

Figure 16:
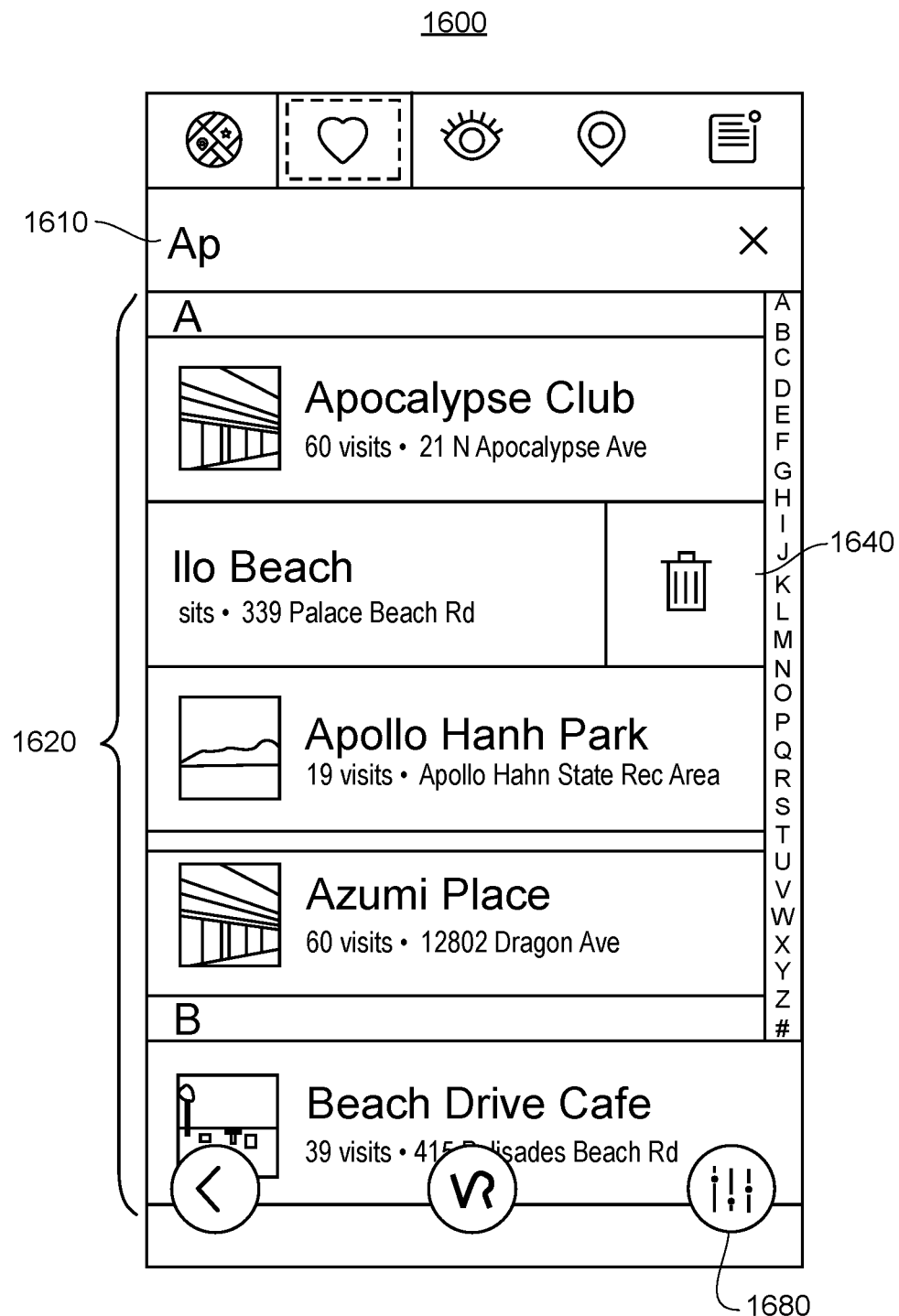
FIG. 16 is an exemplary screenshot of a favorites page, according to one embodiment of the present invention.

FIG. 16 is an exemplary screenshot of a favorites page 1600, showing a list of bookmarked celebrity places, according to one embodiment of the present invention. Here favorites panel 1620 lists the user's favorite celebrity places in a default alphabetical order, and the displayed list may be updates as a user inputs through search field 1610 to look for a particular place in his or her favorite list. In some embodiments, entries within list 1620 are ordered according to when the user has bookmarked each place. Alternatively, entries within the list may be ordered by a popularity score, where celebrity places with larger number of check-ins, celebrity visits, images, comments, or reviews are ranked higher. Entries within the list may also be ordered according to their distances to the user's current location, where the first item within the list would take the shortest amount of time to reach if the user decides to visit places within his or her favorites list. Additionally, items within the list may be removed by a swipe followed by a confirmation using icon 1640.

Observe that all entries within favorites page 1600 are celebrity hotspots, each with an explicit address and a number of historical visits. First, in this example, each celebrity hotspot is associated with a single celebrity only. In other words, the same address may appear as multiple entries in list 1620, each time associated with a different celebrity, and each time having a different number of historical visits. Alternatively, each celebrity hotspot may be associated with all celebrities who have visited, where the number of historical visits is an accumulated total, thus reflecting a higher probability of sighting one of the associated celebrities at this location. Second, floating filter icon 1680 enables the filtering of favorite celebrity places through a filter page similar to the one shown in FIG. 9. In this particular example, only hotspots are selected for display. Alternatively, all favorite celebrity places may be displayed. As the user may also bookmark individual celebrities, favorite list 1620 may contain individual celebrities as well.

Celebrity Sightings

Figure 17:
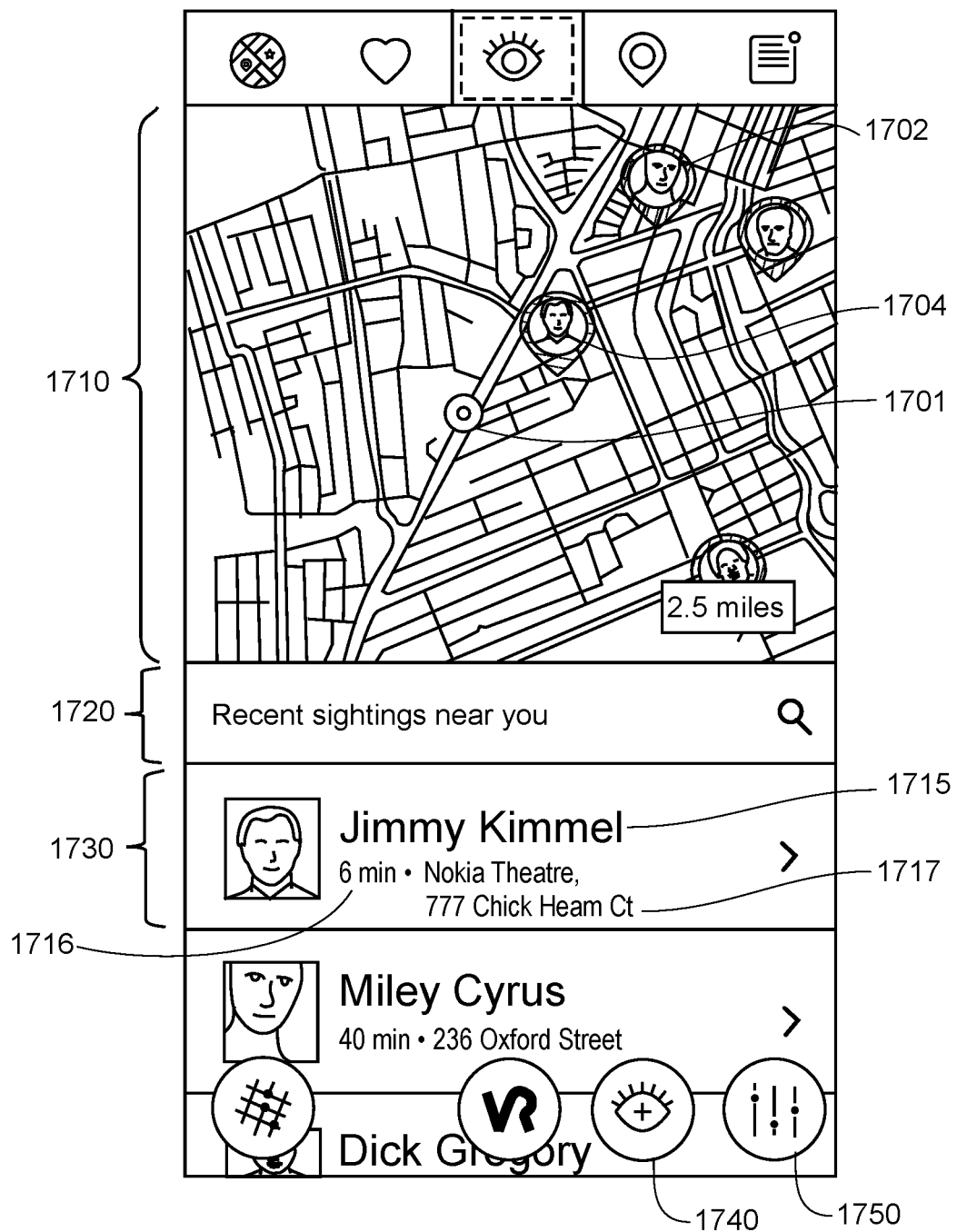
FIG. 17 is an exemplary screenshot of a sightings page, according to one embodiment of the present invention.

FIG. 17 is an exemplary screenshot of a sightings page 1700 presented to the user by a VELVET ROPES client application, according to one embodiment of the present invention. Similar to celebrity places page 600, celebrity sighting locations within a 2.5-mile radius around the user's current geolocation 1701 are displayed within map panel 1710. In this embodiment, a search field 1720 allows the user to refresh and search for most recent sightings within his or her proximity. In some embodiments, the user may input celebrity names within search field 1720 to look for recent sightings of a particular celebrity nearby.

A celebrity sighting is the event where a celebrity is seen or spotted, by the media or one or more members of the general public. A sighting or a sighting event is associated with at least a celebrity name, a sighting location and a sighting time. For example, if Jimmy Kimmel appears in a road show hosted at the Nokia Theatre in Los Angeles, and an image of him is time-stamped at capture then uploaded by a photographer, the VELVET ROPES system may process the image into a sighting event of Jimmy Kimmel, with corresponding location and time information. The image would be associated with this particular sighting event as well. Similarly, if a user runs into Miley Cyrus on Hollywood Boulevard and reports the event with an image or a text update, the VELVET ROPES system may process the user sighting report accordingly.

Within map panel 1710, pins such as 1702 and 1704, with or without celebrity avatars, are placed at sighting locations where one or more celebrities have been spotted. In cases where more than one celebrity has been spotted at a single sighting location, the avatar may correspond to the most recently sighted celebrity. Each sighing location shown in map 1710 is geo-tagged with an address or a set of geo-coordinates. For example, sighting location 1704, corresponding to entry 1730, may be reported by a photographer as the Nokia Theatre. Once in the VELVET ROPES system, the VELVET ROPES server searches for the Nokia Theatre in its databases to determine an explicit street address 1717. In some embodiments, a user may input an address or a nearby named place or landmark when reporting a sighting event. Alternatively, the user device may determine and upload longitude and latitude information to the VELVET ROPES server, which in turn ties the geo-coordinates to a closest known street address such as 1717. Additionally, time elapsed since the sighting has occurred is displayed as label 1716, and sighting event may be ordered chronologically below the map area. The present user may further utilize add sightings icon 1740 to report his or her own celebrity sighting. By tapping this icon, the user can report a sighting, thus adding a pin onto the map. Filter icon 1750 allows the user to filter sighting events displayed in map area 1710, according to filter criteria such as celebrity name, and the amount of time elapsed since the sighting has occurred.

Figure 18:
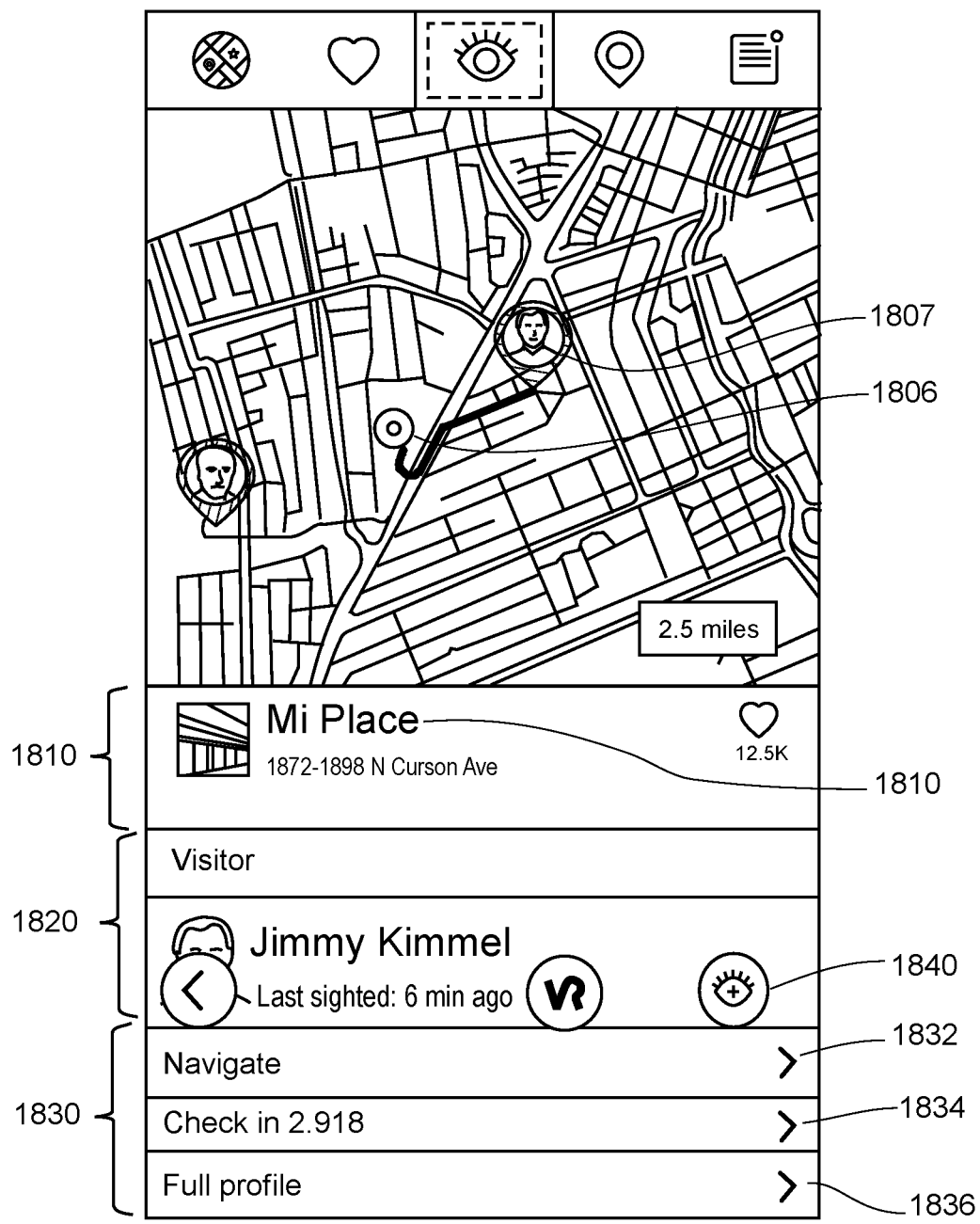
FIG. 18 is an exemplary screenshot of a selected sighting page, according to one embodiment of the present invention.

FIG. 18 is an exemplary screenshot of a selected sighting location page 1800, accessible by selecting a particular sighting result shown in map view or list view within page 1700. A selected sighting location is similar to a selected celebrity place discussed with respected to FIGS. 12A and 12B. Once a sighting location such as 1704 is chosen by the user, sighting location page 1800 is presented to the user with a navigation path starting from the user's current geolocation 1806 to the corresponding selected sighting location 1807. The user may choose to navigate to the selected sighting location through option 1832 within links panel 1830. An information panel 1810 shows a photo of the selected place, in addition to its name and address. A favorite button allows the user to bookmark this particular location for future views. All past celebrity visitors who have reportedly been spotted as the selected location are listed within visitor information panel 1820, possibly with time stamps, or historical number of sightings at this location. Links panel 1830 provides option 1832 to navigate to the select sighting location, option 1834 to see past check-ins by other users or to check-in at the selected location, and option 1836 to see a full profile of the sighting location.

FIGS. 19A to 19D are exemplary screenshots of pages for reporting celebrity sightings, accessible through add sightings icons 1740 or 1840, implemented according to one embodiment of the present invention. Even though user sighting reports may only be credible to a certain extend, a platform such as VELVET ROPES enables users to build a fan community where dedicated celebrity sighting information may be shared across a large fan base, possibly in real-time. While social networking and media websites such as Twitter and TMZ are currently available for users to search for celebrity related information, for one, such information are not dedicated to sighting reports, thus celebrity seekers often have to sort through an overwhelming amount of irrelevant news to find any sighting updates of interest to them. For two, sighting information thus obtained are unlikely to be within the users' proximity, thus having little effect on the users' probability of spotting the reported celebrity themselves. By comparison, with the VELVET ROPES system, users may see multiple real-time sighting reports of the same celebrity within a small geographical area, thus be able to follow such leads to meet the celebrity themselves. For example, if a user who is waiting to pick up a friend at the Los Angeles International Airport is notified of current sighting reports of Jennifer Lawrence, starting from a landing gate, to a coffee shop, to the luggage claim, the user may follow the information and wait to see the Hunger Games star instead of simply driving away when his or her friend shows up. With appropriate privacy and safety measures, the VELVET ROPES system provides an interactive sighting information platform.

To report a sighting, a user first searches through a list of celebrities on page 1900, as shown in FIG. 19A. Celebrities within the VELVET ROPES celebrity database are sorted, possibly by first name in alphabetical order. As the user inputs a celebrity name into search field 1910, names that start with the user's input are displayed within scrollable list 1920. Instead of typing out the full name for the celebrity, the user can directly click on the desired celebrity name once the name appears in the list. In some embodiments, an option is provided for the user to search for celebrities by last name. In some embodiments, all approximate name matches are returned in list 1920, even if the user misspells the desired celebrity name. In some embodiments, the user may use filter button 1925 to filter celebrity names according to age, gender, race, nationality, occupation, years active, or similar personal information. In other words, even if the user can not recall the name of a spotted celebrity, the user may still find the celebrity from the VELVET ROPES database by cross-referencing other personal or professional information. Once the sighted celebrity is selected, a sighting location page 1930 is automatically evoked. Alternatively, the user may click on floating icon 1929 to cancel the sighting report process.

Upon invocation of sighting location page 1930 as shown in FIG. 19B, the VELVET ROPES system may automatically attempt to determine the user's current geolocation. In some embodiments, through triangulation techniques, a set of geo-coordinates are established, and the closest street address such as address 1935 is suggested. Upon selection of suggested address 1935, a sighting photo page 1980 may be automatically evoked. The user may also click on floating icon 1940 to return to the previous page, or on floating icon 1950 to cancel the sighting report process. If the user is unsatisfied with the suggested address, such as when the user is reporting a sighting event not in real-time but when he or she has returned home, an alternative address may be chosen through option 1936, which evokes address page 1960.

On page 1960 as shown in FIG. 19C, the user may utilize search field 1965 to look up the street address of a named place or venue from the VELVET ROPES database. An on-screen keyboard 1979 may appear automatically when the user taps within search field 1965. Alternatively, the user may search for street addresses directly. Search results are displayed within panel 1970. Each search result is associated with at least a street address, and possibly a name or a photo. Additionally, each search result may be labeled with an icon to indicate the type of the geolocation. For example, a home symbol 1972 indicates that Mi Place is a residence such as a house a condo, while a hotspot symbol 1974 indicates that Miller Park South is a celebrity hotspot. Floating icon 1976 enables the user to return to the previous page without selecting an alternative address, while floating icon 1978 is only enabled when an alternative address is chosen, with a user tap on the enabled icon terminating the address search process and taking the user to the next sighting photo page 1980. In some embodiments, Pages 1930 and 1960 are merged and displayed within a single page.

On page 1980 as shown in FIG. 19D, the user may upload a photo and add a comment or a time stamp to the reported sighting event. In some embodiments, selecting Upload photo option 1982 opens an additional page where the user may browse through a local user device camera roll to select and upload one or more sighting photos, and to add tags or comments to each photo. In some embodiments, selecting Add a comment option 1984 brings about a separate page or a pop-up input window for the user to annotate the image or the sighting event itself. Additionally, the user may wish to use an Add time stamp option 1986 to provide an explicit time stamp to the sighting event. Selecting option 1986 may bring about a pop-up calendar and a corresponding clock where the user can select or input an approximate time, thus enabling non-real-time reporting of sighting events. When option 1986 is not utilized, a sighting event is automatically associated with the system time at which the sighting report is generated. As shall be discussed later, in some embodiments, each user-reported sighting requires verification from other non-reporting users if the reporting user's credibility score is poor. On the other hand, sighting report by a user with a high credibility score may be uploaded to the VELVET ROPES system directly, thus enabling non-real-time reporting, since successful cross-verification is less likely when a significant amount of time has passed since the sighting took place.

Celebrity Hotspots

Figure 20:
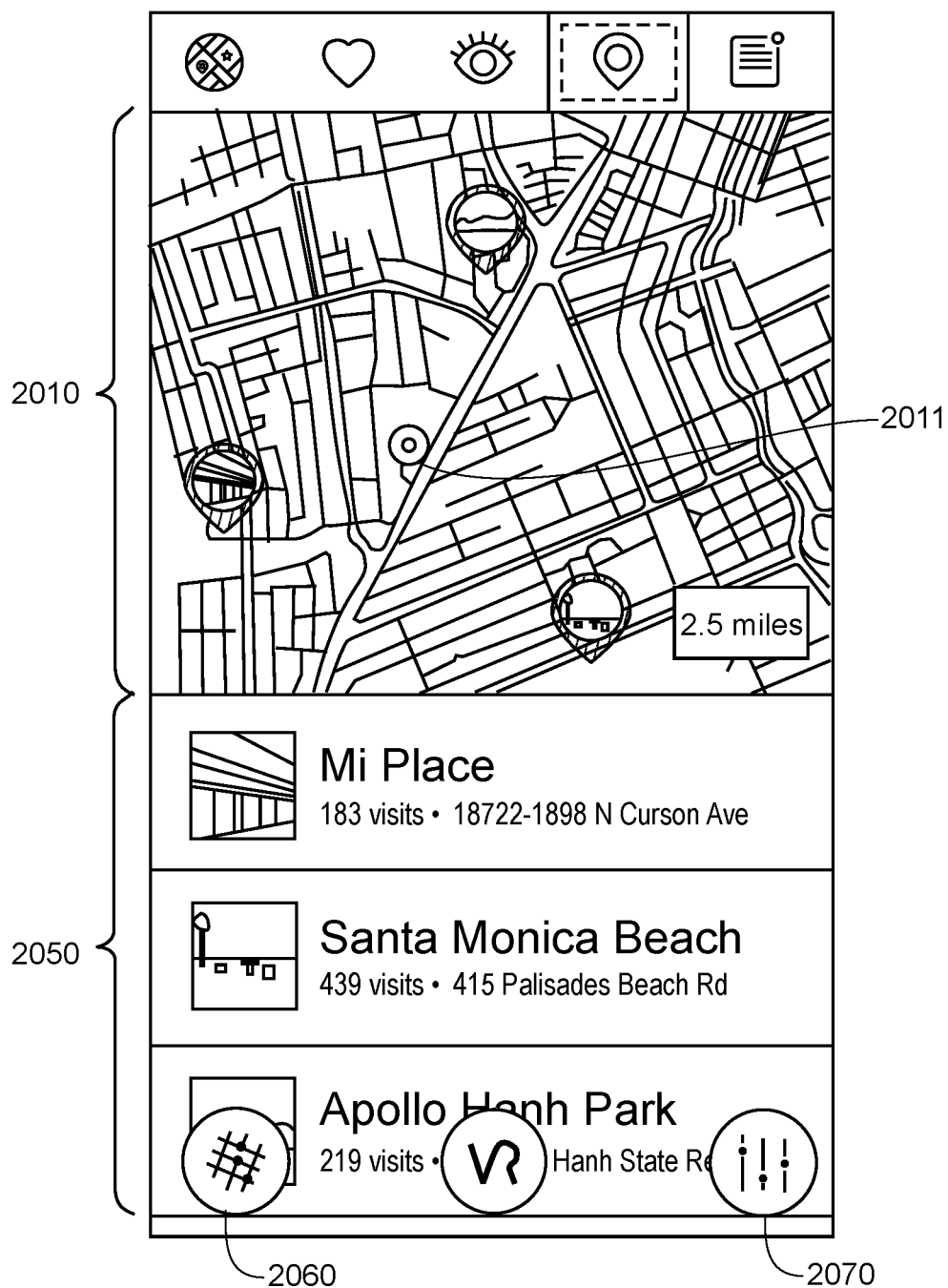
FIG. 20 is an exemplary screenshot of a hotspots page, according to one embodiment of the present invention.

FIG. 20 is an exemplary screenshot of a celebrity hotspots page 2000, accessible through celebrity hotspot links such as option 524 or tab 624. As discussed previously, celebrity hotspots are popular places that celebrities frequently visit, and where celebrity sightings often take place. Some exemplary hotspots include airports, hotels, bars, clubs, lounges, restaurants, fashion shops, and gyms. Celebrity hotspots may further refer to locations where celebrities have made appearances, or filmed movies or shows. A celebrity hotspot may be a celebrity sighting location concurrently.

Structured similarly to page 1500, which is dedicated to hotspots frequented by a single celebrity, celebrity hotspots page 2000 contains a map panel 2010, where celebrity hotspots within a 2.5-mile radius around the user's current geolocation 2011 are displayed, and a list panel 2050, where profiles are provided for each hotspot location. Again, each photo avatar or similar map marker may be encircled with different colors or shades to distinguish the types of hotspots shown. For example, some users may be more interested in small, private venues such as restaurants, while other users may be more interested in larger public venues such as parks and theatres.

Entries within list 2050 are each associated with an explicit street address and a number of historical visits. In some embodiments, each celebrity hotspot is associated with a single celebrity only. In other embodiments such as here, each celebrity hotspot is associated with all celebrities who have visited, where the number of historical visits is an accumulated total, reflecting a higher probability of sighting any of the associated celebrity at this location. Entries within list 2050 may be listed in alphabetical order, according to their distances from user's current location 2011, or according to their popularity, in terms of the total number of visits various celebrities have paid to this particular location, or the number of user image and comment uploads. Each map marker within map 2010 or entry within list 2050 may be further linked to a selected celebrity hotspots page, structured and implemented similar to the selected celebrity place page shown in FIGS. 12A and 12B.

Similar to celebrity places page 600, multiple floating icons are provided at the bottom of celebrity hotspots page 2000 to enable tour generation and hotspot filtering. In this particular example, tour icon 2060 enables the user to select from pre-defined hotspot tours or to generate customized tours to visit a selected set of hotspots of interest. On the other hand, filter icon 2070 allows the user to filter celebrity hotspots displayed in map panel 2010, according to filter criteria such as celebrity name, hotspot type, or thresholds on total number of celebrity visits to the place. Selecting or deselecting entries within list 2050 may turn on or off corresponding map markers shown in map panel 2010.

Notifications

Figure 21B:
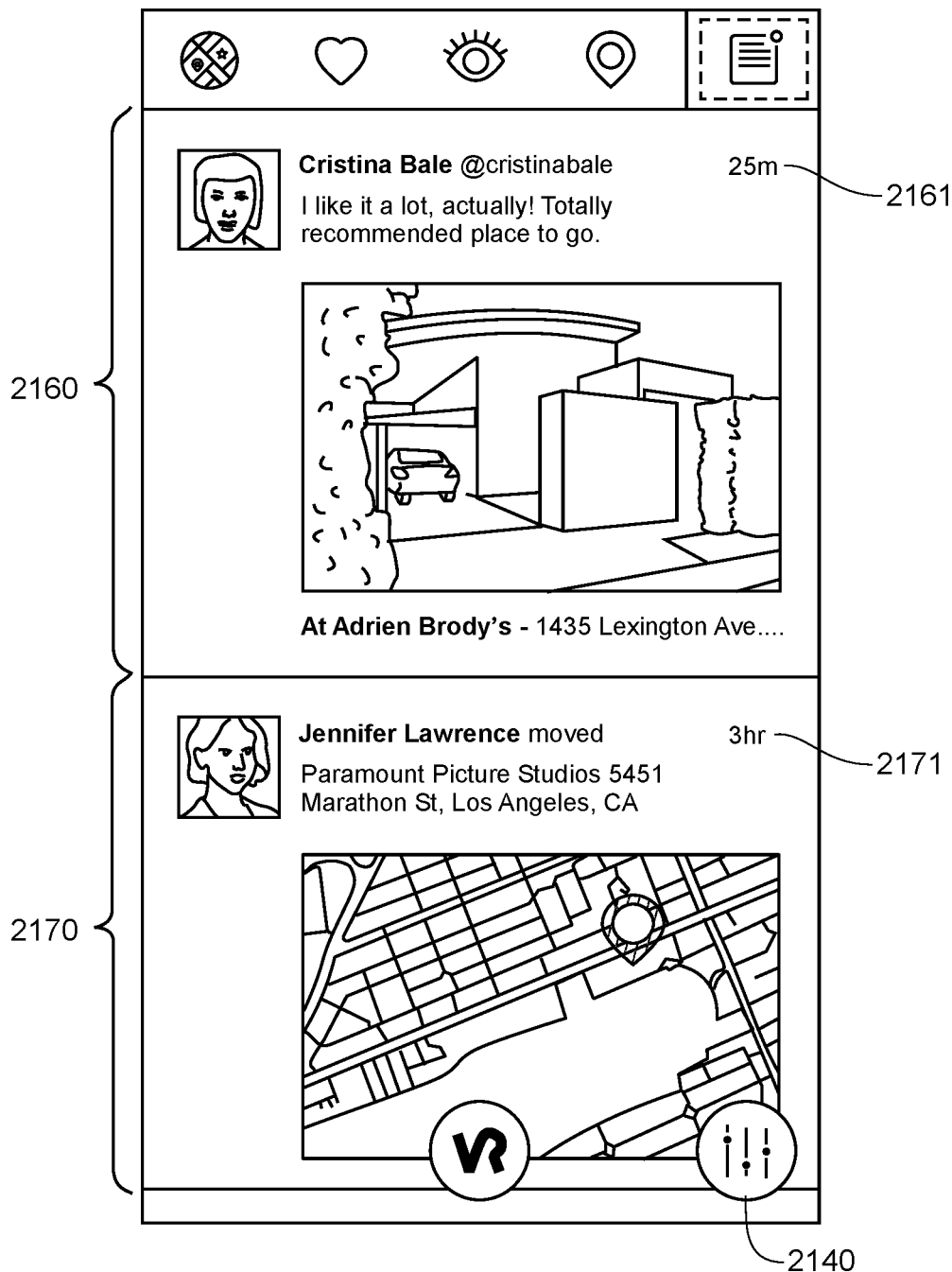

FIGS. 21A and 21B are exemplary screenshot of a scrollable feed or notifications page presented to the user, according to one embodiment of the present invention. In this example, separate portions of the notifications page are shown in two parts 2100 and 2150. Each notification panel 2110, 2120, 2130, 2160 and 2170 contains an exemplary news update broadcasted by the VELVET ROPES system to users who have enabled the service. Such notifications may be displayed in chronological order as indicated by time stamps 2111, 2121, 2131, 2161 and 2171.

News updates may be user generated, or collected by the VELVET ROPES system from various digital media sources. For example, notification 2110 posted by user Susan Lee is a sighting report of Tom Hiddleston, with a sighting time 2111, a user comment 2112, a sighting image 2113, and a sighting location 2114. Here sighting time 2111 is given as 2 minutes (ago), indicating that the sighting event has just occurred. Similarly, notification 2120 is a user sighting report pulled by the VELVET ROPES system from third-party social network Twitter. User Tweeter T may or may not be a user of the VELVET ROPES system, yet her sighting reports to the public domain is utilized by the VELVET ROPES system.

Notification 2130 is a celebrity report pulled by the VELVET ROPES system, again from Twitter. For this particular news update, the VELVET ROPES system monitors postings by verified celebrity accounts or handles on different social media platforms. By intelligently analyzing the content of a posting, the VELVET ROPES system determines whether a celebrity posting refers to an event where the celebrity makes a physical appearance at some known geolocation. If the analysis result is affirmative, the celebrity posting is broadcasted within the VELVET ROPES notification system to users who have enabled the service. In this example, Jimmy Kimmel attended a game by New York Mets and tweeted from Citi Field Stadium. Tapping on notification panel 2130 may lead to an in-app display of this particular tweet on Jimmy Kimmel's Twitter homepage.

Notification 2160 is a user check-in at an Adrien Brody residence, with user image and comment uploads. Notification 2170, on the other hand, is a notification of celebrity activity. Celebrity activities broadly refer to any changes in a celebrity's current status. Examples include changes in residence, marital status, agency or label. Announcements on new concert tours, new shows, films, books, and the like are also relevant celebrity activities that would be broadcasted by the VELVET ROPES system.

Although not shown explicitly within FIGS. 21A and 21B, in some embodiments, a highlight of the background of a notification panel would signify that the item is new. The user may tap on each item to make it as read. Alternatively, upon being presented to the user, next time the fed is presented or refreshed, the item may be displayed with a regular background color. In addition, a user may filter the news feed through floating icon 2140, according to criteria such as notification type and source. For example, the user may choose to receive only sighting reports, only celebrity activity notifications, or only user-generated sighting or check-in notifications from other VELVET ROPES users that they follow. The user may alternatively choose to receive only celebrity reports posted by verified celebrity accounts only.

Maintaining the VELVET ROPES Server and Databases

Referring now back to FIG. 2, while the VELVET ROPES server produces interactive celebrity maps and provides services such as tour generation and sighting notifications, such services all rely on information stored in data repository 280. When a VELVET ROPES server is first established, it may perform a deep search on all available digital media sources to built databases on existing celebrities and historical sighting events. Nonetheless, since new celebrities emerge and new sighting events occur on a daily basis, it is necessary to periodically or spontaneously update databases within repository 280 to ensure information contained therein are up to date and as accurate as possible.

Figure 22:
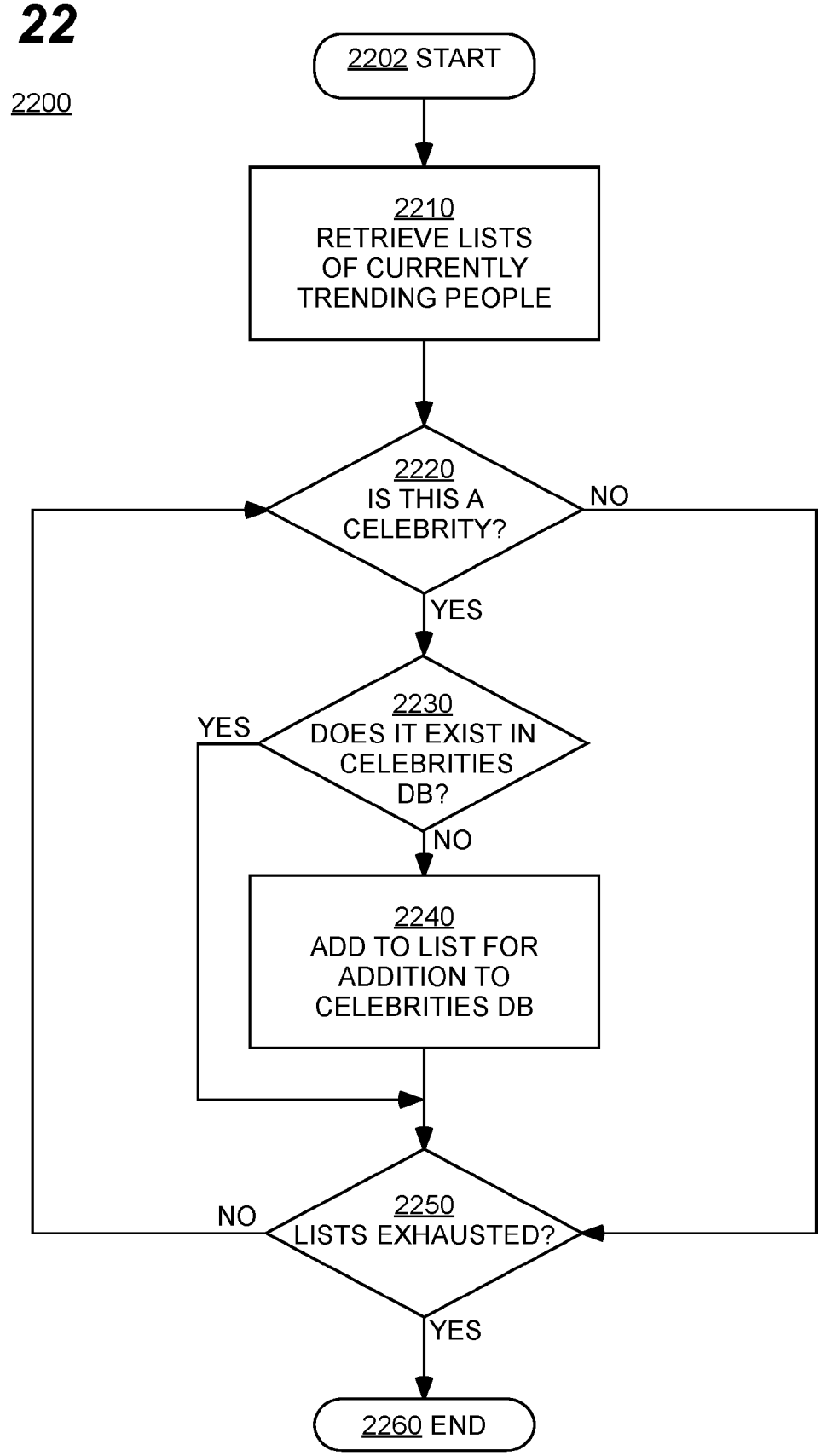
FIG. 22 is a flow diagram for adding new celebrities to a celebrity database, according to one embodiment of the present invention.

Accordingly, FIG. 22 is a flow diagram 2200 for adding celebrities to VELVET ROPES celebrities database 282, according to one embodiment of the present invention. The process as described by flow diagram 2200 may be run periodically through a time-based job scheduler according to a pre-defined update schedule, for example, on an hourly basis. Upon initialization at step 2202, a VELVET ROPES server retrieves lists of currently trending people at step 2210, possibly from digital media sources such as Twitter, MySpace, Mashable, Yahoo News, or E! Online. Some exemplary lists include currently trending actors, teen pop idols, musical artists, and authors. Explicit currently trending people lists such as provided by Google Trends are also acceptable. Names within each list are iterated through the subsequent steps in order. A given name currently under consideration is first checked against some general criteria to see if it refers to a celebrity at step 2220. For example, it would be easy to verify using a quick web search that a person who is currently trending for being the victim of a recently happened terrorist attack is not a celebrity. If the result of the check at step 2220 is definitely negative, the process continues to step 2250. If the result of the check at step 2220 is affirmative or uncertain, the process continues to step 2230, where the name is checked against the VELVET ROPES celebrities database. Again, if the result is affirmative, the process continues to step 2250, otherwise the name is added to a candidate list for later addition to the celebrities database at step 2240. In some embodiments, steps 2220 and 2230 are combined into a single combined decision. The overall process terminates at step 2260 if all lists have been exhausted at step 2250. In some embodiments, all names within the candidate list are added to the VELVET ROPES celebrities database automatically. In some other embodiments, the candidate celebrity list, once compiled, is sent to a VELVET ROPES system administrator, who examines each name manually to make final decisions on whether a candidate celebrity should be added to the VELVET ROPES celebrities database.

Figure 23:
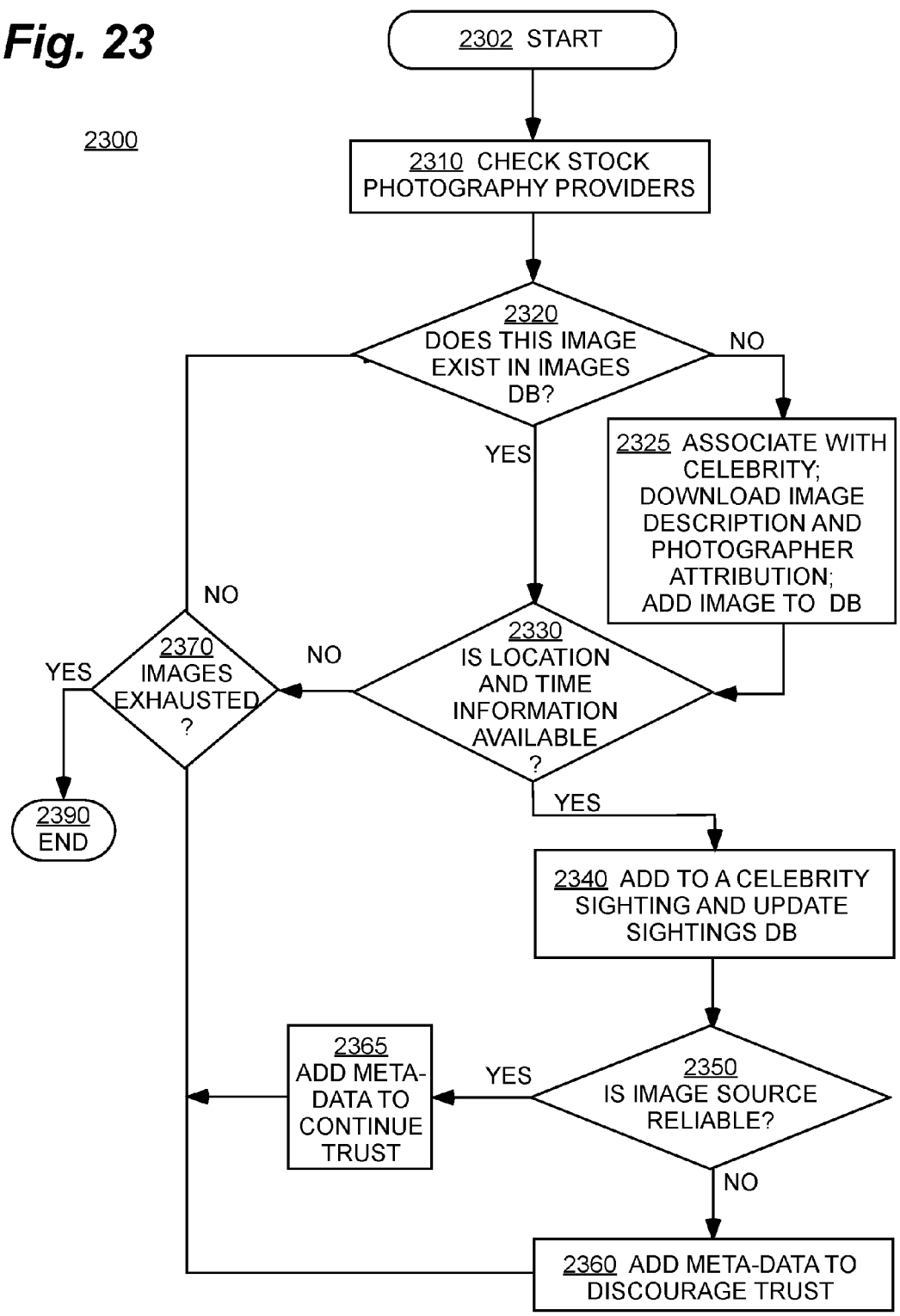
FIG. 23 is a flow diagram for adding new images to an images database, according to one embodiment of the present invention.

FIG. 23 is a flow diagram 2300 for adding celebrity images to VELVET ROPES images database 288, according to one embodiment of the present invention. Again, the process as described by flow diagram 2300 may be run periodically according to a pre-defined update schedule, for example, on an hourly basis. Alternatively, a VELVET ROPES server may be set up to receive push notifications from digital media sources, and the process described herein may be run whenever new images become available.

In some embodiments where the process described by flow diagram 2300 is performed periodically, upon initialization at step 2302, the VELVET ROPES server uses a web crawler to spider or scrub stock photography providers at step 2310 to check whether new celebrity images are available. Exemplary stock photograph providers include Getty Images, Shutter Stock, AP Images, and Corbis Images. Photos thus retrieved often cover large and small entertainment events with the most talked about celebrities, and are tagged with celebrity names as well as event information. Each photo is then checked against the images database 288 at step 2320 to see whether it already exists in the VELVET ROPES system. If the result is negative, the process continues to step 2325, where the photo is associated with a celebrity within celebrities database 282, corresponding image description and photographer attribution are downloaded as image meta-data, and the photo is added to images database 288. In cases where the photographed celebrity does not exist in VELVET ROPES celebrities database 282, the celebrity name and corresponding image may be added to a candidate list again, for verification and addition to the system by a VELVET ROPES administrator later.

If the image currently under consideration already exists in images database 288, or has been added to the database through step 2325, corresponding image meta-data are analyzed at step 2330 to see whether location and time information are available. If the result is negative, the process continues to step 2370, and the next retrieved image is considered until all retrieved images have been exhausted, ending the overall process at step 2390. When location and time information are indeed available, the image currently under consideration represents a sighting event. Thus at step 2340, the image is added to a celebrity sighting event, and sightings database 286 is updated accordingly. Once a sighting event has been added, the image source is checked at step 2350 to determine if it is reliable. For example, a known professional photographer would be a reliable source, whereas a new free-lance contributor would have questionable credibility. Step 2350 may be performed automatically through an intelligent verification algorithm, or manually by a VELVET ROPES administrator. For a reliable source, meta-data associated with the source would be updated at step 2365 to continue trust within the system. Conversely, meta-data associated with an unreliable source would be updated at step 2360 to discourage future trust. In some embodiments, meta-data associated with image sources include a trust or credibility score iteratively calculated based on historical data. In some embodiments, a credibility rating for the image is received from the image source, or a VELVET ROPES system administrator, and the credibility score of the image source is updated according to the received credibility rating for the image.

Figure 24:
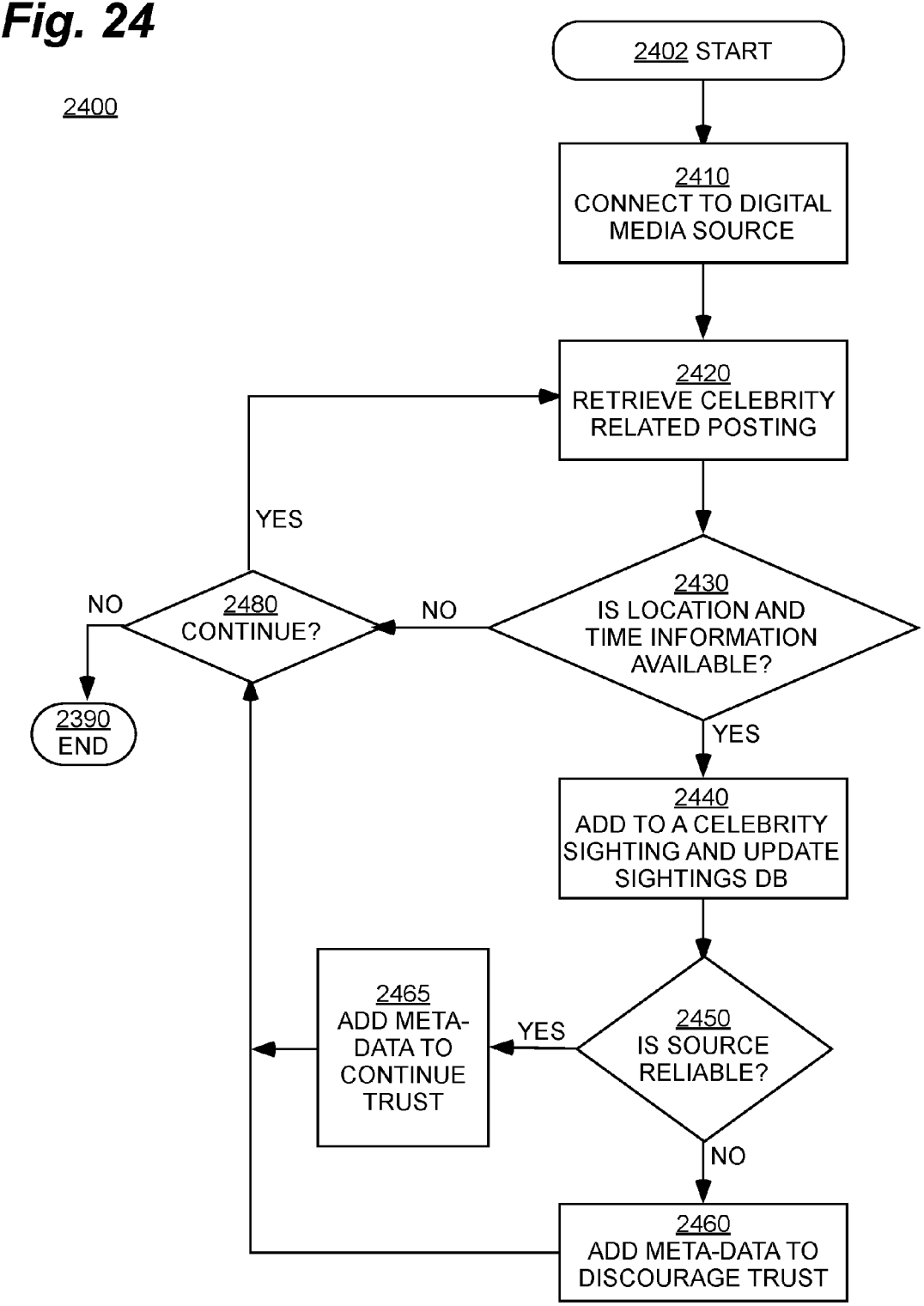
FIG. 24 is a flowchart for adding celebrity sighting from digital media sources to a sightings database, according to one embodiment of the present invention.

FIG. 24 is a flow diagram 2400 for adding celebrity sightings from digital media sources to a VELVET ROPES celebrity sightings database 286, according to one embodiment of the present invention. In addition to periodic updates, a VELVET ROPES server may be set up to receive push notifications, and the process described herein may be run whenever new celebrity related postings become available. Upon initialization at step 2402, the VELVET ROPES server connects to a digital media source at step 2410 to retrieve celebrity related news or postings at step 2420. A digital media source may refer to traditional media outlets such as DailyMail, TMZ, and Splash News, or it may refer to social media platforms such as Twitter, MySpace, Facebook and Instagram. For social media platforms, the VELVET ROPES server may connect to available media APIs at step 2410, and postings on such platforms may be time sensitive.

While celebrity news articles provided by traditional media outlets can be easily analyzed through their titles, taglines and keywords at step 2410 to determine the celebrity and event involved, the retrieval process for a social media platform could become resource inefficient if all feeds within a social media platform are examined. Thus, for postings on social media, the retrieval process at step 2420 may involve predefined steps or conditions. For example, in some embodiments, handles belonging to celebrities within the VELVET ROPES celebrities database are checked as part of the retrieval process to see if any one or more celebrities have announced where they currently are. In some embodiments, search and textual analysis are performed as part of the retrieval process to determine celebrity handles mentioned by other users of a social media platform when the celebrities have been spotted. In yet some embodiments, search and textual analysis are performed as part of the retrieval process to determine celebrity names mentioned by other users of a social media platform when the celebrities have been spotted. Any or all of the steps as described above may be used in parallel or in sequence to locate relevant celebrity related postings.

For each relevant celebrity related posting thus determined, contents of the celebrity related posting are analyzed at step 2430 to see whether location and time information are available. If the result is negative, the process continues to step 2480, and the next retrieved celebrity related posting is considered until all retrieved postings have been exhausted, ending the overall process at step 2490. When location and time information are available, the celebrity related posting currently under consideration represents a sighting event. Thus at step 2440, the image is added to a celebrity sighting event, and sightings database 286 is updated accordingly. Once a sighting event has been added, the source of the original celebrity related posting is checked at step 2450 to determine if it is reliable. For traditional media outlets, the author of the retrieved news article may be taken as the source of the posting; for social media platforms, the celebrity or user who has made the posting may be taken as the source. Step 2450 may be performed automatically through an intelligent verification algorithm, or manually by a VELVET ROPES administrator. For a reliable source, meta-data associated with the source would be updated at step 2465 to continue trust within the system. Conversely, meta-data associated with an unreliable source would be updated at step 2460 to discourage future trust. In some embodiments, such meta-data associated with posting sources include a trust or credibility score iteratively calculated based on historical data.

In some embodiments, an additional step may be performed after step 2420 to determine if the celebrity has been mentioned in sources other than the one from which the celebrity related posting has been retrieved, and thus has been added to the system already. The process continues to step 2430 if the answer is negative, otherwise returns to step 2420 again to retrieve the next celebrity-related posting, if the celebrity has been mentioned elsewhere already.

Celebrity Sighting Reporting and Verification

Figure 25:
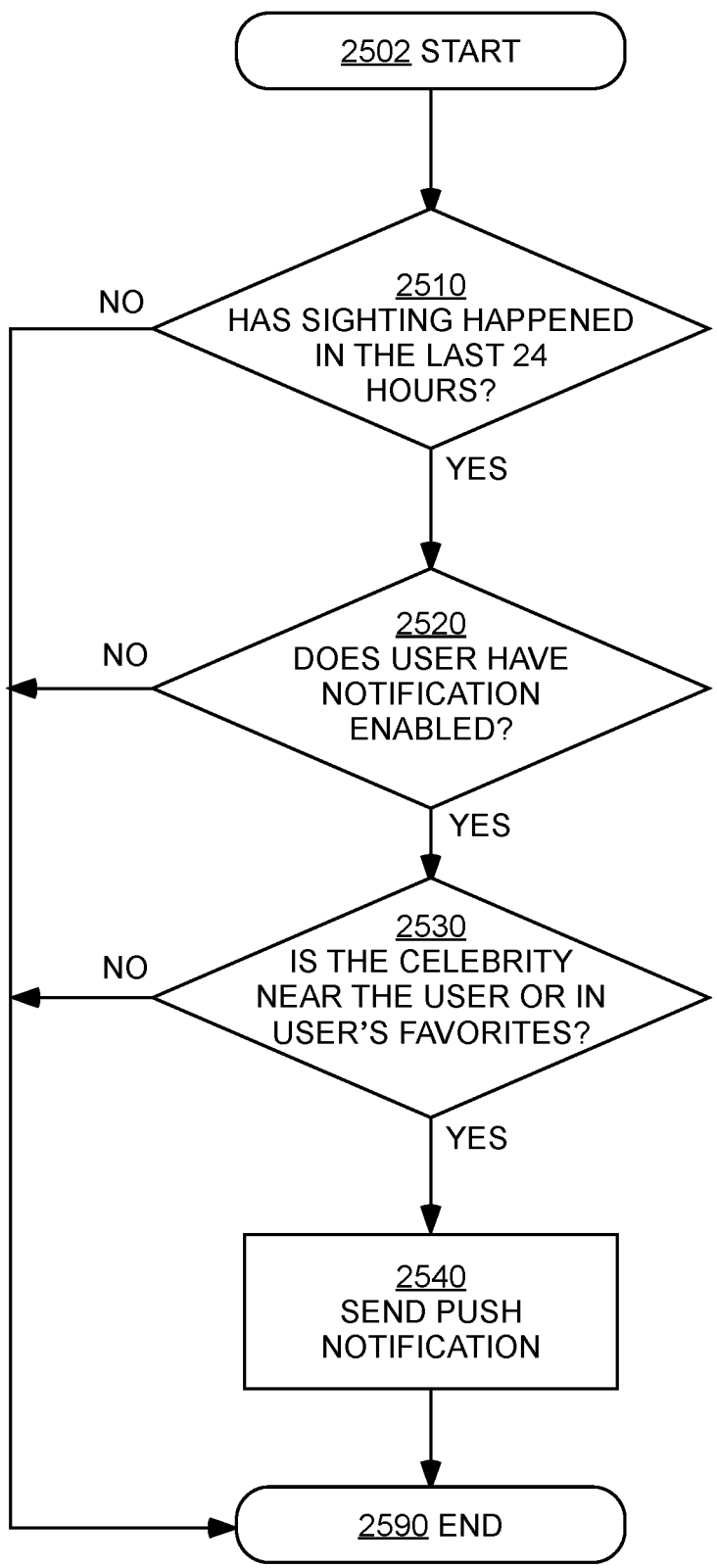
FIG. 25 is a flowchart for generating push notifications to a user when a celebrity sighting of interest to the user occurs, according to one embodiment of the present invention.

While FIGS. 23 and 24 each refer to a process for adding new sighting events to a VELVET ROPES sightings database, FIG. 25 is a corresponding flow diagram 2500 for sending push notifications of a celebrity sighting event to a user, according to one embodiment of the present invention.

Upon initialization at step 2502, the VELVET ROPES server examines a new sighting event added to the sightings database 286. At step 2510, the sighting time associated with the sighting event is checked to determine if the sighting event has happened in the last 24 hours. If the result is affirmative, user preferences and settings are checked at steps 2520 and 2530 to determine whether the user has push notifications enabled, as well as whether the celebrity involved in the sighting event is near the user's current location or in the user's favorites. If both decisions return affirmative results, a push notification such as those discussed with respect to FIGS. 21A and 21B is sent to the user at step 2540. Otherwise the overall process terminates at step 2590, and no notifications are sent to the user. Recall from discussion with respect to FIGS. 21A and 21B that when the user enables notifications, he or she may also set a notification filter to receive only a selected subset of all notifications. In the exemplary process shown in FIG. 25, such notification filters are implemented in terms of distance and user favorites within step 2530. For example, the user may choose to receive push notifications on sighting events occurring within a pre-defined radius of the user's current geolocation, where the pre-defined radius may be 1 mile, 2.5 miles, 10 miles, or the like. In some other embodiments, alternative filtering conditions such as types of news source and source credibility thresholds may be implemented instead in step 2530.

While FIG. 24 covers the process of retrieving user reports of celebrity sightings from social media websites, FIG. 25 covers the process of sending notifications of celebrity sightings added to the VELVET ROPES sightings database. However, celebrity sightings in FIG. 25 refer to not only those added through the process shown in FIG. 24, but also those reported by users directly through the VELVET ROPES platform. User credibility and reporting reliability are therefore important usability measures for the VELVET ROPES system. Consequently, inventors of the present invention have created methods and systems for verifying user reported celebrity sightings and updating user credibility scores.

Figure 26A:
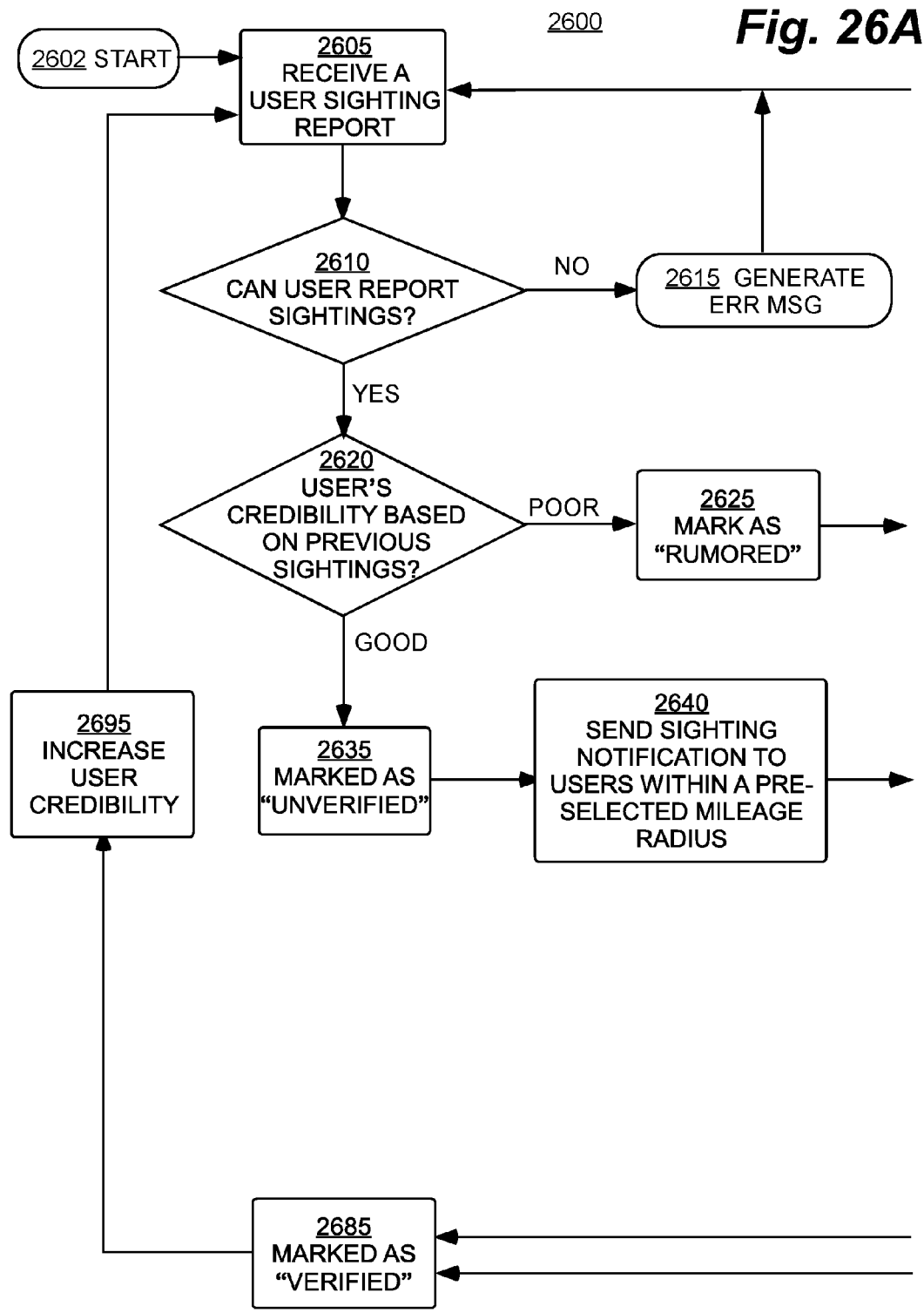
FIGS. 26A and 26B are a flowchart for user-generated celebrity sighting report verification, according to one embodiment of the present invention.
Figure 26B:
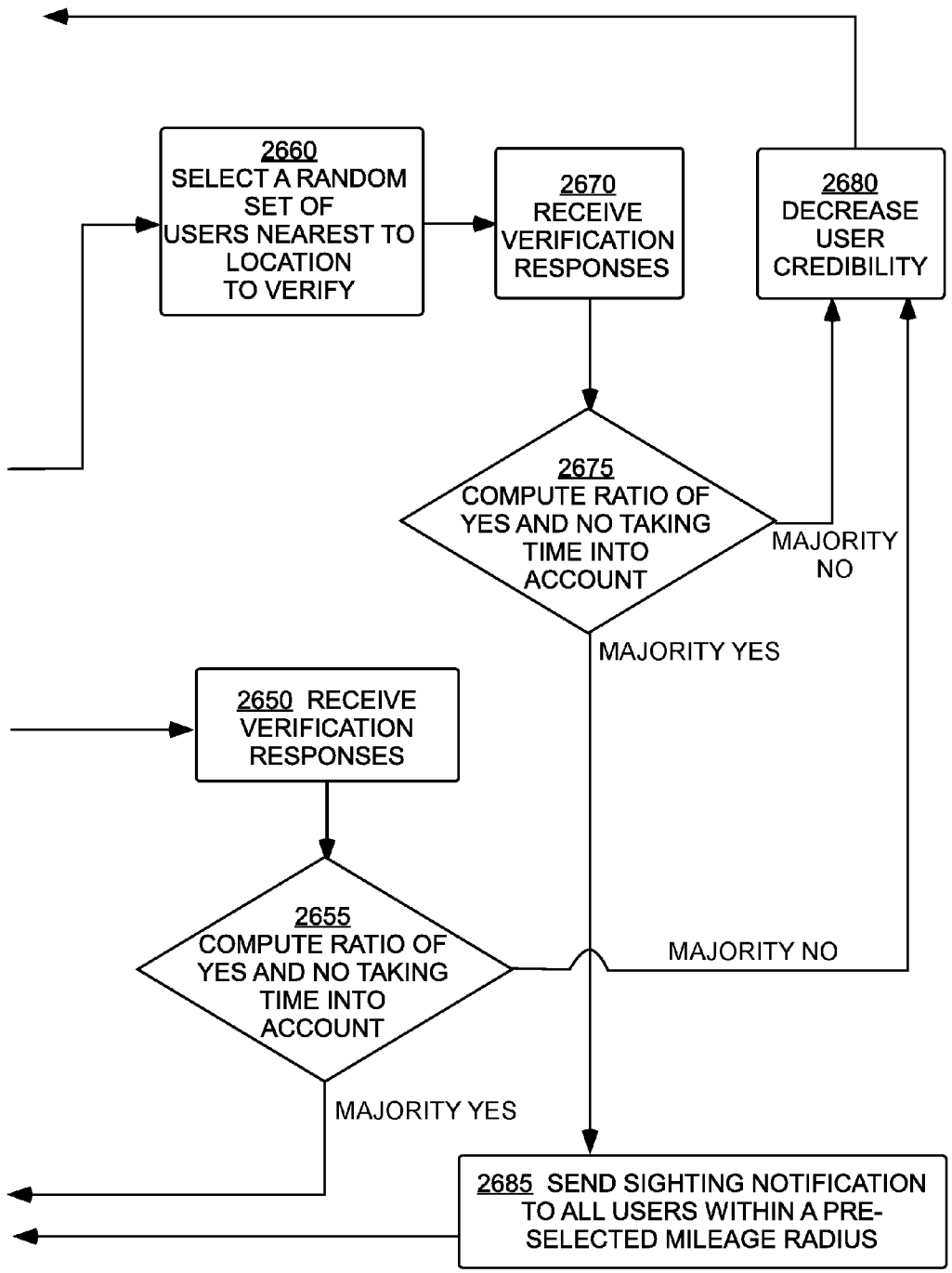

FIGS. 26A and 26B are a flow diagram 2600 for user sighting report verification, according to one embodiment of the present invention. In short, a non-reporting user may confirm a reported celebrity sighting event if the non-reporting user also happens to spot the same celebrity within a reasonable time frame and not far away from the reported sighting location. In some embodiments, all user-generated sighting reports need to be verified by at least another user. In some other embodiments, a sighting report may be added the system as a credible but unverified event, if the sighting is reported by a user with an acceptable credibility or trust score.

More specifically, as the VELVET ROPES systems receives a user sighting report at step 2605 after initialization at step 2602, the system checks whether the user can report celebrity sightings at step 2610. In some embodiments, step 2610 involves the comparison of a user credibility score to a credibility threshold. In some other embodiments, step 2610 involves the comparison of the number of inaccurate sighting reports previously submitted by the user to a threshold value. If it is determined that the user cannot report celebrity sightings, the overall verification process terminates at step 2615, and an error message is sent to notify the user that he or she has submitted too many inaccurate sighting reports, thus cannot participate further. If it is determined that the user can indeed report additional celebrity sightings, the verification process proceeds to step 2620, where the user's credibility score based on previous sighting reports are examined.

For a user with a poor credibility score, the present sighting report is marked as "rumored" at step 2625. To verify a rumored sighting report, at step 2660, the VELVET ROPES server selects a random set of notification-enabled users within a pre-defined mileage radius around the reported sighting location. A verification request is then broadcasted, to inquire if users within the selected set have seen the reported celebrity too. At step 2670, verification responses are received by the VELVET ROPES server and a ratio between the number of affirmative (yes) and negative (no) responses are computed, taking time elapsed into account at step 2675. As time passes, the likelihood of receiving negative verification responses within a given time interval becomes higher, but the impact of a lower yes to no ratio on the user's credibility score would also decrease, for the reported celebrity may have already left the vicinity of the reporting area. Additional details on the computation of user credibility scores shall be described with reference to the Eqns. (1) and (2), and Table 1 hereafter.

At step 2675, if the majority of responses is negative, the reporting user's credibility is reduced at step 2680, and the overall process iterates again starting from step 2605 to examine the next user sighting report. On the other hand, if the majority of responses is affirmative, a sighting notification is broadcasted at step 2685 to all users who have enabled push notification services and are located within a pre-selected mileage radius around the reported sighting location. Such pre-define mileage radius may be set by the VELVET ROPES server or the receiving user. The reported sighting is correspondingly marked as verified at step 2685. In addition, user credibility is increased within the system at step 2695. In some embodiments, once a user's credibility level exceeds a specific threshold, all future sightings reported by the user would be considered a "credible unverified" sighting, and may or may not require additional verification by other non-reporting users.

Referring back to step 2620, for a user with a good credibility score, the received celebrity sighting is marked as "unverified" at step 2635. To verify the sighting report, at step 2640, the VELVET ROPES server broadcasts a verification request to all notification-enabled users within a pre-defined mileage radius around the reported sighting location, to inquire if they have seen the reported celebrity as well. At step 2650, verification responses are received by the VELVET ROPES server and a ratio between the number of affirmative (yes) and negative (no) responses are computed, taking time elapsed into account at step 2655. If the majority of responses is negative, the reporting user's credibility is reduced at step 2680, otherwise the reported sighting is marked as verified at step 2685 and the reporting user's credibility score is increased at step 2695.

Although not shown explicitly in FIGS. 26A and 26B, in some embodiments, additional or alternative steps may be involved to consolidate multiple user reports of the same sighting event. For example, when multiple users report sightings of the same celebrity at around the same time and location, verification may or may not be necessary if at least one of the reporting users have a credibility score above a certain threshold. In addition, if the number of such user reports are large, it is possible to cross-verify with or without sending out additional verification requests to other non-reporting users. Lastly, it may be possible to broadcast only one set of verification request for multiple user reports of the same sighting event, and credibility scores of all such reporting users may be updated with the same set of collected verification responses.

Since users do not always have a VELVET ROPES client application open at all times, a verification request may be ignored unintentionally. Thus, in some embodiments, instead of a dedicated verification request, a notification message with links within the application to a verification request and more other information is used instead. More specifically, for a user with poor credibility, a notification of the sighting event is broadcasted to a selected set of random users within a pre-selected mileage radius at step 2660. Such a notification may contain a link to inquire whether a receiving user has seen the celebrity as well. Thus, the embedded verification request always reaches the targeted users, since such users are selected from those who have enabled push notifications within the system. Once verification responses are received at step 2670, a ratio of affirmative and negative responses are computed at step 2675. If the majority of response are affirmative, a sighting notification message is sent to the rest of the users within the pre-selected mileage radius. On the other hand, if the reporting user has good credibility, a sighting notification is always pushed out directly to all notification-enabled users within a pre-selected mileage at step 2640, where the notification message links to a verification request in the form of a separate verification page, a pop-up window, an embedded line or button within the notification message itself, or the like. In this manner, a receiving user is less likely to turn off the notification function because he or she is overwhelmed with multiple messages regarding the same event.

In some embodiments, user credibility or trust score as described above is a numerical value in the range between 0 and 100, with a score of 100 indicating a high probability of the user reporting an accurate sighting. Each new user to the VELVET ROPES system may be assigned an initial credibility score, for example, a score of 50, and credibility updates may be made incrementally as time passes. Eqs. (1) and (2) below provide an illustrative example of how user credibility score may be computed. Other update functions are also possible.

In this particular embodiment, discrete variable t represents time elapsed since the user report has been received by the VELVET ROPES system, or since the sighting time; r[t] is a time-dependent rate of decay; Y[t] and N[t] are the respective number of affirmative(yes) and negative(no) verification responses received between t-1 and t; c[t] is a time-dependent credibility update value, summed over the elapsed time to obtain the updated credibility score C[t]. $C_0$ is an initial credibility score, set to a value between 0 and 100; $t_0$ is the starting time, while T is the time at which the credibility score is computed. Additionally, when the computed value of C[T] exceeds 100, a value of 100 is assigned to C[T]; when the computed value of C[T] falls below 0, a value of 0 is assigned to C[T] instead. This particular credibility score computation may be viewed as an exponentially weighted summation of verification response counts. Other exemplary credibility score updates may include linearly or non-linearly weighted summations.

$$c[t] = 100 \left( \frac{Y[t]}{Y[t] + N[t]} - 0.5 \right) (r[t])^t \quad \text{Eq. (1)}$$

$$C[T] = C_0 + \sum_{t=t_0}^{T} c[t] \quad \text{Eq. (2)}$$

Table 1 below provides an explicit numerical example of credibility score computation based on Eqs. (1) and (2). In this example, decay rate is set to the value of r[t]=1−0.02t; $t_0$ is set to 1, while T is set to 10; columns 3 and 4 within Table 1 list sample values for Y[t] and N[t]; credibility update c[t] shown in column 5 is computed according to Eq. (1). To compute user credibility score at T=10, Eq. (2) may be employed with $C_0$=50, leading to a sum of C[10]=71.67. Observe that the value of C[t] may be updated incrementally as more verification responses are received over individual time intervals. In various embodiments, the value of T may be set by the VELVET ROPES server. In other words, the server collects verification responses for a specific period of time, before updating the user's credibility score. The VELVET ROPES server may also set threshold values for use within the verification process shown in FIGS. 26A and 26B. For example, a user with a credibility score greater than or equal to 85 may have his or her reported sightings marked as "credible unverified" immediately upon reporting, a user with a credibility score lower than or equal to 30 may have his or her reported sighting marked as "rumored" immediately upon reporting, while a user with a credibility score between 30 inclusive and 85 non-inclusive may have his or her reported sighting marked as "unverified" instead.

TABLE 1

Individual User Credibility Computation Example

| Time t | Rate of Decay r[t] | # of Yes Y[t] | # of No N[t] | Credibility Update c[t] |
| --- | --- | --- | --- | --- |
| 1 | 0.98 | 38 | 17 | 18.71 |
| 2 | 0.96 | 90 | 26 | 25.42 |
| 3 | 0.94 | 30 | 52 | −11.14 |
| 4 | 0.92 | 28 | 19 | 6.86 |
| 5 | 0.90 | 44 | 60 | −4.54 |
| 6 | 0.88 | 20 | 30 | −4.64 |
| 7 | 0.86 | 90 | 42 | 6.33 |
| 8 | 0.84 | 2 | 6 | −6.20 |
| 9 | 0.82 | 14 | 75 | −5.74 |
| 10 | 0.80 | 7 | 31 | −3.39 |

Celebrity Rating

An additional feature of the VELVET ROPES system is to receive user ratings for individual celebrities in terms of their general star power, popularity, influence, talent, bankability, or even notoriety, all based on current and/or historical rating data. Such a celebrity rating system enables the user to pick up on new and upcoming stars, to find celebrities who have been popular for extended periods of times, and to search for celebrities who are in trend for one or more particular reasons.

FIG. 27 is a set of exemplary screenshots showing several pages for celebrity rating, according to one embodiment of the present invention. Within page 2710, which may be automatically evoked when a user logs into the VELVET ROPES system, an image of a celebrity such as Madonna is presented, and the user is asked to rate her star power from A to D, as an A-List, B-List, C-List or D-List star. In some embodiments, ratings may be polled for categories other than star power. For example, during the week leading up to award shows such as the Oscars or the American Music Awards, ratings may be polled for celebrities' fashion senses. The celebrity being rated may be one of several randomly selected by the system and presented to the user. Such random selections may be based on different criteria such as user interest and preferences, or celebrity popularity rankings within the system. Moreover, in some embodiments, the user may choose to rate his or her favorite celebrities, or search by celebrity name to rate particular celebrities of interest. Page 2720 is an illustrative celebrity profile page for Tom Hiddleston, where a rating panel displays the current standing of Tom Hiddleston as an A-List celebrity. On the other hand, page 2730 is an illustrative ratings page, where the top-three rated celebrities of the week are presented, and links to separate celebrity lists are provided. Tapping on the A-List link within page 2730 leads to an A-List of the week page 2740, showing celebrities who have been rated as A-List for the week, possibly with the celebrity receiving the most votes ranked first at the top.

Consider an example where a given celebrity such as Stephen Colbert is rated for star power. For any week or day, user votes are collected by the VELVET ROPES server, and a percentage computation may be performed. Table 2 below provides an explicit numerical example, where the majority of Stephen Colbert's votes have chosen him as an A-List celebrity. Thus, Stephen Colbert's current standing for the week may be reported as an A-List star. In some embodiments, the total number of votes for a given celebrity may also be taken into account. For example, if only 10 votes have been received for a particular celebrity over an entire week, the voting results may be dismissed, since for one, the sampling population is too small for the voting result to be of any significance. For two, a celebrity with only 10 user votes over an entire week is most-likely D-List, regardless of the percentage computation results. In some embodiments, the top-ranked celebrity in the list shown in Page 2740 may have the highest A-List percentage value or the largest number of A-List votes over all stars displayed therein.

TABLE 2

Celebrity Rating for the Week Computation Example

| This Week's Voting | A-List | B-List | C-List | D-List | Total |
|---|---|---|---|---|---|
| Stephen Colbert in Latest Round | 3109 | 1614 | 1119 | 1409 | 7251 |
| Percentages | 42.88% | 22.26% | 15.43% | 19.43% | 100% |

While rating or voting results for any particular week or day may be determined through simple individual percentage computations or vote count comparisons followed by sorting over multiple celebrities, lifetime rating may require time-dependent weightings to emphasize on more recent ratings. For example, Eq. (3) below provides an A-List vote conversion example of how historical voting results may be decay-converted. In this embodiment, discrete variable t represents time passed since a set of voting results have been collected; r[t] is a time-dependent rate of decay; a[t] is the number of A-List votes received between t-1 and t; $t_0$ is the starting time, while T is the time at which the Lifetime rating is to be computed; A[t] is a time-dependent, decay-converted vote count, to be summed over the desired Lifetime between $t_0$ and T to obtain the total Lifetime A-List vote $R_A[T]$ for a given celebrity. Although not shown explicitly here, similar computations can be carried out for B-List, C-List, and D-List votes as well. This particular celebrity rating computation may be viewed as an exponentially weighted summation of user votes. Other exemplary celebrity rating updates may include linearly or non-linearly weighted summations, where user note counts may or may not be normalized.

$$R_A[T]=\Sigma_{t=t_0}^T A(t)=\Sigma_{t=t_0}^T a(t)(r[t])^t \qquad \text{Eq. (3)}$$

Table 3 below provides an explicit numerical example of Lifetime A-List Vote conversion based on Eq. (3). In this example, decay rate is set to the value of r[t]=1−0.04t; $t_0$ is set to 1, while T is set to 12; column 3 within Table 3 lists sample values for Lifetime A-List votes a[t]; Lifetime decay-converted A-List votes A[t] shown in column 4 is computed as a[t](r[t])$^t$. At T=12, the total Lifetime A-List vote $R_A[T]$ is decay-converted to be 29307, instead of the direct sum of 61910. Similarly, total Lifetime B-List, C-List and D-List votes may be decay-converted, and a percentage computation may be performed to determine the Lifetime standing of the given celebrity. Table 4 shows an exemplary comparison between Lifetime votes directly summed and decay-converted votes computed according to Eq. (3). Thus, even though Stephen Colbert has historically more votes as a B-List star, the decay-converted votes reflects the fact that he may have received many more A-List votes recently. Thus, Stephen Colbert's Lifetime standing is taken as an A-List celebrity.

TABLE 3

Celebrity Rating Computation Example

| Months Passed t | Rate of Decay b(t) | Lifetime A-List Votes a(t) | Lifetime A-List Votes Converted for Decay A(t) |
|---|---|---|---|
| 1 | 1 | 5201 | 5201 |
| 2 | 0.96 | 9264 | 8538 |
| 3 | 0.92 | 7570 | 5895 |
| 4 | 0.88 | 9905 | 5940 |
| 5 | 0.84 | 7265 | 3038 |
| 6 | 0.80 | 42 | 11 |
| 7 | 0.76 | 1588 | 233 |
| 8 | 0.72 | 1847 | 133 |
| 9 | 0.68 | 7633 | 237 |
| 10 | 0.64 | 5829 | 67 |
| 11 | 0.60 | 3278 | 12 |
| 12 | 0.56 | 2488 | 2 |
| Cumulative Sum | | 61910 | 29307 |

TABLE 4

Celebrity Lifetime Vote Comparisons

| Stephen Colbert | A-List | B-List | C-List | D-List |
|---|---|---|---|---|
| Lifetime Votes | 61910 | 73960 | 51055 | 57794 |
| Decay-Converted Lifetime Votes | 29307 | 26895 | 23072 | 16979 |

Client Application on Non-Limited Displays

Figure 28:
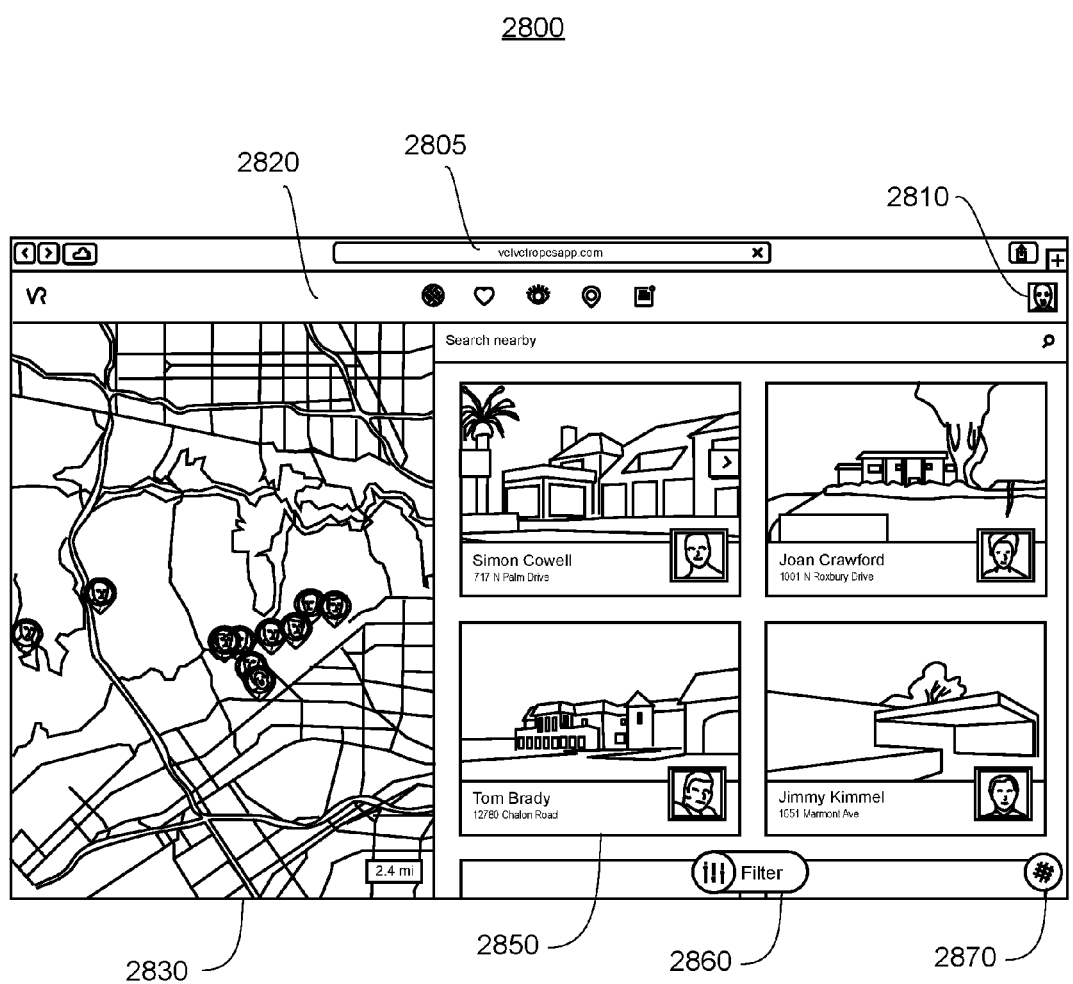
FIG. 28 is an exemplary screenshot of a client application interface on non-limited displays, implemented according to one embodiment of the present invention.
Figure 29:
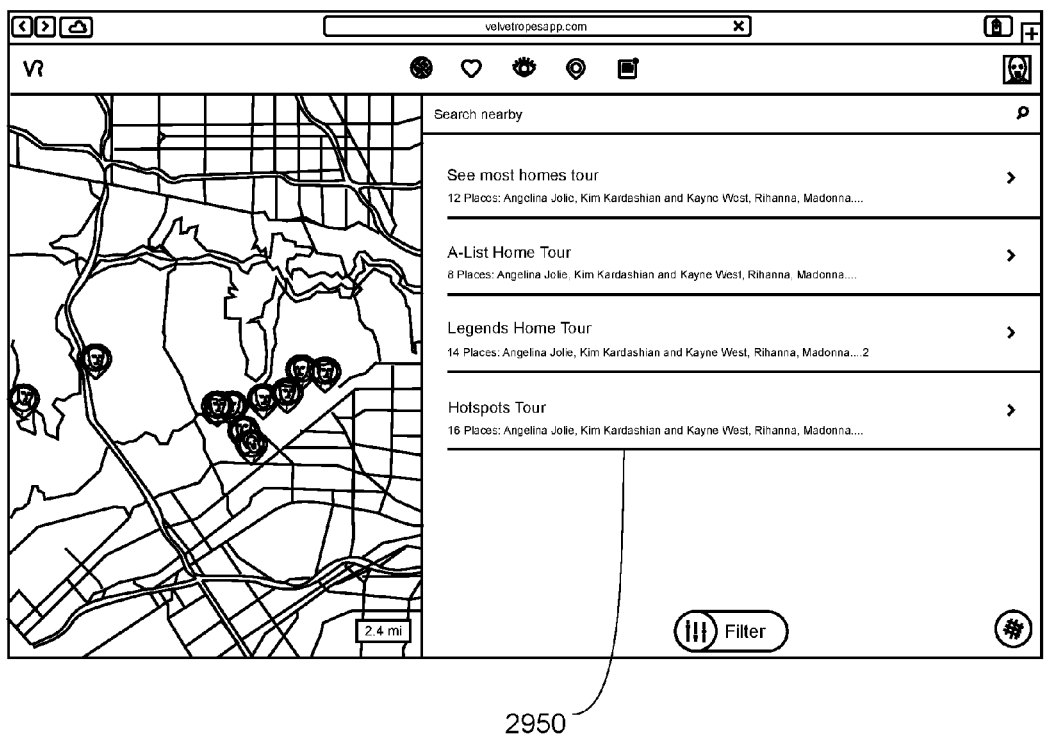
FIG. 29 is another exemplary screenshot of a client application interface on non-limited displays, implemented according to one embodiment of the present invention.

FIGS. 28 and 29 are illustrative screenshots of the VELVET ROPES system when presented to the user on a non-limited display, according to one embodiment of the present invention. A non-limited display refers to a comparatively large screen, such as used on a desktop computer or a tablet. FIG. 28 is a celebrity places page 2800 similar to celebrity places page 600 shown in FIG. 6. In this example, the VELVET ROPES system is accessed through a web portal, with a web address presented in address bar 2805. Navigation panel 2820 contains a row of clickable tabs, while user icon 2810 provides access to user profile and setting information. Map panel 2830 shows a map area around a current user geolocation, while thumbnail listings such as 2850 provides summary information on each celebrity place shown within map panel 2830. In addition, filter icon 2860 allows the user to filter the displayed celebrity places, while tour icon 2870 enables the user to select a pre-defined or customized celebrity places tour. FIG. 29 is a tours page 2900 similar to page 700 shown in FIG. 7, and each entry within tour list 2950 covers a different set of celebrity places.

CONCLUSIONS

One of ordinary skill in the art knows that the use cases, structures, schematics, and flow diagrams may be performed in other orders or combinations, but the inventive concept of the present invention remains without departing from the broader spirit of the invention. Every embodiment may be unique, and methods/steps may be either shortened or lengthened, overlapped with the other activities, postponed, delayed, and continued after a time gap, such that every user is accommodated to practice the methods of the present invention.

The present invention may be implemented in hardware and/or in software. Many components of the system, for example, network interfaces etc., have not been shown, so as not to obscure the present invention. However, one of ordinary skill in the art would appreciate that the system necessarily includes these components. A user-device is a hardware that includes at least one processor coupled to a memory. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs and outputs for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface with one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, programs, codes, libraries, objects, modules, etc. indicated collectively by reference numerals to perform the methods, processes, and techniques described above.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for generating a tour on a digital celebrity map, and for verifying a celebrity sighting event, comprising:
   a server connected to a network, the server having access to at least one processor and a data repository, the server including a non-transitory physical medium; and
   a plurality of program codes stored on the non-transitory physical medium, the program code, when executed, causing the processor to:
   establish a client server connection between the server and a computing appliance operated by at least one user;
   receive at least one celebrity sighting event by:
      receive a celebrity image from an image source, wherein the image source is selected from a first group consisting of a digital image source and a reporting user upload;

associate the celebrity image with a first named celebrity;
determine a sighting location and a sighting time associated with the celebrity image, wherein the first named celebrity, the sighting location, and the sighting time constitute a celebrity sighting event, and wherein the celebrity image is associated with the celebrity sighting event;
receive a credibility rating for the celebrity image; and
update a credibility score of the image source according to the received credibility rating;
wherein an initial credibility rating score is set to an initial rating;
generate a celebrity tour by:
receive, from the computing appliance, a user geolocation;
determine a map area around the user geolocation;
retrieve, from the data repository, celebrity geolocations within the map area, wherein each celebrity geolocation is associated with at least one named celebrity, and wherein the celebrity geolocations comprise at least celebrity real estate properties, celebrity sighting locations, and celebrity hotspots;
transmit the celebrity geolocations to the computing appliance, for display on the digital celebrity map;
receive a request to generate a tour to the celebrity geolocations, wherein the tour starts from the user geolocation, and wherein the request is associated with a request time; and
in response to the request, generate for display on the digital celebrity map, the tour to the celebrity geolocations; and
verify the celebrity sighting event by:
determine whether the sighting location of the celebrity sighting event is within the map area, and whether the sighting time is within a given time window around the request time; and
in response to determining that the sighting location is within the map area, and the sighting time is within the given time window around the request time,
generate a notification of the sighting event to the at least one user;
receive a verification response from the at least one user, wherein the verification response is associated with a verification time; and
update the credibility score of the image source according to the verification response and a duration of time elapsed from the sighting time to the verification time.

2. The system of claim 1, wherein the program code, when executed, further causes the processor to:
receive, from the user, at least one filtering criterion for filtering the celebrity geolocations, wherein the at least one filtering criterion is selected from a second group consisting of celebrity status, celebrity active period, celebrity rating, and celebrity geolocation type; and
in response to receiving the at least one filtering criterion, filter the celebrity geolocations according to the at least one filter criterion.

3. The system of claim 1, wherein the program code, when executed, further causes the processor to:
receive a user selection of a travel mode;
determine the map area around the user geolocation by scaling according to the travel mode; and
generate the tour according to the travel mode.

4. The system of claim 1, wherein each celebrity geolocation is associated with an avatar of the at least one named celebrity, for display on the digital celebrity map as a location marker.

5. The system of claim 1, wherein the generated tour includes a graphical display of navigation directions.

6. The system of claim 1, wherein the generated tour includes a profile for each celebrity geolocation.

7. The system of claim 1, wherein the program code, when executed, further causes the processor to:
search digital media to find a currently-trending celebrity;
determine whether the currently-trending celebrity exists in the data repository; and
in response to determining that the currently-trending celebrity does not exist in the data repository, add the currently-trending celebrity to the data repository.

8. The system of claim 1, wherein the program code, when executed, further causes the processor to:
determine whether the first named celebrity exists in the data repository; and
in response to determining that the first named celebrity exists in the data repository, determine whether the celebrity image exists in the data repository for the first named celebrity, wherein the celebrity image is associated with the first named celebrity in the data repository in response to determining that the celebrity image does not exist in the data repository for the first named celebrity.

9. The system of claim 8, wherein the program code, when executed, further causes the processor to:
determine whether a second celebrity image is associated with a second named celebrity;
in response to determining that the second celebrity image is associated with a second named celebrity, determine whether the second named celebrity exists in the data repository; and
in response to determining that the second named celebrity does not exist in the data repository, add the second named celebrity to the data repository.

10. The system of claim 1, wherein the credibility score of the image source is updated according to the verification response and the duration of time elapsed from the sighting time to the verification time through the following equations:

$$c[t] = 100\left(\frac{Y[t]}{Y[t]+N[t]} - 0.5\right)(r[t])^t,$$

$$C[T] = C_0 + \sum_{t=t_0}^{T} c[t],$$

wherein r[t] is a time-dependent rate of decay, Y[t] and N[t] are numbers of affirmative and negative verification responses received between time t−1 and t, including the verification response from the at least one user, c[t] is a time-dependent credibility update value, summed over a time elapsed between the sighting time and a response time for each verification response, $C_0$ is an initial credibility score, set to a value between 0 and 100, $t_0$ is starting time, T is time at which the credibility score is computed, and C[T] is an updated credibility score.

11. A method for generating a tour on a digital celebrity map, the method executable from a non-transitory storage medium storing executable program code thereon, the method comprising:

establishing a client server connection between a server and a computing appliance operable by at least one user, the server having access to at least one processor and a data repository;

receiving at least one celebrity sighting event by:
  receiving a celebrity image from an image source, wherein the image source is selected from a first group consisting of a digital image source and a reporting user upload;
  associating the celebrity image with a first named celebrity;
  determining a sighting location and a sighting time associated with the celebrity image, wherein the first named celebrity, the sighting location, and the sighting time constitute a celebrity sighting event, and wherein the celebrity image is associated with the celebrity sighting event;
  receiving a credibility rating for the celebrity image; and
  updating a credibility score of the image source according to the received credibility rating;
  wherein an initial credibility rating score is set to an initial value;

generating a celebrity tour by:
  receiving, from the computing appliance, a user geolocation;
  determining a map area around the user geolocation;
  retrieving, from the data repository, celebrity geolocations within the map area, wherein each celebrity geolocation is associated with at least one named celebrity, and wherein the celebrity geolocations comprise at least celebrity real estate properties, celebrity sighting locations, and celebrity hotspots;
  transmitting the celebrity geolocations to the computing appliance, for display on the digital celebrity map;
  receiving a request to generate a tour to the celebrity geolocations, wherein the tour starts from the user geolocation; and
  in response to the request, generating for display on the digital celebrity map, the tour to the celebrity geolocations; and verifying the celebrity sighting event by:
  determining whether the sighting location of the celebrity sighting event is within the map area, and whether the sighting time is within a given time window around the request time; and
  in response to determining that the sighting location is within the map area, and the sighting time is within the given time window around the request time, generating a notification of the sighting event to the at least one user;
  receiving a verification response from the at least one user, wherein the verification response is associated with a verification time; and
  updating the credibility score of the image source according to the verification response and a duration of time elapsed from the sighting time to the verification time.

12. The method of claim 11, further comprising:
receiving, from the user, at least one filtering criterion for filtering the celebrity geolocations, wherein the at least one filtering criterion is selected from a second group consisting of celebrity status, celebrity active period, celebrity rating, and celebrity geolocation type; and
in response to receiving the at least one filtering criterion, filtering the celebrity geolocations according to the at least one filter criterion.

13. The method of claim 11, further comprising:
receiving a user selection of a travel mode;
determining the map area around the user geolocation by scaling according to the travel mode; and
generating the tour according to the travel mode.

14. The method of claim 11, wherein each celebrity geolocation is associated with an avatar of the at least one named celebrity, for display on the digital celebrity map as a location marker.

15. The method of claim 11, wherein the generated tour includes a graphical display of navigation directions.

16. The method of claim 11, wherein the generated tour includes a profile for each celebrity geolocation.

17. The method of claim 11, further comprising:
searching digital media to find a currently-trending celebrity;
determining whether the currently-trending celebrity exists in the data repository; and
in response to determining that the currently-trending celebrity does not exist in the data repository, adding the currently-trending celebrity to the data repository.

18. The method of claim 11, further comprising:
determining whether the first named celebrity exists in the data repository; and
in response to determining that the first named celebrity exists in the data repository, determining whether the celebrity image exists in the data repository for the first named celebrity, wherein the celebrity image is associated with the first named celebrity in the data repository in response to determining that the celebrity image does not exist in the data repository for the first named celebrity.

19. The method of claim 18, further comprising:
determining whether a second celebrity image is associated with a second named celebrity;
in response to determining that the second celebrity image is associated with a second named celebrity, determining whether the second named celebrity exists in the data repository; and
in response to determining that the second named celebrity does not exist in the data repository, adding the second named celebrity to the data repository.

20. A non-transitory storage medium storing executable program code for generating a tour on a digital celebrity map, the program code when executed, causing a processor to perform steps for:
establishing a client server connection between a server and a computing appliance operated by at least one user, the server having access to at least one processor and a data repository;
receiving at least one celebrity sighting event by:
  receiving a celebrity image from an image source, wherein the image source is selected from a group consisting of a digital image source and a reporting user upload;
  associating the celebrity image with a first named celebrity;
  determining a sighting location and a sighting time associated with the celebrity image, wherein the first named celebrity, the sighting location, and the sighting time constitute a celebrity sighting event, and wherein the celebrity image is associated with the celebrity sighting event;

receiving a credibility rating for the celebrity image; and updating a credibility score of the image source according to the received credibility rating;

wherein an initial credibility rating score is set to an initial value;

generating a celebrity tour by:

receiving, from the computing appliance, a user geolocation;

determining a map area around the user geolocation;

retrieving, from the data repository, celebrity geolocations within the map area, wherein each celebrity geolocation is associated with at least one named celebrity, and wherein the celebrity geolocations comprise at least celebrity real estate properties, celebrity sighting locations, and celebrity hotspots;

transmitting the celebrity geolocations to the computing appliance, for display on the digital celebrity map;

receiving a request to generate a tour to the celebrity geolocations, wherein the tour starts from the user geolocation, and wherein the request is associated with a request time; and in response to the request, generating for display on the digital celebrity map, the tour to the celebrity geolocations; and verifying the celebrity sighting event by:

determining whether the sighting location of the celebrity sighting event is within the map area, and whether the sighting time is within a given time window around the request time; and in response to determining that the sighting location is within the map area, and the sighting time is within the given time window around the request time, generating a notification of the sighting event to the at least one user;

receiving a verification response from the at least one user, wherein the verification response is associated with a verification time; and updating the credibility score of the image source according to the verification response and a duration of time elapsed from the sighting time to the verification time.

* * * * *